US011967301B2

(12) United States Patent
Reeder

(10) Patent No.: US 11,967,301 B2
(45) Date of Patent: Apr. 23, 2024

(54) LIGATURE FOR WOODWIND MOUTHPIECE

(71) Applicant: ROVNER PRODUCTS INCORPORATED, Timonium, MD (US)

(72) Inventor: George Reeder, Reisterstown, MD (US)

(73) Assignee: Rovner Products Incorporated, Timonium, MD (US)

( * ) Notice: Subject to any disclaimer, the term of this patent is extended or adjusted under 35 U.S.C. 154(b) by 62 days.

(21) Appl. No.: 17/345,479

(22) Filed: Jun. 11, 2021

(65) Prior Publication Data

US 2021/0304712 A1 Sep. 30, 2021

Related U.S. Application Data

(63) Continuation-in-part of application No. 17/098,994, filed on Nov. 16, 2020, now Pat. No. 11,798,520, which is a continuation of application No. 15/852,376, filed on Dec. 22, 2017, now Pat. No. 10,782,587.

(60) Provisional application No. 63/037,737, filed on Jun. 11, 2020.

(51) Int. Cl.

| | |
|---|---|
| ***G10D 9/02*** | (2020.01) |
| ***G10D 7/066*** | (2020.01) |
| ***G10D 7/08*** | (2006.01) |

(52) U.S. Cl.

CPC ............... *G10D 9/02* (2013.01); *G10D 7/066* (2013.01); *G10D 7/08* (2013.01)

(58) Field of Classification Search

CPC ............ G10D 9/02; G10D 7/066; G10D 7/08; G10D 7/06; G10D 9/00

See application file for complete search history.

(56) References Cited

U.S. PATENT DOCUMENTS

| | | | |
|---|---|---|---|
| 1,667,836 | A | 5/1928 | Brockman, Jr. |
| 1,771,157 | A | 7/1930 | Paul |
| 1,809,380 | A | 6/1931 | Gulick |
| 2,003,576 | A | 6/1935 | Buhren |
| 2,095,605 | A | 10/1937 | Georges |
| 2,181,880 | A | 12/1939 | Fauss |

(Continued)

FOREIGN PATENT DOCUMENTS

| | | | | |
|---|---|---|---|---|
| FR | 2613521 A | * 10/1988 | ............. G10D 7/005 |
| FR | 2613521 A1 | 10/1988 | |

(Continued)

OTHER PUBLICATIONS

Article excerpts from"Downbeat" and "Clarinet Magazine" discussing the Rovner Barrel, 1979.

(Continued)

*Primary Examiner* — Kimberly R Lockett

(74) *Attorney, Agent, or Firm* — Plumsea Law Group, LLC

(57) ABSTRACT

A ligature for a woodwind mouthpiece includes a ligature strap with a carbon fiber portion and at least one flexible strap portion attached to and extending from the carbon fiber portion along one of the side edges. The flexible strap portion is folded over to form two layers of flexible strap, and a pair of rods are disposed between the two layers of one of the flexible strap portions. A closure mechanism passes through the flexible strap portion and each rod.

20 Claims, 27 Drawing Sheets

(56) References Cited

U.S. PATENT DOCUMENTS

| | | | |
|---|---|---|---|
| 2,200,054 | A | 5/1940 | Bundy et al. |
| 2,224,308 | A | 12/1940 | Maccaferri |
| 2,287,529 | A | 6/1942 | Mario |
| 2,296,737 | A | 9/1942 | Peterson |
| 2,368,556 | A | 1/1945 | Maccaferri |
| 2,411,692 | A | 11/1946 | Murano |
| 2,495,484 | A | 1/1950 | Schemenauer |
| 2,499,855 | A | 3/1950 | Gamble |
| 2,517,077 | A | 8/1950 | Berry |
| 2,525,523 | A | 10/1950 | Chance |
| 3,150,554 | A | 9/1964 | Leloup |
| 3,433,113 | A | 3/1969 | Portnoy |
| 3,521,517 | A | 7/1970 | Sato |
| 3,759,132 | A | 9/1973 | Backus |
| 3,905,268 | A | 9/1975 | Gamble |
| 4,056,997 | A | 11/1977 | Rovner |
| 4,210,055 | A | 7/1980 | Platamone, Jr. |
| 4,308,781 | A | 1/1982 | McGuerty |
| 4,337,683 | A | 7/1982 | Backus |
| 4,428,271 | A | 1/1984 | Winslow et al. |
| 4,449,439 | A | 5/1984 | Wells |
| 4,517,875 | A | 5/1985 | Dossekker |
| 4,651,616 | A | 3/1987 | Visser |
| 4,669,352 | A | 6/1987 | Bichon |
| 4,708,182 | A | 11/1987 | Laker |
| 4,745,838 | A | 5/1988 | Johnson |
| 4,941,385 | A | 7/1990 | Johnson |
| 5,018,425 | A | 5/1991 | Rovner |
| 5,105,701 | A | 4/1992 | Hall et al. |
| 5,192,821 | A | 3/1993 | Goldstein et al. |
| 5,289,752 | A | 3/1994 | Barbaglia |
| 5,293,805 | A | 3/1994 | Guardala et al. |
| 5,303,628 | A | 4/1994 | Salazar |
| 5,357,837 | A | 10/1994 | Disera |
| 5,398,582 | A | 3/1995 | Smith |
| 5,419,229 | A | 5/1995 | Van Doren |
| 5,456,152 | A | 10/1995 | Cusack et al. |
| 5,623,111 | A | 4/1997 | Van Doren et al. |
| 5,728,957 | A | 3/1998 | Valtchev |
| D404,755 | S | 1/1999 | Garbuzov |
| 5,973,245 | A | 10/1999 | Van Doren |
| 5,998,715 | A | 12/1999 | Rovner |
| 6,020,545 | A | 2/2000 | Consoli |
| 6,118,060 | A | 9/2000 | Van Doren |
| 6,130,376 | A | 10/2000 | Chang |
| 6,150,593 | A | 11/2000 | Holden |
| 6,259,010 | B1 | 7/2001 | Nagahara |
| 6,501,010 | B2 | 12/2002 | Sullivan |
| 6,673,992 | B1 | 1/2004 | Runyon |
| 7,169,993 | B2 | 1/2007 | Fliegel et al. |
| 7,326,840 | B2 | 2/2008 | Wanne |
| 7,465,864 | B2 | 12/2008 | Heintz |
| 7,470,844 | B2 | 12/2008 | Espina |
| 7,626,105 | B2 | 12/2009 | Rovner |
| 7,635,287 | B2 | 12/2009 | May |
| 7,638,700 | B1 | 12/2009 | Heintz |
| 7,667,118 | B1 | 2/2010 | Behn |
| 7,825,317 | B1 | 11/2010 | Lederman et al. |
| 7,863,509 | B2 | 1/2011 | Rovner |
| 7,939,738 | B2 | 5/2011 | Rovner |
| 7,982,112 | B2 | 7/2011 | Rovner |
| 8,283,541 | B2 | 10/2012 | Rovner |
| 8,410,344 | B2 | 4/2013 | Rovner |
| 8,586,845 | B2 | 11/2013 | Rovner |
| 8,841,529 | B2 | 9/2014 | Rovner |
| 2004/0011183 | A1 | 1/2004 | Fliegel et al. |
| 2005/0061136 | A1 | 3/2005 | Rovner |
| 2005/0061137 | A1 | 3/2005 | Rovner |
| 2005/0072623 | A1 | 4/2005 | Rovner |
| 2005/0087057 | A1 | 4/2005 | Taillard |
| 2006/0123973 | A1 | 6/2006 | Espina |
| 2006/0272473 | A1 | 12/2006 | Kuo |
| 2008/0022839 | A1 | 1/2008 | Sullivan |
| 2009/0217798 | A1 | 9/2009 | Rovner |
| 2009/0217800 | A1 | 9/2009 | Rovner |
| 2010/0043621 | A1 | 2/2010 | Rovner |
| 2011/0162508 | A1 | 7/2011 | Rovner |
| 2011/0239843 | A1 | 10/2011 | Brockman |
| 2018/0134349 | A1 | 5/2018 | Bowler |
| 2018/0166050 | A1 | 6/2018 | Rovner et al. |
| 2021/0065662 | A1 | 3/2021 | Reeder |

FOREIGN PATENT DOCUMENTS

| | | | | | |
|---|---|---|---|---|---|
| JP | 3193363 | U | * | 10/2014 | ............. G10D 7/005 |
| RU | 194212 | U1 | * | 12/2019 | ............... G10D 9/00 |

OTHER PUBLICATIONS

Passband, http://www.absoluteastronomy.com/topics/Passband viewed May 14, 2010.

Rovner ligatures, viewed May 14, 2010 at www.rovnerproducts.com/ligatures.com.

* cited by examiner

LIGATURE FOR WOODWIND MOUTHPIECE

CROSS-REFERENCE TO RELATED APPLICATIONS

The present application is a Continuation-in-Part of pending U.S. patent application Ser. No. 17/098,994, filed Nov. 16, 2020, which is a Continuation of U.S. patent application Ser. No. 15/852,376, filed Dec. 22, 2017. In addition, the present application is related to, and claims priority from, U.S. Provisional Patent Application 63/037,737, filed Jun. 11, 2020, entitled "Ligature for Woodwind Mouthpiece" to George Reeder. The entire disclosures of which are incorporated herein by reference.

FIELD OF THE INVENTION

The present invention relates to woodwind instruments and in particular to ligatures for use with mouthpieces for woodwind instruments.

BACKGROUND OF THE INVENTION

Woodwind musical instruments, e.g., saxophones and clarinets, utilize the vibration of a reed in response to a flow of air to generate a tone. The reed is typically placed in contact with a mouthpiece to cover an opening or window. The reed is held in place over the window by an adjustable clamp or ligature that surrounds the mouthpiece and the reed. Variations in the mouthpiece and ligature affect the vibration of the reed and, therefore, the performance or tone of the instrument.

In any device that is part of a vibrating system, differences in materials and construction yield different vibrational patterns and tonal spectrums. On single-reed woodwind instruments, the player typically adjusts the tension of the ligature to secure the reed in place without holding the reed so tightly as to inhibit free vibration of the reed. Therefore, conventional ligatures are configured to permit the reed to vibrate with greater freedom and less constriction. However, ligature arrangements are still desired that provide for improved conformity between the ligature and the reed while achieving sufficient clamping force.

SUMMARY OF THE INVENTION

Exemplary embodiments are directed to ligature straps, ligatures containing the ligature straps and woodwind mouthpieces utilizing these ligatures that provide for increased performance in a woodwind instrument. The ligature straps utilize arrangements of kerfs extending along different and unique portions of parallel lines running along the ligature straps. Each kerf is a thin elongated gap within the ligature strap created by the removal of strap material. Arrangements of slits passing through the thickness of the ligature strap can also be used in combination with or as an alternative to the kerfs. The slits do not represent the removal of ligature strap material. Any suitable method for cutting kerfs, i.e., removing material from the thin elongated gaps, in a sheet of fabric can be used. In one embodiment, the kerfs are formed using an edge tool such as a knife or a punch containing a plurality of blades sized and positioned according to the desired size and arrangement of kerfs in the ligature strap. The ligature strap can be a straight strip of material, e.g., rectangular or trapezoidal, can be a curved or arched strip of material, or can have a compound shape with a straight central portion, i.e., having parallel opposing edges, and a pair of end flaps extending from the central portion. In one embodiment, the end flaps are also straight but extend at an angle from the central portion.

The ligature strap with a compound shape includes three portions, the central portion and the pair of end flaps. The parallel lines containing the kerfs extend across and through all three portions of the ligature strap. In one embodiment, the parallel lines are parallel across all three portions. Alternatively, the parallel lines can be arranged in sets that are independently parallel in each portion but are divergent across portions. In one embodiment, a first set of parallel lines passes through the central portion, and two second sets of parallel lines pass through the end flaps. The first and second sets of parallel lines are divergent. In one embodiment, the two second sets of parallel lines are also divergent.

Kerfs are disposed along various lengths of the parallel lines. In addition, kerfs are located along lengths of the parallel lines in all portions of the ligature strap. The number, spacing and arrangement of the kerfs provides for the maximum coverage of the ligature strap with kerfs while maintaining a sufficient amount of continuous ligature strap for structural integrity. In addition, the number and lengths of the kerfs in a given ligature strap vary depending on the overall size, i.e., length and width, of the portions of the ligature strap. In one embodiment, each parallel line includes at least two kerfs. Each kerf in a common parallel line extends along a unique length or portion of the parallel line that is separate from the portions of the parallel line containing the other kerfs. Therefore, each kerf is spaced from the other kerf along the parallel line. In one embodiment, one or more parallel lines includes three or more kerfs. The kerfs extending along a common parallel line can have the same length or different lengths.

Exemplary embodiments are directed to a ligature strap for a mouthpiece containing a plurality of kerfs. Each kerf extends at least partially along one of a plurality of parallel lines running across the ligature strap, and at least two separate kerfs extend along a common line in the plurality of parallel lines. Each kerf represents a gap created by removing ligature strap material. Each gap passes completely through the ligature strap and has a gap width extending perpendicular to the plurality of parallel lines. In one embodiment, the plurality of parallel lines is a plurality of parallel rectilinear lines. In one embodiment, the gap width is about 0.004 inches. In one embodiment, at least one gap has an enlarged gap width that is greater than the gap width. In one embodiment, the enlarged gap width comprises about 0.01 inches.

Each kerf has a length measured along one of the parallel lines, and the plurality of kerfs includes at least two different lengths. In one embodiment, the ligature strap includes a top edge and a bottom edge spaced from and parallel to the top edge. The plurality of parallel lines extends parallel to at least one of the top edge and the bottom edge. In one embodiment, the kerfs in the plurality of kerfs are spaced from the top edge, the bottom edge and each other along the parallel lines and between adjacent parallel lines by a distance of at least about 0.1 inches (2.5 to 2.54 mm). In one embodiment, the spacing is from about 2.5 mm to about 4 mm. In one embodiment, the spacing is less than 4 mm or less than 3 mm. In one embodiment, a subset of the plurality of kerfs is located along each parallel line. Each subset contains at least two kerfs, and each kerf in a given subset spaced from adjacent kerfs along the parallel line associated with the given subset by a distance of at least about 0.1 inches (2.5 to 2.54 mm). In one embodiment, the spacing is from about 2.5 mm to about 4 mm. In one embodiment, the spacing is less than 4 mm or less than 3 mm.

In one embodiment, the ligature strap has a top edge and a bottom edge spaced from and parallel to the top edge. The spaces between adjacent kerfs in all subsets of the plurality of kerfs are aligned across the plurality of parallel lines to define at least one continuous line of ligature strap extending completely from the top edge to the bottom edge. In one embodiment, the continuous line of ligature strap extends from the top edge to the bottom edge at an angle to the top edge and the bottom edge of from about 72° to about 90°. In one embodiment, the continuous line of ligature strap is centered on the ligature strap, and the top edge includes a notch, centered on the ligature strap and extending into the continuous line of ligature strap toward the bottom edge.

In one embodiment, the ligature strap includes a central portion containing a top edge and a bottom edge spaced from and parallel to the top edge. A pair of end flaps extend from opposite ends of the central portion. Each end flap has an end flap top edge and an end flap bottom edge extending from the top edge and the bottom edge respectively at an angle greater than 90° and less than 180°. In one embodiment, the ligature strap is symmetric about a line passing through a center of the central portion. In one embodiment, the plurality of parallel lines extends across the central portion and the pair of end flaps, and the kerfs extend along the plurality of parallel lines in the central portion and the pair of end flaps. In one embodiment, the ligature strap includes a pair of fold lines. Each fold line is disposed between the central portion and one of the end flaps and represents a continuous line of ligature strap extending completely from the top edge to the bottom edge. Upon folding each end flap over one of the fold lines, the top edge is aligned with each end flap top edge, and the bottom edge is aligned with each end flap bottom edge. Kerfs disposed in the end flaps are divergent from kerfs disposed in the central portion, and the ligature strap has divergent ends.

Exemplary embodiments are directed to a ligature for a woodwind mouthpiece having ligature strap with a central portion containing a top edge and a bottom edge spaced from and parallel to the top edge. A pair of end flaps extend from opposite ends of the central portion. Each end flap includes an end flap top edge and an end flap bottom edge extending from the top edge and the bottom edge respectively at an angle greater than 90° and less than 180°. The ligature strap includes a plurality of kerfs. Each kerf extends at least partially along one of a plurality of parallel lines running across the ligature strap through the central portion and the pair of end flaps, and at least two separate kerfs extend along each line in the plurality of parallel lines. A pair of fold lines are provided in the ligature strap. Each fold line is disposed between the central portion and one of the end flaps and represents a continuous line of ligature strap extending completely from the top edge to the bottom edge. A pair of rods are included in the ligature. Each rod is positioned along one of the fold lines from the top edge to the bottom edge. Upon folding each end flap over one of the fold lines, the top edge is aligned with each end flap top edge, and the bottom edge is aligned with each end flap bottom edge. Kerfs disposed in the end flaps are divergent from kerfs disposed in the central portion, and each rod is contained between the central portion and one of the end flaps and defines an end of the ligature. A closure mechanism passes through each end flap, each rod and the central portion adjacent each rod to pull the pair of rods toward each other.

Exemplary embodiments are directed to a ligature strap for a mouthpiece containing a top edge a bottom edge spaced from and parallel to the top edge and a plurality of slots. Each slot extends at least partially along one of a plurality of parallel lines running across the ligature strap. The ligature strap contains a carbon fiber. In one embodiment, the ligature strap includes a pair of opposing ends extending between the top edge and the bottom edge, and the carbon fiber is molded into a fixed loop having the opposing ends adjacent each other and forming a frustoconical shape.

Exemplary embodiments are directed to a ligature strap for a mouthpiece. The ligature strap includes a carbon fiber portion and at least one separate flexible strap portion attached to the carbon fiber portion. In one embodiment, the carbon fiber portion is a length of a portion of a frustum of a cone. In one embodiment, the carbon fiber portion is a length of a portion of a cylinder. In one embodiment, the portion of the cylinder includes up to ¾ of a circumference of the cylinder. In one embodiment, the portion of the cylinder includes a gap or space extending along the length and a pair of side edges extending along the length on either side of the gap. In one embodiment, the at least one flexible strap portion is attached to the carbon fiber portion along one of the side edges.

In one embodiment, the ligature strap includes two separate flexible strap portions. Each separate flexible strap portion is attached to the carbon fiber portion along one of the side edges. In one embodiment, the portion of the cylinder of the carbon fiber portion has an interior surface, and the at least one flexible strap is attached to the interior surface. In one embodiment, the portion of the cylinder of the carbon fiber portion has a circular cross-sectional diameter that is less than a mouthpiece diameter of the mouthpiece to which the ligature strap is to be attached.

In one embodiment, the at least one flexible strap includes two layers of flexible strap, and the at least one flexible strap is attached to the carbon fiber portion such that the carbon fiber portion is disposed between the two layers of flexible strap. In one embodiment, the carbon fiber portion includes a top edge, a bottom edge spaced from and parallel to the top edge, two side edges extending between the top edge and the bottom edge along a length of the carbon fiber portion, and a plurality of slots. Each slot extends at least partially along one of a plurality of parallel lines running across the ligature strap parallel to the top edge and the bottom edge. In one embodiment, each slot in the plurality of slots comprises a slot width extends along the length of from about 1 mm to about 2 mm.

Exemplary embodiments are also directed to a ligature strap for a mouthpiece where the ligatures strap includes a carbon fiber portion having a length of a portion of a cylinder with a gap extending along the length and a pair of side edges extending along the length on either side of the gap, and a plurality of slots spaced from each other along the length. Each slot extends at least partially along one of a plurality of parallel lines running across the carbon fiber portion between the pair of side edges. The ligature strap also includes a pair of flexible strap portions. Each flexible strap portion is attached to and extends from the carbon fiber portion along one of the side edges.

In one embodiment, the carbon fiber portion is a length of a portion of a cylinder having an interior surface, and each flexible strap portion is attached to the interior surface of carbon fiber portion along one of the side edges. In one embodiment, each flexible strap portion is a folded strap that forms two layers of flexible strap and is attached to the carbon fiber portion such that the carbon fiber portion is disposed between the two layers of flexible strap. In one embodiment, each flexible strap portion contains a plurality of slits or kerfs extending along the flexible strap. In one embodiment, each flexible strap portion extends over the carbon fiber portion from one of the side edges, partially overlapping the carbon fiber portion.

Exemplary embodiments are also directed to a ligature for a woodwind mouthpiece. The ligature includes a ligature strap, a pair of rods and a closure mechanism. The ligature strap includes a carbon fiber portion having a length of a portion of a cylinder with a gap extending along the length and a pair of side edges extending along the length on either side of the gap and a plurality of slots spaced from each other along the length. Each slot extends at least partially along one of a plurality of parallel lines running across the carbon fiber portion between the pair of side edges. The ligature strap also includes a pair of flexible strap portions. Each flexible strap portion is attached to and extends from the carbon fiber portion along one of the side edges, and each flexible strap portion is folded over to form two layers of flexible strap. Each rod in the pair of rods is disposed between the two layers of one of the flexible strap portions. The closure mechanism passes through each flexible strap portion and each rod to pull the pair of rods and flexible strap portions toward each other.

In one embodiment, the portion of the cylinder includes up to ¾ of a circumference of the cylinder, and the portion of the cylinder of the carbon fiber portion has a circular cross-sectional diameter that is less than a mouthpiece diameter of the mouthpiece to which the ligature is attached. In one embodiment, each flexible strap portion includes a plurality of slits or kerfs extending along the flexible strap around the rod disposed between the two layers of that flexible strap.

DETAILED DESCRIPTION

Exemplary embodiments are directed to ligature straps for mouthpieces and, in particular, to single reed woodwind instrument mouthpieces for use with saxophones and clarinets. Exemplary embodiments are also directed to the ligatures utilizing these ligature straps and the mouthpieces using the ligatures containing the ligature straps. The ligature straps contain arrangements of kerfs, slits and slots running along the ligature straps in parallel lines, for example in the direction of the grain of the fabric in the ligature strap. Suitable material for the ligature straps includes flexible fabrics such as flexible rubberized fabric. In one embodiment, the material for the ligature strap is a carbon fiber material including carbon fiber fabrics, carbon fiber sheets and carbon fiber tubes or tubing. The carbon fiber fabrics and sheets can have a thickness of from about 0.25 mm to about 3.4 mm (0.01 inches to 0.13 inches). In one embodiment, the carbon fiber tubes can have a cross-sectional diameter of up to about 1.5 inches. Suitable diameters for carbon fiber tubes include 1.125 inches, 1.25 inches and 1.5 inches. In one embodiment, the thickness of the carbon fiber in the carbon fiber tubes is up to about 1 mm. In one embodiment, the thickness of the carbon fiber in the carbon fiber tubes is from about 1 mm to about 2 mm. In one embodiment, the ligature incorporates a length of the carbon fiber tube. In one embodiment, the length of the carbon fiber tube is up to about 1 inch. In another embodiment, the length of the carbon fiber tube is up to about 0.75 inches. In another embodiment, the length of the carbon fiber tube is up to about 1.5 inches. In one embodiment, the entire circumference of the carbon fiber tube is used. Alternatively, only a portion of the carbon fiber tube is used. Suitable portions of the carbon fiber tube include, but are not limited to, one half of the carbon fiber tube and about ¾ of the carbon fiber tube. When only a portion of the carbon fiber tube is used, the carbon fiber tube is combined with other materials such as the flexible strap material described herein. In addition to pre-formed tubes, a sheet of carbon fiber material can be used and formed or molded into the desired tubular shape. In one embodiment, the carbon fiber material, and in particular the carbon fiber tube, is a rigid material. While the carbon fiber tube has a degree of flexibility, the carbon fiber tube maintains the circular shape of the tube and will return to the original shape of the tube unless a flexing force is applied. In one embodiment, the ligature strap includes a rough or textured side or face and a smooth side or face opposite the rough side.

Figure 1:
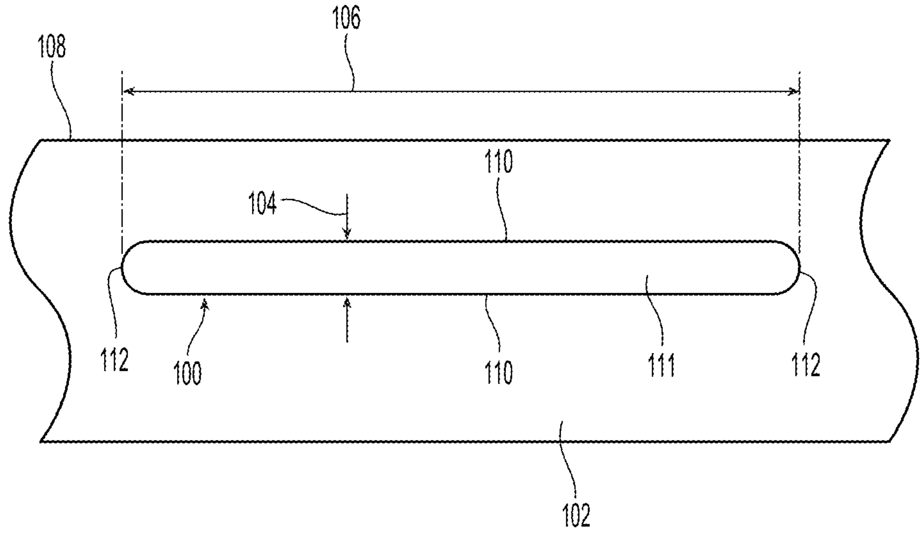
FIG. 1 is a schematic representation of an embodiment of a kerf in a sheet of material.

Referring initially to FIG. 1, as used herein a kerf 100 in a sheet of material 102, e.g., a ligature strap, represents a space or gap in the sheet of material that is created by removing material from the sheet of material such as a ligature strap. Unlike a slit that is cut into a sheet of material using an edge instrument, the kerf defines a very narrow gap or void space 111 that does not contain the sheet of material and that is created by removing a portion of the sheet of material. The removed portion of material passes completely through the sheet of material. Opposing sides of a slit touch and can bind against each other as the ligature strap is folded or formed into a loop. Opposing kerf sides 110, however, are spaced from each other by the gap width 104 of the kerf. Suitable gap widths are up to about 0.004 inches (0.1 mm). In one embodiment, the gap width is up to about 0.01 inches (0.25 mm). Therefore, a given kerf represents a very small gap or void passing completely through the sheet of material. Exemplary embodiments are illustrated and described using kerfs. Other embodiments of the ligature strap can use slits, either in combination with or as an alternative to kerfs in arrangements described using kerfs. A slit also passes through the thickness of the ligature strap and is formed using any suitable method for cutting slits in a sheet of material or ligature strap. In one embodiment, the slits are formed using an edge tool such as a knife or a punch containing a plurality of blades sized and positioned according to the desired arrangement of slits in the ligature strap. The slits, however, are not formed by removing portions of the sheet of material. Therefore, slits do not provide all of the benefits to the ligature strap that are provided using kerfs.

As illustrated, the kerf extends along the sheet of material 102 a given kerf length 106 between opposing kerf ends 112. The kerf length can be a few millimeters or up to 10, 20, 30, 40 or 50 mm. The kerf ends can have any desired shape. Preferably, the kerf ends are rounded or semi-circular. In one embodiment, the kerfs extend along the length following a rounded or curved arc. Alternatively, the kerfs follow a more complex shape along the kerf length, for example, wavy, sinusoidal or zig-zag. Preferably, the kerfs are rectilinear. In one embodiment, each rectilinear kerf is parallel to an edge 108 of the sheet of material.

Any suitable method for removing material from the ligature strap to create the gap defining a kerf or a slot can be used. In one embodiment, the gaps defining the kerfs are cut into the ligature strap using a mechanical cutting instrument such as an edge instrument in a punch or in a press that removes the desired portion of sheet of material as opposed to merely cutting a line in the sheet of material. For example, a plurality of edge instruments or knives sized and arranged in accordance with the arrangement and gap size of kerfs in the ligature strap are placed in a press and are used to cut the desired pattern of kerfs in the ligature strap. Cutting the kerfs using an edge instrument, press or punch is particularly suited for ligatures straps constructed from carbon fiber fabrics, carbon fiber sheets or carbon fiber tubes. In one embodiment, slots are into the carbon fiber fabric, carbon fiber sheet or carbon fiber tube. Preferably, the kerfs are cut into the ligature strap using a laser. In particular, a laser cutting and engraving machine is used. The laser cutting and engraving machine includes a laser and a laser positioning apparatus that holds the laser above a support surface and moves the laser over the support surface in two dimensions. The laser and laser positioning apparatus are in communication with a computing system that receives input on desired shapes of ligature straps, gap sizes of the kerfs and patterns of kerfs, controlling the laser and the laser positioning apparatus to achieve the desired pattern of kerfs. In one embodiment, a sheet material is placed on the support surface and a plurality of ligature straps having the desired pattern of kerfs are cut from the sheet of material.

Exemplary embodiments of ligature straps utilize arrangements of multiple kerfs positioned and spaced along the ligature strap to achieve the desired balance of ligature strap conformity to mouthpieces and reeds and ligature strap structural integrity. A given ligature strap includes a plurality of kerfs. In one embodiment, the kerfs are identical, having the same kerf length. In one embodiment, each kerf has an identical gap width. Alternatively, two or more kerfs in the plurality of kerfs differ in at least one of kerf shape, kerf length and gap width. In one embodiment, kerfs can be used in combination with slits or slots, or slits or slots are used as an alternative to kerfs. In one embodiment, the kerfs are arranged to define a desired pattern across the ligature strap, e.g., a circle, square or unique shape. In one embodiment, the kerfs are arranged to define a plurality of parallel lines running across the ligature strap and to extend along the plurality of parallel lines. Each parallel line includes at least one kerf, and at least one parallel line includes at least two kerfs. In one embodiment, each parallel line includes at least two kerfs. In one embodiment, at least one parallel line includes three or more kerfs. In another embodiment, each parallel line includes more than two kerfs, e.g. three or more kerfs. In one embodiment, the parallel lines are parallel rectilinear lines.

Figure 2:
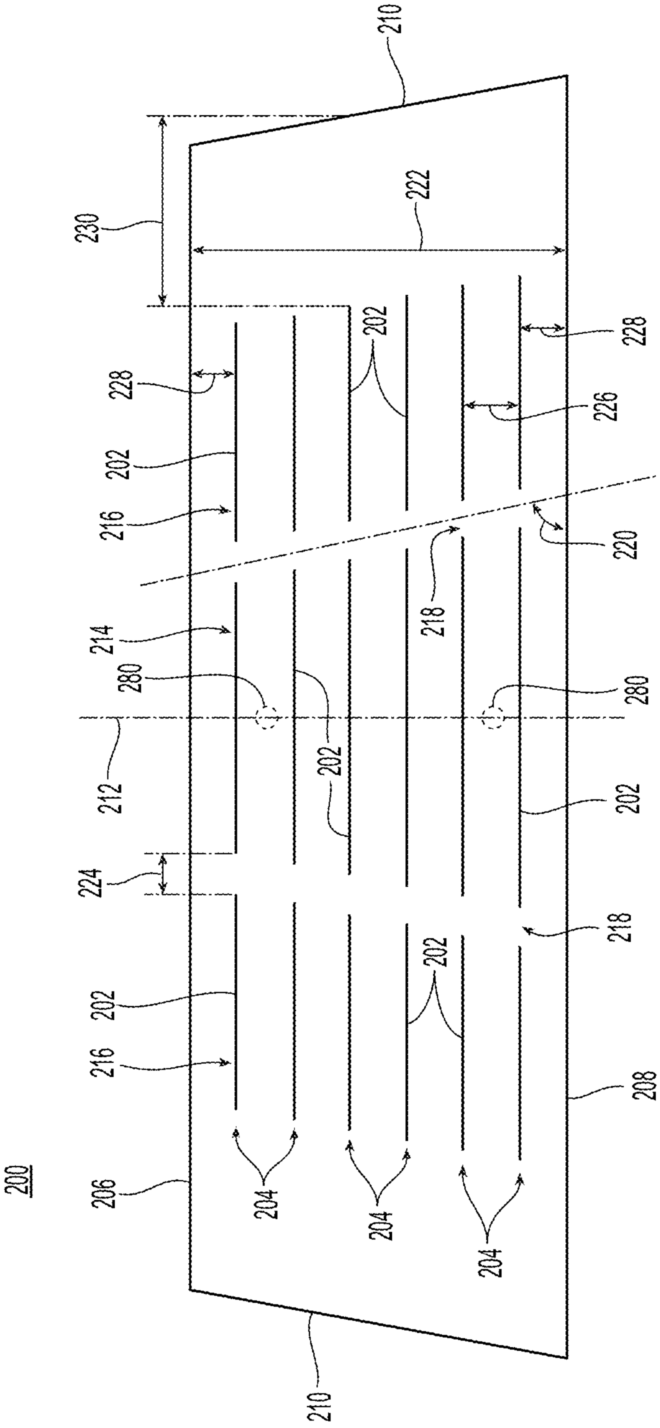
FIG. 2 is a plan view of an embodiment of a ligature strap.

Referring now to FIG. 2, an embodiment of a ligature strap 200 is illustrated. Suitable materials for the ligature strap include, but are not limited to polymers, elastomers, metals and combinations thereof. Preferably, the flexible strap is a rubberized fabric. In one embodiment, the flexible strap has a thickness of less than about ⅛ of an inch, for example about 1/16 of an inch and preferably about 1/32 of an inch. In one embodiment, the flexible strap has a thickness of about 0.01 inches. Therefore, the thickness of the flexible strap is consistent with the thickness of conventional metal ligatures that are provided with the single-reed woodwind mouthpieces. The ligature strap includes a rough side and a smooth side opposite the rough side. When the ligature strap is formed into a loop to fit around a mouthpiece and reed, the smooth side is located on the outside of the loop, and the rough side is located on the inside or interior of the loop to contact the mouthpiece and the reed.

The ligature strap includes a plurality of kerfs 202. All arrangements of kerfs illustrated in the various embodiments of the ligature straps described herein are kerfs having a gap created by removing ligature strap material. Alternatively, embodiments with the same arrangements can utilize slits or slots cut into the ligature strap or combinations of slits, slots and kerfs. Each kerf extends at least partially along one of a plurality of parallel lines 204 running across the ligature strap. As illustrated, the kerfs extend along six parallel lines. The parallel lines are parallel rectilinear lines, and the parallel lines are parallel to at least one of the top edge 206 and the bottom edge 208 of the ligature strap. Preferably, the parallel lines are parallel to both the top edge and the bottom edge. As used herein, the top edge corresponds to the top of the ligature strap or ligature, and the bottom edge corresponds to the bottom of the ligature strap or ligature. When the ligature is used to secure a reed to a mouthpiece, the bottom of the ligature is closest to the heel end of the reed, and the top of the ligature is closest to the user of the mouthpiece. The ligature strap also includes a pair of opposing ends 210. The opposing ends are not parallel to each other and are not perpendicular to either the top edge of the bottom edge. In one embodiment, the ligature strap has a trapezoidal shape.

A subset of the plurality of kerfs extends along each parallel line. In one embodiment, each subset includes three kerfs. The three kerfs in each subset extend along a common parallel line in the plurality of parallel lines, and adjacent kerfs along the common parallel line are spaced from each other along that parallel line by a given adjacent kerf spacing 224. In one embodiment, adjacent kerfs along the common parallel line are spaced from each other by the adjacent kerf spacing having a distance of at least about 0.1 inches (2.5 mm) measured along the parallel line between the ends of adjacent kerfs. In one embodiment, the spacing is from about 2.5 mm to about 4 mm. In one embodiment, the spacing is less than 4 mm or less than 3 mm. In addition, the spacing 226 between kerfs across parallel lines, the spacing 228 between the kerfs in any parallel line and one of the edges and the spacing 230 between any kerf in any parallel line and one of the ends 210 is at least about inches (2.5 mm). In one embodiment, the spacing is from about 2.5 mm to about 4 mm. In one embodiment, the spacing is less than 4 mm or less than 3 mm. This spacing maintains the desired structurally integrity in the web of ligature strap material while facilitating increased coverage of the ligature strap by kerfs.

The kerfs across the subsets of kerfs are aligned to define three groups or regions of kerfs extending across the ligature strap width 222. The three regions include a central or reed engagement region 214 and a pair of side regions 216 located on either side of the reed engagement region. Therefore, when the ligature strap is wrapped around the mouthpiece and reed, the kerfs in the central region extend over the reed. In one embodiment, the kerfs in each group have the same kerf length. In another embodiment, the kerfs in each group have a different length. In addition, the kerfs in each region can be aligned across the width of the ligature strap or can be offset or staggered. As illustrated, the kerf length of the kerfs in the reed engagement region increases from the top edge to the bottom edge. This yields a trapezoidal shape for the kerfs in the reed engagement region. The kerfs in each side region are offset from each other in a stair-step arrangement moving from the bottom edge to the top edge. In one embodiment, the kerfs in each one of the side regions have equal kerf lengths; however, the kerfs are offset across the width of the ligature strap, following one of the continuous lines of ligature strap.

Given the arrangement and size of the kerfs in each region, the spaces between adjacent kerfs in the reed engagement region and the side regions are aligned across the plurality of parallel lines to define two continuous lines of ligature strap 218 extending completely from the top edge to the bottom edge. These two continuous lines of ligature strap intersect the top edge and bottom edge at an angle 220 of from about 72° to about 90°. In one embodiment, the two continuous lines of ligature strap are parallel to the respective ends 210 of the ligature strap. Each continuous line of ligature strap provides a continuous web of ligature strap material that maintains the desired structural integrity and strength to the ligature strap. In one embodiment, the ligature strap is symmetric about a center line 212 passing across the width of the ligature strap. In one embodiment, the ligature strap includes fastening holes 280 centered on the center line. As illustrated, the ligatures strap includes a pair of fastening holes. The fastener holes are sized to accept fasteners such as rivets that are used to hold structures to the ligature strap such as metal cradles and weights.

Figure 3:
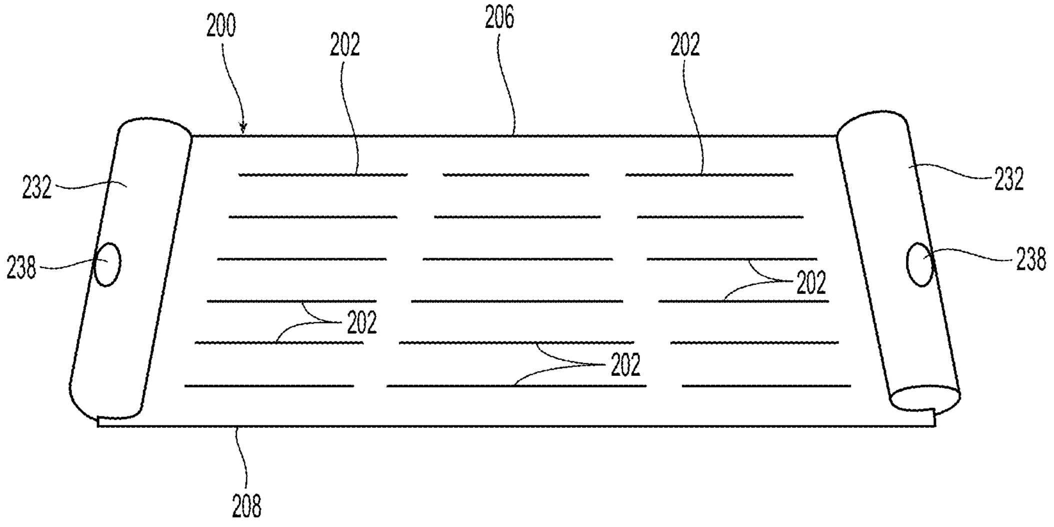
FIG. 3 is a plan view of the embodiment of the ligature strap of FIG. 2 with cylindrical rods attached to the ends.

Referring now to FIG. 3, a pair of rigid bars 232 are attached to the ligature strap 200, one on each end. Suitable materials for the rigid bars include metals, plastics, elastomers, ceramics and combinations thereof. Suitable metals include brass, for example nickel or gold-plated brass, and stainless steel. Each rigid bar 232 is attached to one of the opposing ends of the ligature strap and extends between the top edge 206 and the bottom edge 208. In one embodiment, each rigid bar is aligned along each end to intersect each one of the edges at an angle other than 90° to create a frustoconical shaped loop that accommodates a tapered mouthpiece. In one embodiment, each rigid bar is a cylindrical rod having a diameter of about ¼ of an inch.

Figure 4:
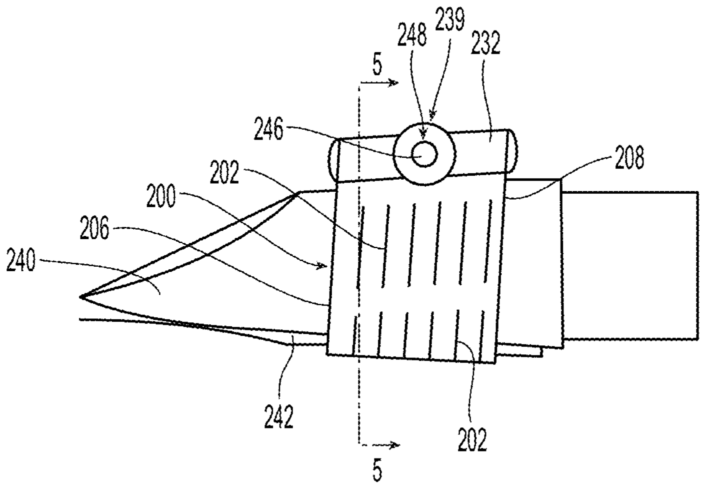
FIG. 4 is a side view of an embodiment of a ligature containing the ligature strap of FIG. 2 attached to a mouthpiece and holding a reed.
Figure 5:
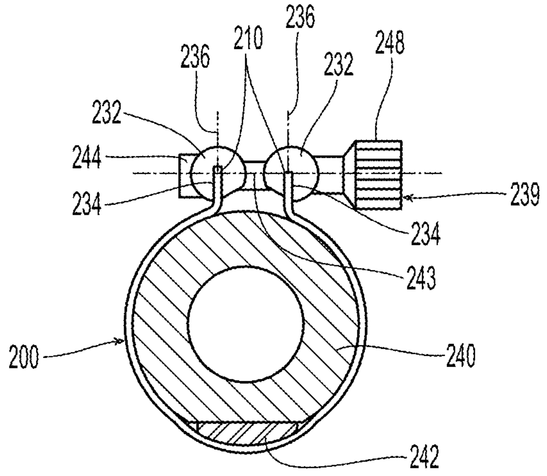
FIG. 5 is a view through line 5-5 of FIG. 4.

Referring to FIGS. 4 and 5, to attach each rigid bar 232 to an end 210 of the flexible ligature strap, each cylindrical rod includes a slot 234 extending partially into the cylindrical rod and running along a length of the cylindrical rod. A corresponding end 210 of the single layer ligature strap is disposed and anchored in each slot. In one embodiment, each slot 234 extends diametrically into the cylindrical rod along a first diameter 236.

In one embodiment, each cylindrical rod 232 includes at least one hole 238 (FIG. 3) that passes completely through the cylindrical rod. The holes 238 accommodate the closure mechanism 239 of the ligature that draws the rigid bars and, therefore, the ends of the flexible strap together to tighten the ligature around the mouthpiece 240 and the reed 242. In one embodiment, the closure mechanism is considered part of the ligature. Although various closure mechanisms, e.g., clamps and threaded fasteners, can be used, preferably, the closure mechanism is a threaded rod 243 that is passed through the holes 238 in each rigid cylindrical bar. The threaded rod 243 includes a head 244 that is larger than the diameter of the hole and threads along the distal end 246 to which a threaded thumbscrew or thumbnut 248 is attached. By turning the thumbnut in the proper direction, the rigid bars are drawn together, applying a force that is decomposed into the constrictive force and perpendicular force and that tightens the ligature. In one embodiment, each cylindrical rod 232 includes notches located adjacent each hole. These notches accommodate the heads 244 of the threaded rod 243 and prevent the threaded rod from spinning when the thumbnuts are tightened. The resulting ligature holds the reed to the mouthpiece with the kerfs 202 in the reed engagement region passing completely over the reed.

Figure 6:
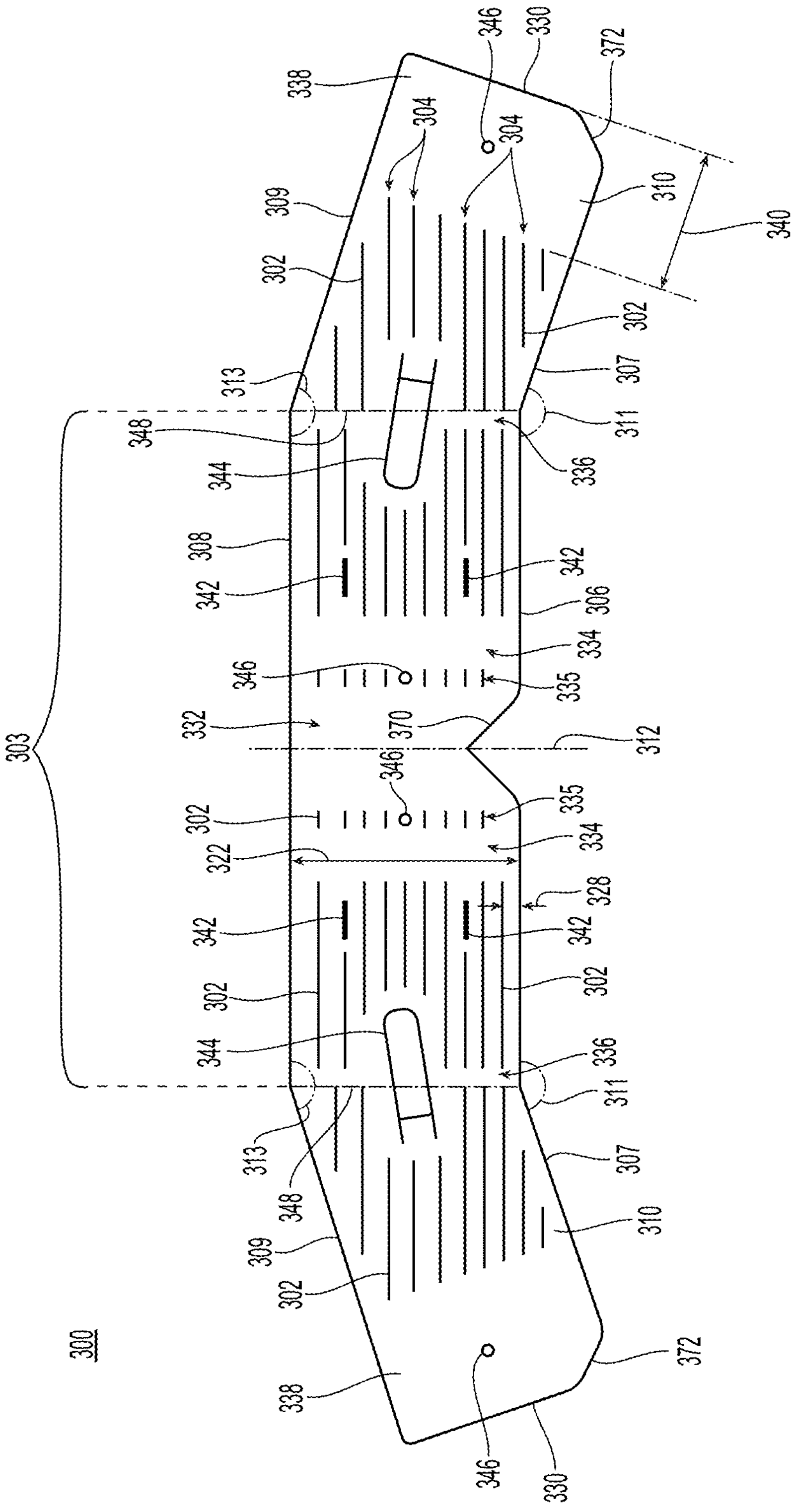
FIG. 6 is a plan view of another embodiment of a ligature strap.

Referring now to FIG. 6, another embodiment of a ligature strap 300 is illustrated. Suitable materials for the ligature strap are the same as those described above. The ligature strap includes a rough side and a smooth side opposite the rough side.

The ligature strap includes a plurality of kerfs 302. Each kerf extends at least partially along one of a plurality of parallel lines 304 running across the ligature strap. As illustrated, the kerfs extend along eleven parallel lines. The parallel lines are parallel rectilinear lines. The ligature strap includes a central portion 303 having a top edge 306 and a bottom edge 308 spaced from and parallel to the top edge.

The top edge corresponds to the top of the ligature strap or ligature, and the bottom edge corresponds to the bottom of the ligature strap or ligature. When the ligature is used to secure a reed to a mouthpiece, the bottom of the ligature is closest to the heel end of the reed, and the top of the ligature is closest to the user of the mouthpiece. The plurality of parallel lines extends parallel to at least one of the top edge and the bottom edge. Preferably, the parallel lines are parallel to both the top edge and the bottom edge.

Each kerf has a length measured along one of the parallel lines, and the plurality of kerfs include at least two different lengths. The overall length of the ligature strap can be varied based upon the outer circumference of the mouthpiece to which the resulting ligature is attached, i.e., a greater circumference corresponds to a longer ligature strap. Variations in the overall length of the ligature strap yield variations in the lengths of the individual kerfs, even when the number, location and arrangement of the kerfs is identical for a given style or arrangement of ligature strap. In addition, changes in the overall length and width of the ligature strap can result in the elimination of certain kerfs given spacing limitations.

A pair of end flaps 310 extend from opposite ends of the central portion. Each end flap includes an end flap top edge 307 extending from the top edge and an end flap bottom edge 309 extending from the bottom edge. The end flap top edge extends from the top edge at a top edge angle 311 that is greater than 90° and less than 180°, and the end flap bottom edge extends from the bottom edge at a bottom edge angle 313 that is greater than 90° and less than 180°. The kerfs extend along the plurality of parallel lines in the central portion and the pair of end flaps. In one embodiment, the plurality of parallel lines extends across the central portion and the pair of end flaps. Therefore, the parallel lines in the plurality of parallel lines are not parallel to the end flap top edge and end flap bottom edge. Alternatively, the ligature strap includes a set of end flap parallel lines that are separate from the parallel lines running through the central portion. The end flap parallel lines are parallel to the end flap top surface and the end flat bottom surface. Therefore, the end flap parallel lines are divergent from the parallel lines in the central portion at angles related to the angles at which the end flaps extend from the central portion.

A subset of the plurality of kerfs extends along each parallel line. The number of kerfs in each subset varies among the plurality of parallel lines. In one embodiment, each subset includes at least two kerfs. Adjacent kerfs along the common line are spaced from each other. In one embodiment, adjacent kerfs along the common line are spaced from each other by a distance of at least about 0.1 inches (2.5 to 2.54 mm). In one embodiment, the spacing is from about 2.5 mm to about 4 mm. In one embodiment, the spacing is less than 4 mm or less than 3 mm. In general, the spacing between any kerf and any other kerf, edge 328, end or other hole or passage is at least about 0.1 inches (2.5 to 2.54 mm). In one embodiment, the spacing is from about 2.5 mm to about 4 mm. In one embodiment, the spacing is less than 4 mm or less than 3 mm. This minimum distance between features in the ligature strap provides a sufficient amount of ligature strap material to maintain the desired strength and integrity in the ligature strap.

The kerfs are aligned across the parallel lines to define a plurality of groups or regions of kerfs extending across the ligature strap width 322. A given region includes at least two kerfs disposed in two separate parallel lines. In general, a given region represents a group of kerfs disposed in multiple parallel lines that are spaced from each other across the ligature strap width. The kerfs in each group or region can all have the same length or can have different lengths. Each region is separate from the other regions moving across the ligature strap. As illustrated, the ligature strap includes six groups or regions of kerfs. The six groups or regions of kerfs are spaced from each other and from the end flap ends 330. The spacings between adjacent kerfs in each one of the plurality of lines are aligned across the plurality of parallel lines to define a plurality of continuous lines or webs of ligature strap extending completely from the top edge to the bottom edge in the central portion or from the end flap top edge to the end flap bottom edge in each of the end flaps. Each continuous line of ligature strap provides a continuous web of ligature strap material that maintains the desired structural integrity and strength to the ligature strap. In addition, these continuous lines of ligature strap provide gluing surfaces, labeling or printing surfaces, rod engagement regions and reed engagement surfaces. The continuous lines of ligature strap intersect the top edge and bottom edge or end flap top edge and end flap bottom edge at an angle of from about 72° to about 90°. As illustrated, the continuous lines of ligature strap intersect the top edge and bottom edge or end flap top edge and end flap bottom edge at an angle of about 90°.

As illustrated, the spaces are aligned to define seven continuous lines of ligature strap. The seven continuous lines of ligature strap include a central line of ligature strap 332. The central line of ligature strap is centered on a center line 312 passing across the width of the ligature strap. In one embodiment, the ligature strap is symmetric about the center line 312 passing across the width of the ligature strap. The central line of ligature strap is configured to engage the heel end of the reed. In one embodiment, the heel end of the reed is spaced from the center line as the ligature strap extends away from the heel end of the reed at the center line, and the edges of the heel end of the reed engage the central line of ligature strap at points spaced from the center line. The continuous lines of ligature strap also include a pair of glue lines 334 running across the width of the ligature strap. Each glue line is spaced from the central line by a row or region of kerfs 335. The continuous lines of ligature strap include a pair of rod engagement lines 336. Each rod engagement line is located between the central portion and one of the end flaps. Therefore, the kerfs do not extend completely around a cylindrical rod placed between the end flap and the central portion when the end flap is folded onto the central portion. Each rod engagement line contacts the enclosed cylindrical rod along the length of the cylindrical rod.

The continuous lines of strap also include a pair of end flap lines 338. Each end flap line extends in from one of the end flap ends a given end flap line distance 340. Each end flap line distance is sufficient cover one of the glue lines, the row or region of kerfs and half the central line of ligature strap. Therefore, each end flap line provides a corresponding glue surface for one of the glue lines. In one embodiment, each end flap line is not attached to the central line of ligature strap and provides a space or pocket between the central line of ligature strap and the end flap line. This space or pocket can be used to hold metal cradles or weights attached to the central line of ligature strap such that the end flap lines are located between the cradles or weights and the heel end of the reed. Preferably, the pair of glue lines 334 and the central line of ligature strap 332 are used as adhesive surfaces. The end flap ends 330 upon folding of the end flaps over the central portion meet along the center line 312 or a spaced slightly from each other on either side of the center line. Two glue lines are defined between the central portion and each end flap. There is no pocket between either end flap and the central portion. These two glue lines make the area of the ligature strap on either side of the center line rigid. Therefore, the folded ligature strap can be formed into a point or ridge along the center line, and the heel end of the reed contacts the folded ligature strap along the edges of the heel end of the reed. Each end flap line, on a surface opposite the surface contacting the glue line and central line of ligature strap, provides a labeling area in which identifying information for the ligature strap and ligature can be printed.

In one embodiment, the ligature strap includes at least one kerf 342 with a gap having an enlarged gap width. The enlarged gap width is greater than the gap width of the other kerfs 302, i.e., up to about 0.004 inches. In one embodiment, the enlarged gap width is about 0.01 inches. As illustrated, the ligature strap includes four kerfs with gaps having the enlarged gap widths. Kerfs with enlarged gap widths can be located along the parallel lines containing other kerfs or along parallel lines containing only kerfs with enlarged gap widths. In one embodiment, the kerfs with enlarged gap widths are used to attach emblems to the ligature strap.

The ligature strap includes a plurality of fixturing holes or fastener holes 346 passing completely through the ligature strap. As used herein, a fastener holes accept fasteners that secure structures to the ligature strap or that hold the ligature strap in a folded position. Fixturing holes are holes used to align overlapping portions of folded ligature strap for proper alignment of glue lines. Fasteners are not placed in fixturing holes. In one embodiment, each fixturing or fastener hole is a circular hole. The fixturing or fastener holes are arranged in pairs that align when the end flaps are folded over the central portion. In one embodiment, a fastener, e.g., a rivet, is then inserted through the aligned pair of fastener holes to secure the end flaps in the folded position. Alternatively, a rivet or other fastener is not used, and the fixturing holes align the glue lines in the end flaps and central portion to glue the end flaps to the central portion. Therefore, the fixturing holes are used to align the folded end flaps over the central portion properly for gluing. The ligature strap includes a pair of passages 344 extending completely through the ligature strap. In one embodiment, each passage extends from the central portion to one of the end flaps. The passages provided access to the cylindrical rods contained between the end flaps and the central portion when the end flaps are folded over onto the central portion. This access is used to for the ligature closure mechanism.

The ligature strap includes a pair of fold lines 348. Each fold line is disposed between the central portion and one of the end flaps and is a continuous line of ligature strap extending completely from the top edge to the bottom edge. In one embodiment, each fold line runs along one of the rod engagement lines of continuous ligature strap. A rod 350, for example a cylindrical rod, is placed along each rod engagement line, and each end flap is folded over one of the fold lines. While illustrated as a cylindrical rod, other geometries of rod can be used. For example, the rod can have a plurality of flat sides, including three flat sides, triangular cross-section, four flat sides, rectangular or square cross section, for more than four flat sides. The flat sides can vary in width, and the angles between adjacent flat sides can vary. In one embodiment, a combination of flat and curved sides can be used.

Figure 7:
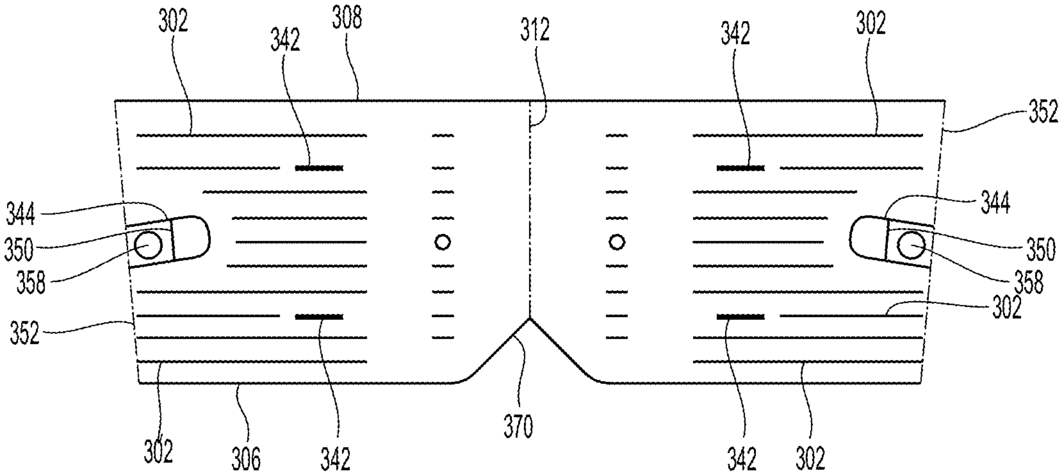
FIG. 7 is a view of the exterior side of the ligature strap of FIG. 6 with the ends flaps folded over the central portion.

The top edge is aligned with each end flap top edge, and the bottom edge is aligned with each end flap bottom edge. Referring to FIG. 7, an exterior view of the resulting folded ligature strap containing the cylindrical rods 350 is provided. The cylindrical rods 350 are accessible through the passages 344. The folded ligature strap includes opposing divergent ends 352 and a trapezoidal shape. This produces a frustoconical shape when the divergent ends are brought together to form the ligature. The kerfs do not extend completely around the divergent ends.

Figure 8:
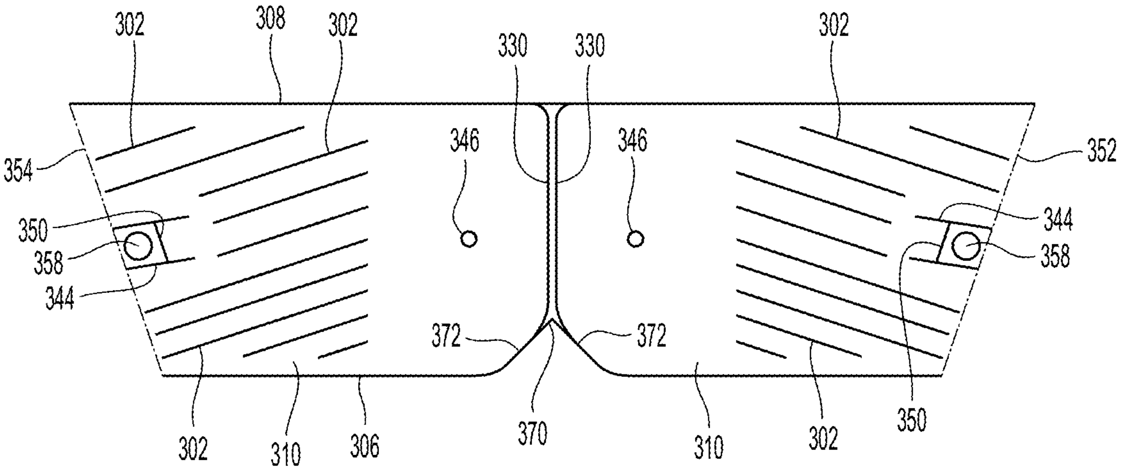
FIG. 8 is a view of the interior side of the ligature strap of FIG. 6 with the ends flaps folded over the central portion.

Referring now to FIG. 8, a view of the interior of the ligature strap with the end flaps folded over the central portion is illustrated. This view forms the interior of the resulting ligature. The kerfs 302 disposed in the end flaps after folding are divergent from the top edge 306 and the bottom edge 308 and, therefore, from kerfs disposed in the central portion that are exposed on the exterior of the ligature. In one embodiment, the divergent kerfs are generally perpendicular to the divergent ends of the folded ligature strap. The divergent, interior kerfs engage the mouthpiece at an angle. When folded, the rough side of the ligature strap is disposed on both the exterior (FIG. 7) and the interior (FIG. 8) of the folded ligature strap. The smooth side of the ligature strap is not exposed except for a small portion of the ligature strap that is exposed when the end flap ends 330 do not meet along the center line (FIG. 8).

Figure 9:
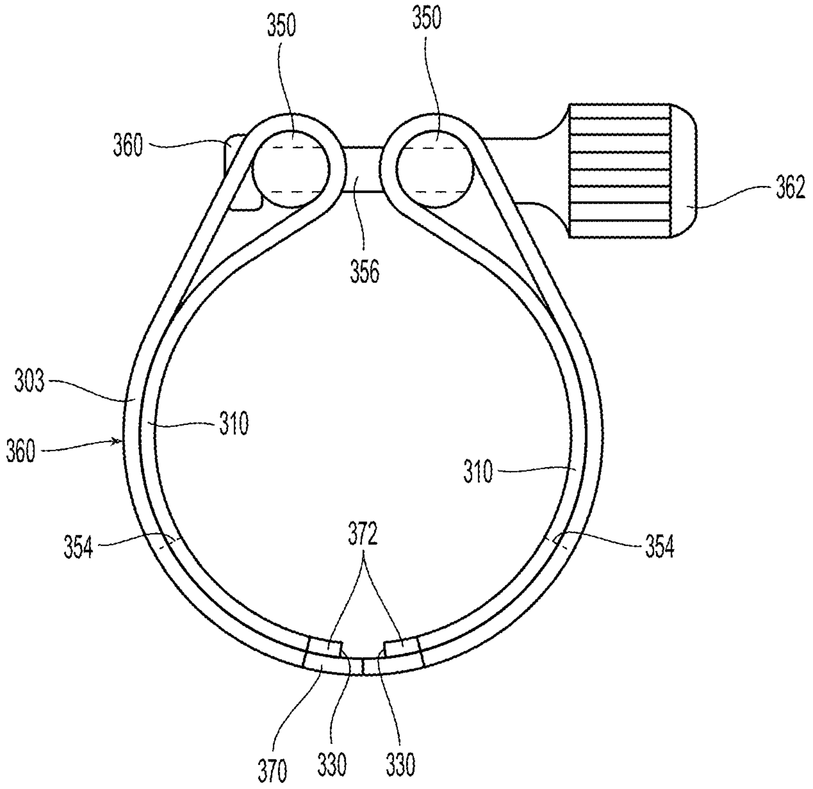
FIG. 9 is an end view of a ligature containing the ligature strap of FIG. 6.

Referring to FIG. 9, the ligature strap is formed into a ligature that includes a loop 360 sized to encircle a mouthpiece. Adhesive is used to secure the end flap regions to the adhesive lines. In one embodiment, rivets 354 or other suitable fasteners are also placed through the aligned fastener holes. The cylindrical rods 350 are contained between the central portion 303 and one of the end flaps 310. The cylindrical rods function as a component of the closure mechanism that closes the ligature strap and forms the loop of the ligature. The closure mechanism also includes a threaded rod 356 that is passed through the holes 358 in the cylindrical rod that are with and made accessible by the passages 344 in the ligature strap. The threaded rod has a head 360 that is larger than the diameter of the holes 358 in the cylindrical rods and threads along the distal end opposite the head to which a threaded thumbscrew or thumbnut 362 is attached. By turning the thumb screw in the proper direction, the rigid bars are drawn together, closing the loop and applying a force that is decomposed into the constrictive force that tightens the ligature around a mouthpiece and reed.

In one embodiment, the ligature strap includes a notch 370 extending into the ligature strap from the top edge 306 toward the bottom edge 308. In one embodiment, the notch is centered on the center line of the ligature strap. Suitable shapes for the notch include curved or “U” shapes and “V” shaped notches. In one embodiment, the notch is located in the continuous line of ligature strap centered on the ligature strap. In one embodiment, each end flap includes a relieved corner 372 corresponding to the size and shape of the notch. The relived corners align with the notch when the end flaps are folded over the central portion. The notch directs the constrictive force of the ligature toward the bottom edge of the ligature strap and away from the top edge. In addition, the notch increases the distance from the end of the reed opposite the heel end, i.e., the tapered end of the reed, and the ligature strap. The notch can be included in any embodiment of the ligature strap illustrated and discussed herein.

Figure 10:
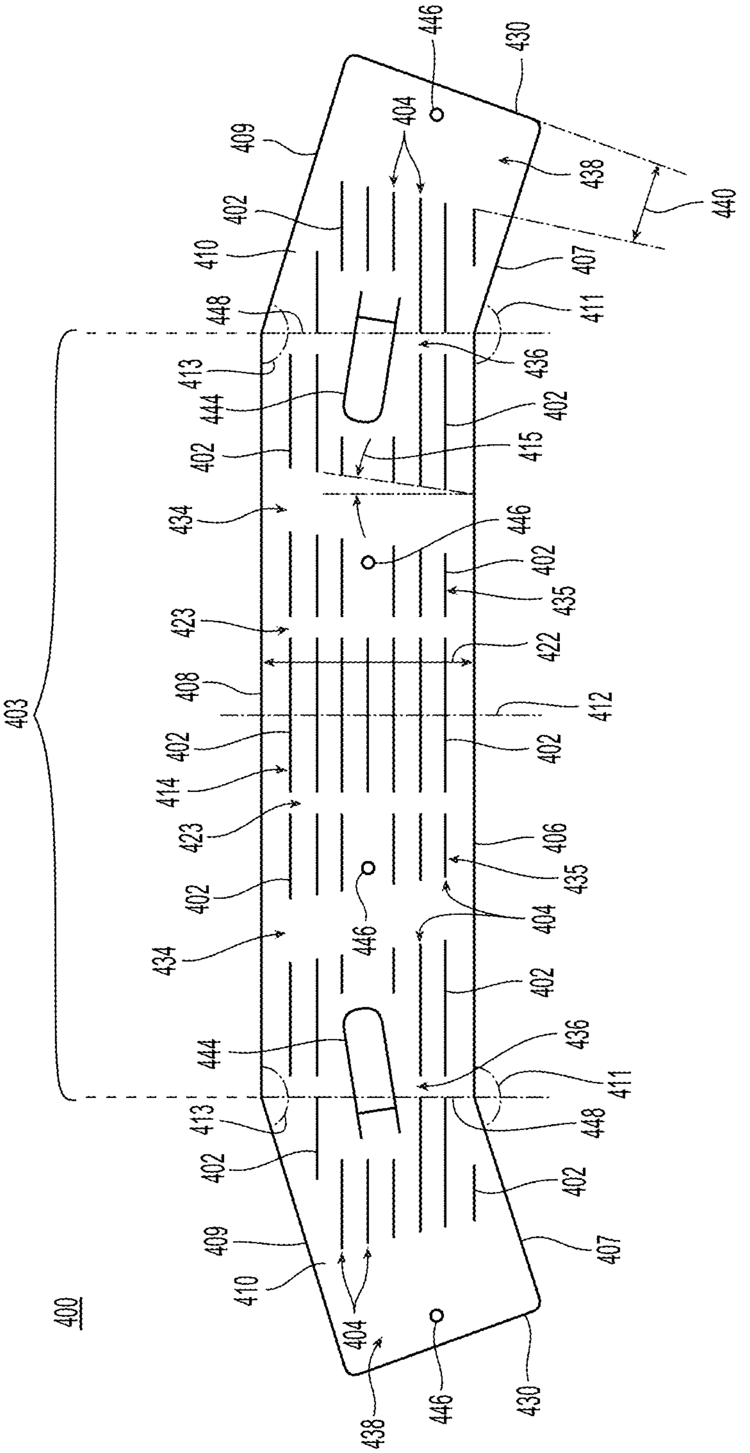
FIG. 10 is a plan view of another embodiment of a ligature strap.

The locations and arrangements of the kerfs and spaces between the kerfs vary depending on the application of the ligature strap, the type of mouthpiece and additional features included in the ligature, e.g., weights and cradles. Referring to FIG. 10, in another embodiment of a ligature strap 400 is illustrated. Suitable materials for the ligature strap are the same as those described above. The ligature strap includes two sides. The ligature strap includes a rough side and a smooth side opposite the rough side.

The ligature strap includes a plurality of kerfs 402. Each kerf extends at least partially along one of a plurality of parallel lines 404 running across the ligature strap. Suitable gap width for the kerfs are up to about 0.004 inches. As illustrated, the kerfs extend along eight parallel lines. Preferably, the parallel lines are parallel rectilinear lines. The ligature strap includes a central portion 403 having a top edge 406 and a bottom edge 408 spaced from and parallel to the top edge. The top edge corresponds to the top of the ligature strap or ligature, and the bottom edge corresponds to the bottom of the ligature strap or ligature. When the ligature is used to secure a reed to a mouthpiece, the bottom of the ligature is closest to the heel end of the reed, and the top of the ligature is closest to the user of the mouthpiece. The plurality of parallel lines extends parallel to at least one of the top edge and the bottom edge. Preferably, the parallel lines are parallel to both the top edge and the bottom edge.

Each kerf has a length measured along one of the parallel lines, and the plurality of kerfs include at least two different lengths. The overall length of the ligature strap can be varied based upon the outer circumference of the mouthpiece to which the resulting ligature is attached, i.e., a greater circumference corresponds to a longer ligature strap. Variations in the overall length of the ligature strap yield variations in the lengths of the individual kerfs, even when the number and arrangement of the kerfs is identical for a given style or arrangement of ligature strap. In addition, changes in the overall length of the ligature strap can result in the elimination of certain kerfs along one or more of the parallel lines given spacing limitations.

A pair of end flaps 410 extend from opposite ends of the central portion. Each end flap includes an end flap top edge 407 extending from the top edge and an end flap bottom edge 409 extending from the bottom edge. The end flap top edge extends from the top edge at a top edge angle 411 that is greater than 90° and less than 180°, and the end flap bottom edge extends from the bottom edge at a bottom edge angle 413 that is greater than 90° and less than 180°. The lengths of the end flaps and the angle at which each end flap extends from the central portion of the ligature strap can vary among the various arrangements and embodiments of the ligature strap.

The kerfs extend along the plurality of parallel lines in the central portion and the pair of end flaps. In one embodiment, the parallel lines in the plurality of parallel lines are common to the central portion and the end flaps and extend across the central portion and the pair of end flaps. Therefore, the parallel lines in the plurality of parallel lines are not parallel to the end flap top edge and end flap bottom edge. Alternatively, the ligature strap includes a set of end flap parallel lines that are separate from and divergent to the parallel lines running through the central portion. The end flap parallel lines are parallel to the end flap top surface and the end flat bottom surface.

A subset of the plurality of kerfs extends along each parallel line. The number of kerfs in each subset varies among the plurality of parallel lines. In one embodiment, each subset includes at least two kerfs. In one embodiment, at least one subset includes at least three kerfs. In one embodiment, a plurality of subsets includes three or more kerfs. Adjacent kerfs along the common line are spaced from each other. In one embodiment, adjacent kerfs along the common line are spaced from each other by a distance of at least about 0.1 inches (2.5 to 2.54 mm). In one embodiment, the spacing is from about 2.5 mm to about 4 mm. In one embodiment, the spacing is less than 4 mm or less than 3 mm. In general, the spacing between any kerf and any other kerf, edge end or other hole or passage is at least about 0.1 inches (2.5 to 2.54 mm). In one embodiment, the spacing is from about 2.5 mm to about 4 mm. In one embodiment, the spacing is less than 4 mm or less than 3 mm. This minimum distance between features in the ligature strap provides a sufficient amount of ligature strap material to maintain the desired strength and integrity in the ligature strap.

The kerfs across the subsets of kerfs are aligned to define a plurality of groups or regions of kerfs extending across the ligature strap width 422, i.e., a region with a group of parallel kerfs spaced from each other across the ligature strap width. The kerfs in each group or region can all have the same length or can have different lengths. As illustrated, the ligature strap includes seven groups or regions of kerfs. These seven regions include a central kerf region 414 centered on a center line 412 of the ligature strap. In one embodiment, the ligature strap including all kerfs and other structures of the ligature strap is symmetric about the center line 412 passing across the width of the ligature strap. The central kerf region includes a group of kerfs across seven of the eight parallel lines, and each kerf in the group of kerfs has the same length along the parallel line. The kerfs will wrap around the heel end of a reed when the ligature containing the ligature strap is used to secure the reed to a mouthpiece.

The seven groups or regions of kerfs are spaced from each other along the ligature strap and from the end flap ends 430. The spacings between adjacent kerfs in each one of the plurality of lines are aligned across the plurality of parallel lines and ligature strap width 422 to define a plurality of continuous lines or webs of ligature strap extending completely from the top edge to the bottom edge in the central portion or from the end flap top edge to the end flap bottom edge in each of the end flaps. Each continuous line of ligature strap provides a continuous web of ligature strap material across the entire width that maintains the desired structural integrity and strength to the ligature strap. In addition, these continuous lines of ligature strap provide gluing surfaces, labeling or printing surfaces, cylindrical rod engagement surfaces and reed engagement surfaces. The continuous lines of ligature strap intersect the top edge and bottom edge or end flap top edge and end flap bottom edge at an angle of from about 72° to about 90°.

As illustrated, the spaces are aligned to define eight continuous lines of ligature strap. The eight continuous lines of ligature strap include a pair of central lines of ligature strap 423 disposed on either side of the central kerf region. Each central line of ligature strap passes across the width of the ligature strap and extends perpendicular to the top edge and the bottom edge of the central portion of the ligature strap. In one embodiment, each central line of ligature strap is configured to engage a corresponding edge of the heel end of the reed. The continuous lines of ligature strap also include a pair of glue lines 434 running across the width of the ligature strap. Each glue line is spaced from the one of the central lines by a row of kerfs 435. Each glue line extends between the top edge and the bottom edge at an angle 415 from a line running perpendicular to the width of the ligature strap of up to about 18°.

The continuous lines of ligature strap include a pair of rod engagement lines 436. Each rod engagement line is located between the central portion and one of the end flaps. Therefore, the kerfs do not extend completely around a cylindrical rod placed between the end flap and the central portion when the end flap is folded onto the central portion. Each rod engagement line contacts the enclosed cylindrical rod along the length of the cylindrical rod.

The continuous lines of strap also include a pair of end flap lines 438. Each end flap line extends in from one of the end flap ends a given end flap line distance 440 that increases from the end flap top surface to the end flap bottom surface, accommodating the angle of one of the glue or adhesive lines. Each end flap line distance is sufficient cover one of the glue lines. Therefore, each end flap line provides a corresponding glue surface for one of the glue lines. Each end flap line, on a surface opposite the surface contacting the glue line, provides a labeling area on which identifying information for the ligature strap and ligature can be printed. Alternatively, the identifying information be added using other labeling methods including affixing a pre-printed label or engraving.

The ligature strap includes a plurality of fixturing holes 446 passing completely through the ligature strap. In one embodiment, each fixturing hole is a circular hole. The fixturing holes are arranged in pairs that align when the end flaps are folded over the central portion. The alignment of the fixturing holes provide for propose alignment of the glue lines for securing the folded end flaps to the central portion. The ligature strap includes a pair of passages 444 extending completely through the ligature strap. In one embodiment, each passage extends from the central portion to one of the end flaps. The passages provide access to the cylindrical rods contained between the end flaps and the central portion when the end flaps are folded over onto the central portion. This access is used for the ligature closure mechanism.

The ligature strap includes a pair of fold lines 448. Each fold line is disposed between the central portion and one of the end flaps and corresponds to a continuous line of ligature strap extending completely from the top edge to the bottom edge. In one embodiment, each fold line runs along one of the rod engagement lines of continuous ligature strap. When folded, the smooth side of the ligature strap is disposed on both the exterior and the interior of the folded ligature strap. The end flap ends 430, however, do not extend to the center line 412 when folded, and the rough side of the ligature strap in the area of the central kerf region 414, the central lines of ligature strap 423 and a portion of the rows of kerfs 435 is exposed to the heel end of the reed.

As described above, a rod is placed along each rod engagement line, and each end flap is folded over one of the fold lines. The top edge is aligned with each end flap top edge, and the bottom edge is aligned with each end flap bottom edge. This forms the ligature with the divergent ends into a loop for attachment to a mouthpiece. The loop is secured to the mouthpiece and reed using the cylindrical rod and attachment mechanisms as described herein. In addition, the kerfs in the end flaps, after folding the end flaps over the central portion, are divergent from the top edge and bottom edge of the ligature strap.

Figure 11:
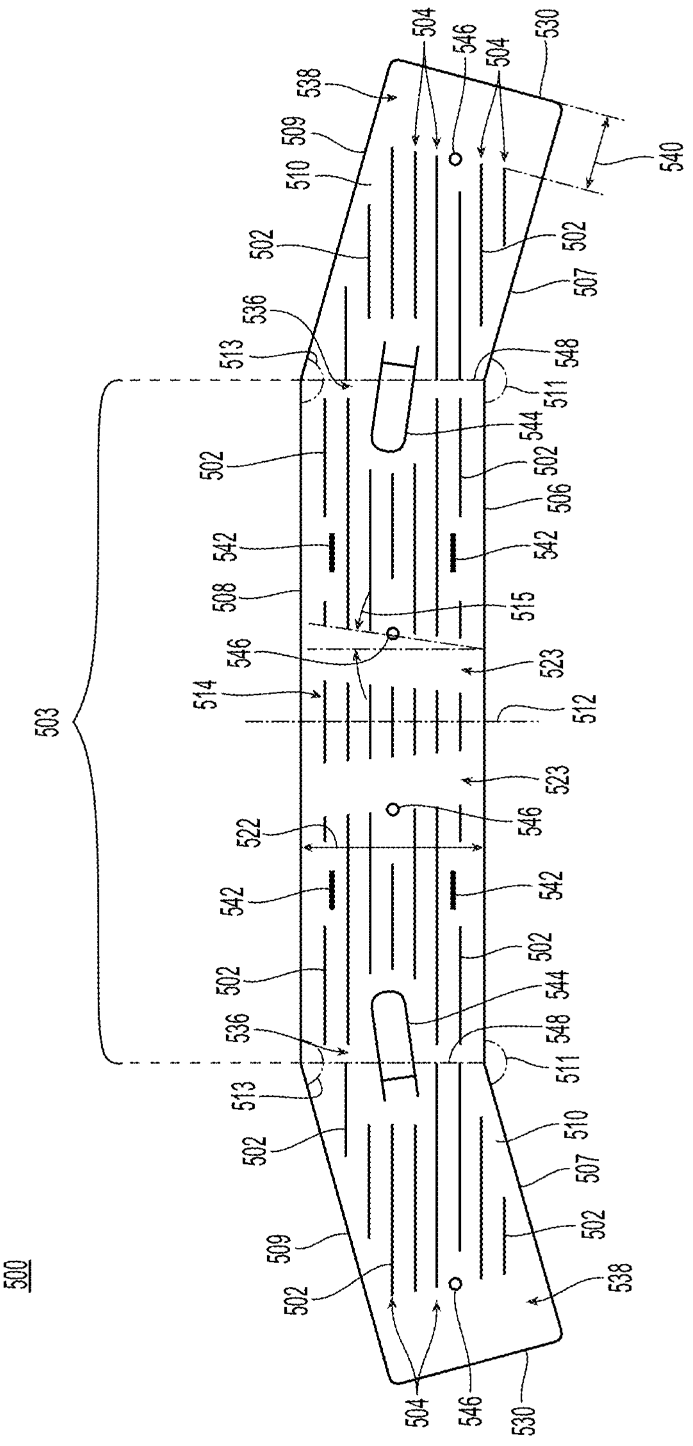
FIG. 11 is a plan view of another embodiment of a ligature strap.

Referring now to FIG. 11, another embodiment of a ligature strap 500 is illustrated. Suitable materials for the ligature strap are the same as those described above. The ligature strap includes two sides. The ligature strap includes a rough side and a smooth side opposite the rough side.

The ligature strap includes a plurality of kerfs 502. Each kerf extends at least partially along one of a plurality of parallel lines 504 running across the ligature strap. As illustrated, the kerfs extend along eleven parallel lines. Preferably, the parallel lines are parallel rectilinear lines. The ligature strap includes a central portion 503 having a top edge 506 and a bottom edge 508 spaced from and parallel to the top edge. The top edge corresponds to the top of the ligature strap or ligature, and the bottom edge corresponds to the bottom of the ligature strap or ligature. When the ligature is used to secure a reed to a mouthpiece, the bottom of the ligature is closest to the heel end of the reed, and the top of the ligature is closest to the user of the mouthpiece. The plurality of parallel lines extends parallel to at least one of the top edge and the bottom edge. Preferably, the parallel lines are parallel to both the top edge and the bottom edge.

Each kerf has a length measured along one of the parallel lines, and the plurality of kerfs include at least two different lengths. The overall length of the ligature strap can be varied based upon the outer circumference of the mouthpiece to which the resulting ligature is attached, i.e., a greater circumference corresponds to a longer ligature strap. Variations in the overall length of the ligature strap, i.e., the length of the central portion or the length of the entire ligature strap, yield variations in the lengths of the individual kerfs, even when the number and arrangement of the kerfs is identical for a given style or arrangement of ligature strap. In addition, changes in the overall length of the ligature strap could require the elimination of certain kerfs along one or more of the parallel lines given spacing limitations.

A pair of end flaps 510 extend from opposite ends of the central portion. Each end flap includes an end flap top edge 507 extending from the top edge and an end flap bottom edge 509 extending from the bottom edge. The end flap top edge extends from the top edge at a top edge angle 511 that is greater than 90° and less than 180°, and the end flap bottom edge extends from the bottom edge at a bottom edge angle 513 that is greater than 90° and less than 180°. The lengths of the end flaps and the angle at which each end flap extends from the central portion of the ligature strap can vary among the various arrangements and embodiments of the ligature strap.

The kerfs extend along the plurality of parallel lines in the central portion and the pair of end flaps. In one embodiment, the parallel lines in the plurality of parallel lines are common to the central portion and the end flaps and extend across the central portion and the pair of end flaps. Therefore, the parallel lines in the plurality of parallel lines are not parallel to the end flap top edge and end flap bottom edge. Alternatively, the ligature strap includes a set of end flap parallel lines that are separate from and divergent from the parallel lines running through the central portion. The end flap parallel lines are parallel to the end flap top surface and the end flat bottom surface.

A subset of the plurality of kerfs extends along each parallel line. The number of kerfs in each subset varies among the plurality of parallel lines. In one embodiment, each subset includes at least two kerfs, and at least one parallel line includes three or more kerfs. Adjacent kerfs along the common parallel line are spaced from each other. In one embodiment, adjacent kerfs along the common parallel line are spaced from each other by a distance of at least about 0.1 inches (2.5 to 2.54 mm). In one embodiment, the spacing is from about 2.5 mm to about 4 mm. In one embodiment, the spacing is less than 4 mm or less than 3 mm. In general, the spacing between any kerf and any other kerf, edge end or other hole or passage is at least about 0.1 inches (2.5 to 2.54 mm). In one embodiment, the spacing is from about 2.5 mm to about 4 mm. In one embodiment, the spacing is less than 4 mm or less than 3 mm. This minimum distance between features in the ligature strap provides a sufficient amount of ligature strap material to maintain the desired strength and integrity in the ligature strap.

The kerfs across the subsets of kerfs and therefore across the parallel lines are aligned to define a plurality of groups or regions of kerfs extending across the ligature strap width 522, i.e., a region with a group of parallel kerfs spaced from each other across the ligature strap width. The kerfs in each group or region can all have the same length or can have different lengths. In addition, a given group or region can include multiple separate kerfs along a given parallel line. As illustrated, the ligature strap includes five groups or regions of kerfs. These five regions include a central kerf region 514 centered on a center line 512 of the ligature strap. In one embodiment, the ligature strap including all kerfs and other structures of the ligature strap is symmetric about the center line 512 passing across the width of the ligature strap. The central kerf region includes a group of kerfs across seven of the eleven parallel lines. The kerfs in the central kerf region will wrap around the heel end of a reed when the ligature containing the ligature strap is used to secure the reed to a mouthpiece. Therefore, this region can is also considered a reed engagement region. As illustrated, the kerf length of the kerfs in the central kerf region increases from the top edge to the bottom edge. This yields a trapezoidal shape for the kerfs in the central kerf region.

The five groups or regions of kerfs are spaced from each other and from the end flap ends 530. The spacings between adjacent kerfs in each one of the plurality of lines are aligned across the plurality of parallel lines to define a plurality of continuous lines or webs of ligature strap extending completely from the top edge to the bottom edge in the central portion or from the end flap top edge to the end flap bottom edge in each of the end flaps. Each continuous line of ligature strap provides a continuous web of ligature strap material across the entire width that maintains the desired structural integrity and strength to the ligature strap. In addition, these continuous lines of ligature strap provide gluing surfaces, labeling or printing surfaces and reed engagement surfaces. The continuous lines of ligature strap intersect the top edge and bottom edge or end flap top edge and end flap bottom edge at an angle of from about 72° to about 90°.

As illustrated, the spaces are aligned to define six continuous lines of ligature strap. The six continuous lines of ligature strap include a pair of central lines of ligature strap 523 disposed on either side of the central kerf region. Each central line of ligature strap passes across the width of the ligature strap. The central lines of ligature strap also provide glue lines running across the width of the ligature strap. Each central line of ligature strap or glue line extends between the top edge and the bottom edge at an angle 515 from a line running perpendicular to the width of the ligature strap of up to about 18°.

The continuous lines of ligature strap include a pair of rod engagement lines 536. Each rod engagement line is located between the central portion and one of the end flaps. Therefore, the kerfs do not extend completely around a cylindrical rod placed between the end flap and the central portion when the end flap is folded onto the central portion. Each rod engagement line contacts the enclosed rod along the length of the cylindrical rod.

The continuous lines of strap also include a pair of end flap lines 538. Each end flap line extends in from one of the end flap ends a given end flap line distance 540 that increases from the end flap top surface to the end flap bottom surface, accommodating the angle of one of the central lines of ligature strap or glue lines. Each end flap line distance is sufficient cover one of the glue lines. Therefore, each end flap line provides a corresponding glue surface for one of the glue lines. Each end flap line, on a surface opposite the surface contacting the glue line, provides a labeling area in which identifying information for the ligature strap and ligature can be printed.

In one embodiment, the ligature strap includes at least one kerf 542 with a gap having an enlarged gap width. The enlarged gap width greater than the gap width. In one embodiment, the enlarged gap width is about 0.01 inches. As illustrated, the ligature strap includes four kerfs with gaps having the enlarged gap widths. The kerfs with enlarged gap widths are located along separate parallel lines from the parallel lines containing other kerfs. The separate parallel lines contain only kerfs with enlarged gap widths. Each separate parallel line includes two kerfs with enlarged gap widths, and the kerfs with enlarged gap widths are aligned in two pairs across the separate parallel lines. In one embodiment, the kerfs with enlarged gap widths are used to attach emblems to the ligature strap.

The ligature strap includes a plurality of fixturing holes 546 passing completely through the ligature strap. In one embodiment, each fixturing hole is a circular hole. The fixturing holes are arranged in pairs that align when the end flaps are folded over the central portion. The end flaps are then glued to the central portion. The ligature strap includes a pair of passages 544 extending completely through the ligature strap. In one embodiment, each passage extends from the central portion to one of the end flaps, spanning the rod engagement lines of ligature strap. The passages provide access to the cylindrical rods contained between the end flaps and the central portion when the end flaps are folded over onto the central portion. This access is used for the ligature closure mechanism.

The ligature strap includes a pair of fold lines 548. Each fold line is disposed between the central portion and one of the end flaps and corresponds to a continuous line of ligature strap extending completely from the top edge to the bottom edge. When folded, the rough side of the ligature strap is disposed on both the exterior and the interior of the folded ligature strap. The smooth side of the ligature strap is not exposed except for a small portion of the ligature strap that is exposed when the end flap ends do not meet along the center line. In one embodiment, each fold line runs along one of the rod engagement lines of continuous ligature strap. As described above, a cylindrical rod is placed along each rod engagement line, and each end flap is folded over one of the fold lines. The top edge is aligned with each end flap top edge, and the bottom edge is aligned with each end flap bottom edge. This forms the ligature with the divergent ends that is formed into a loop for attachment to a mouthpiece. The loop is secured to the mouthpiece and reed using the cylindrical rod and attachment mechanisms as described herein. In addition, the kerfs in the end flaps, following folding of the end flaps over the central portion are divergent from the top edge and bottom edge of the ligature strap.

Figure 12:
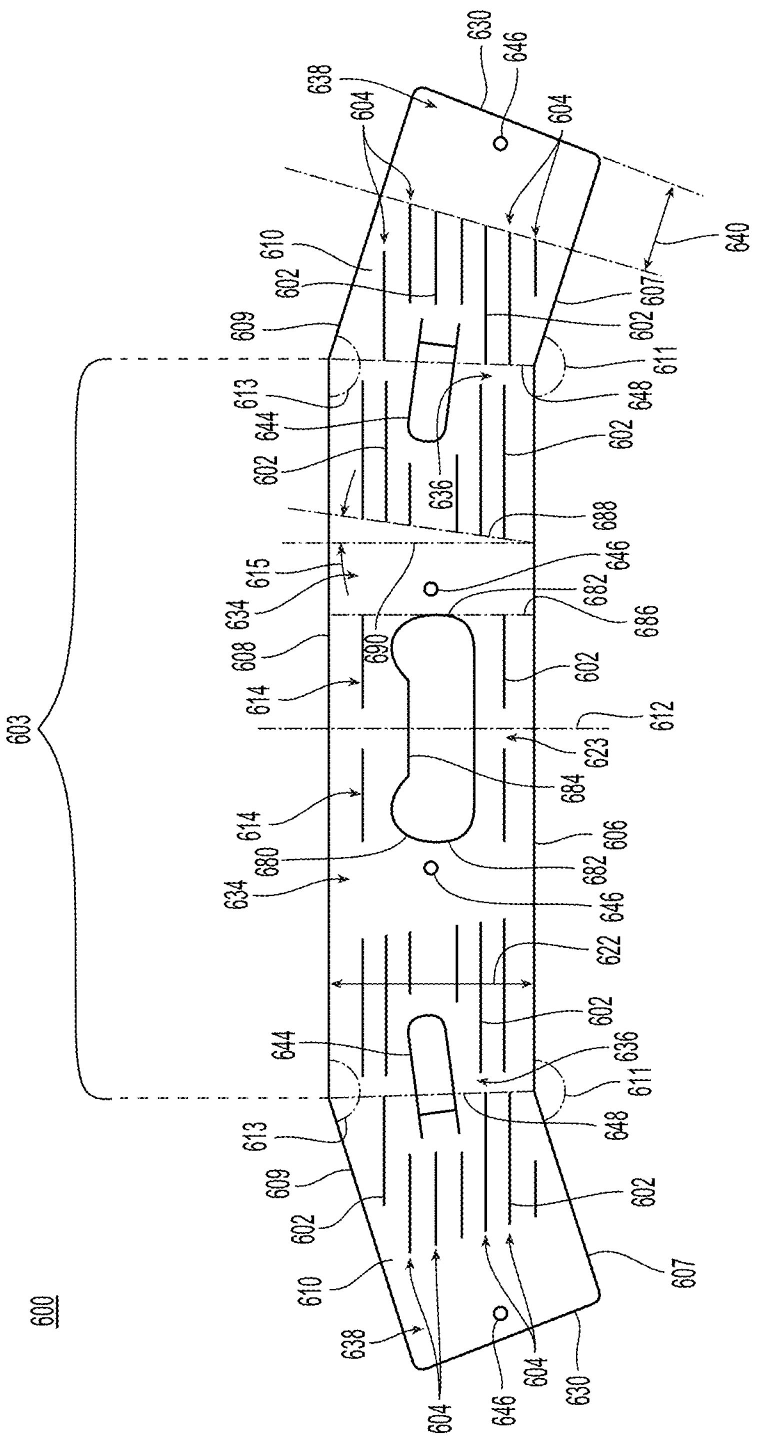
FIG. 12 is a plan view of another embodiment of a ligature strap.

Referring now to FIG. 12, another embodiment of a ligature strap 600 is illustrated. Suitable materials for the ligature strap are the same as those described above. The ligature strap includes two sides. The ligature strap includes a rough side and a smooth side opposite the rough side.

The ligature strap includes a plurality of kerfs 602. Each kerf extends at least partially along one of a plurality of parallel lines 604 running across the ligature strap. As illustrated, the kerfs extend along eight parallel lines. Preferably, the parallel lines are parallel rectilinear lines. The ligature strap includes a central portion 603 having a top edge 606 and a bottom edge 608 spaced from and parallel to the top edge. The top edge corresponds to the top of the ligature strap or ligature, and the bottom edge corresponds to the bottom of the ligature strap or ligature. When the ligature is used to secure a reed to a mouthpiece, the bottom of the ligature is closest to the heel end of the reed, and the top of the ligature is closest to the user of the mouthpiece. The plurality of parallel lines extends parallel to at least one of the top edge and the bottom edge. Preferably, the parallel lines are parallel to both the top edge and the bottom edge.

Each kerf has a length measured along one of the parallel lines, and the plurality of kerfs include at least two different lengths. The overall length of the ligature strap can be varied based upon the outer circumference of the mouthpiece to which the resulting ligature is attached, i.e., a greater circumference corresponds to a longer ligature strap. Variations in the overall length of the ligature strap, i.e., the length of the central portion or the length of the entire ligature strap, yield variations in the lengths of the individual kerfs, even when the number and arrangement of the kerfs is identical for a given style or arrangement of ligature strap. In addition, changes in the overall length of the ligature strap could result in the elimination of certain kerfs along one or more of the parallel lines given spacing limitations.

A pair of end flaps 610 extend from opposite ends of the central portion. Each end flap includes an end flap top edge 607 extending from the top edge and an end flap bottom edge 609 extending from the bottom edge. The end flap top edge extends from the top edge at a top edge angle 611 that is greater than 90° and less than 180°, and the end flap bottom edge extends from the bottom edge at a bottom edge angle 613 that is greater than 90° and less than 180°. The lengths of the end flaps and the angle at which each end flap extends from the central portion of the ligature strap can vary among the various arrangements and embodiments of the ligature strap. Variations in the lengths and angles determine an amount of overlap between the end flaps and the central portion and the result angle of the ends of the ligature. This angle affects the size of ligature loop and the amount of taper. Loop size and taper vary depending on the size and type of mouthpiece to which the ligature is attached.

The kerfs extend along the plurality of parallel lines in the central portion and the pair of end flaps. In one embodiment, the parallel lines in the plurality of parallel lines are common to the central portion and the end flaps and extend across the central portion and the pair of end flaps. Therefore, the plurality of parallel lines is not parallel to the end flap top edge and end flap bottom edge. Alternatively, the ligature strap includes a set of end flap parallel lines that are separate from and divergent from the parallel lines running through the central portion. In this alternative embodiment, the end flap parallel lines are parallel to the end flap top surface and the end flat bottom surface. Therefore, the end flap parallel lines are divergent from the parallel lines in the central portion at angles related to the angles at which the end flaps extend from the central portion.

A subset of the plurality of kerfs extends along each parallel line. The number of kerfs in each subset varies among the plurality of parallel lines. In one embodiment, each subset includes at least two kerfs. Adjacent kerfs along the common line are spaced from each other. In one embodiment, adjacent kerfs along the common line are spaced from each other by a distance of at least about 0.1 inches (2.5 to 2.54 mm). In one embodiment, the spacing is from about 2.5 mm to about 4 mm. In one embodiment, the spacing is less than 4 mm or less than 3 mm. In general, the spacing between any kerf and any other kerf, edge end or other hole or passage is at least about 0.1 inches (2.5 to 2.54 mm). In one embodiment, the spacing is from about 2.5 mm to about 4 mm. In one embodiment, the spacing is less than 4 mm or less than 3 mm. This minimum distance between features in the ligature strap provides a sufficient amount of ligature strap material to maintain the desired strength and integrity in the ligature strap.

The kerfs across the subsets of kerfs and therefore across the parallel lines are aligned to define a plurality of groups or regions of kerfs extending across the ligature strap width 622, i.e., a region with a group of parallel kerfs spaced from each other across the ligature strap width. The kerfs in each group or region can all have the same length or can have different lengths. In addition, a given group or region can include multiple separate kerfs along a given parallel line. As illustrated, the ligature strap includes six groups or regions of kerfs. These six regions include a pair of central kerf regions 614 centered on a center line 612 of the ligature strap. In one embodiment, the ligature strap including all kerfs and other structures of the ligature strap is symmetric about the center line 612 passing across the width of the ligature strap. Each central kerf region includes two kerfs disposed in two of the eight parallel lines. The kerfs in the central kerf region wrap around a portion of the heel end of a reed when the ligature containing the ligature strap is used to secure the reed to a mouthpiece. Therefore, this region is also considered a reed engagement region. As illustrated, the kerf length of the kerfs in the central kerf region are equal. In addition, the kerfs in each parallel line are spaced from each other by an enlarged opening or void 680 passing completely through the ligature strap. The enlarge opening extends along the ligature strap completely between the kerfs in each parallel line. Therefore, the overall length of the pair of kerfs in each parallel line equals the length of the enlarged opening. The enlarged opening has rounded ends 682 and a shelf area 684 along one side that extends into the enlarge opening. The shelf area engages a longer portion of the heel end of the reed toward the bottom edge of the ligature strap while exposing a longer portion of the edges of the heel end of the reed.

The six groups or regions of kerfs are spaced from each other and from the end flap ends 630. The spacings between adjacent kerfs in each one of the plurality of lines are aligned across the plurality of parallel lines to define a plurality of continuous lines or webs of ligature strap extending completely from the top edge to the bottom edge in the central portion or from the end flap top edge to the end flap bottom edge in each of the end flaps. Each continuous line of ligature strap provides a continuous web of ligature strap material across the entire width that maintains the desired structural integrity and strength to the ligature strap. In addition, these continuous lines of ligature strap provide gluing surfaces, labeling surfaces, printing surfaces and reed engagement surfaces. The continuous lines of ligature strap intersect the top edge and bottom edge or end flap top edge and end flap bottom edge at an angle of from about 72° to about 90°.

As illustrated, the spaces are aligned to define seven continuous lines of ligature strap. The seven continuous lines of ligature strap include a central line of ligature strap 623 centered on the center line and extending between the pairs of kerfs in the central kerf regions. The central line of ligature strap does not extend completely across the width of the ligature strap but intersects and is interrupted by the enlarged opening, which is also centered on the center line of the ligature strap. The central line of ligature strap extends perpendicular to the top edge and the bottom edge of the central portion of the ligature strap.

The continuous lines of ligature strap also include a pair of adhesive or glue lines 634 running across the width of the ligature strap. Each glue line is spaced from the central line of ligature strap by one of the central kerf regions. Each glue line includes an inner edge 686 that extends perpendicular to the top edge and the bottom edge and an outer edge 688 that extends between the top edge and the bottom edge at an angle 615 from a line 690 running across the width of the ligature strap and perpendicular to the top and bottom edges of up to about 18°.

The continuous lines of ligature strap include a pair of rod engagement lines 636. Each rod engagement line is located between the central portion and one of the end flaps. Therefore, the kerfs do not extend completely around a cylindrical rod placed between the end flap and the central portion when the end flap is folded onto the central portion. Each rod engagement line contacts the enclosed cylindrical rod along the length of the cylindrical rod.

The continuous lines of strap also include a pair of end flap lines 638. Each end flap line extends in from one of the end flap ends a given end flap line distance 640 that increases from the end flap top surface to the end flap bottom surface, accommodating the angle of the outer edge of the glue line of continuous ligature strap. Each end flap line distance is sufficient cover one of the glue lines. Therefore, each end flap line provides a corresponding glue surface for one of the glue lines. The end flaps, however, do not cover the enlarged opening when folded over the central portion. Each end flap line, on a surface opposite the surface contacting the glue line and central line of ligature strap, provides a labeling area in which identifying information for the ligature strap and ligature can be labeled.

The ligature strap includes a plurality of fixturing holes 646 passing completely through the ligature strap. In one embodiment, each fixturing hole is a circular hole. The fixturing holes are arranged in pairs that align when the end flaps are folded over the central portion. The end flaps are then glued to the central portion. The ligature strap includes a pair of passages 644 extending completely through the ligature strap. In one embodiment, each passage extends from the central portion to one of the end flaps, spanning the rod engagement lines of ligature strap. The passages provide access to the cylindrical rods contained between the end flaps and the central portion when the end flaps are folded over onto the central portion. This access is used for the ligature closure mechanism.

The ligature strap includes a pair of fold lines 648. Each fold line is disposed between the central portion and one of the end flaps and corresponds to a continuous line of ligature strap extending completely from the top edge to the bottom edge. When folded, the smooth side of the ligature strap is disposed on both the exterior and the interior of the folded ligature strap. The rough side of the ligature strap is not exposed except the portion of the ligature strap that is exposed around the enlarged opening as the end flap ends 630 do not meet along the center line but are folded over and positioned adjacent one of the ends of the enlarged opening. In one embodiment, each fold line runs along one of the rod engagement lines of continuous ligature strap. As described above, a rod is placed along each rod engagement line, and each end flap is folded over one of the fold lines. The top edge is aligned with each end flap top edge, and the bottom edge is aligned with each end flap bottom edge. This forms the ligature with the divergent ends that is formed into a loop for attachment to a mouthpiece. The loop is secured to the mouthpiece and reed using the cylindrical rod and attachment mechanisms as described herein. In addition, the kerfs in the end flaps, following folding of the end flaps over the central portion are divergent from the top edge and bottom edge of the ligature strap.

Figure 13:
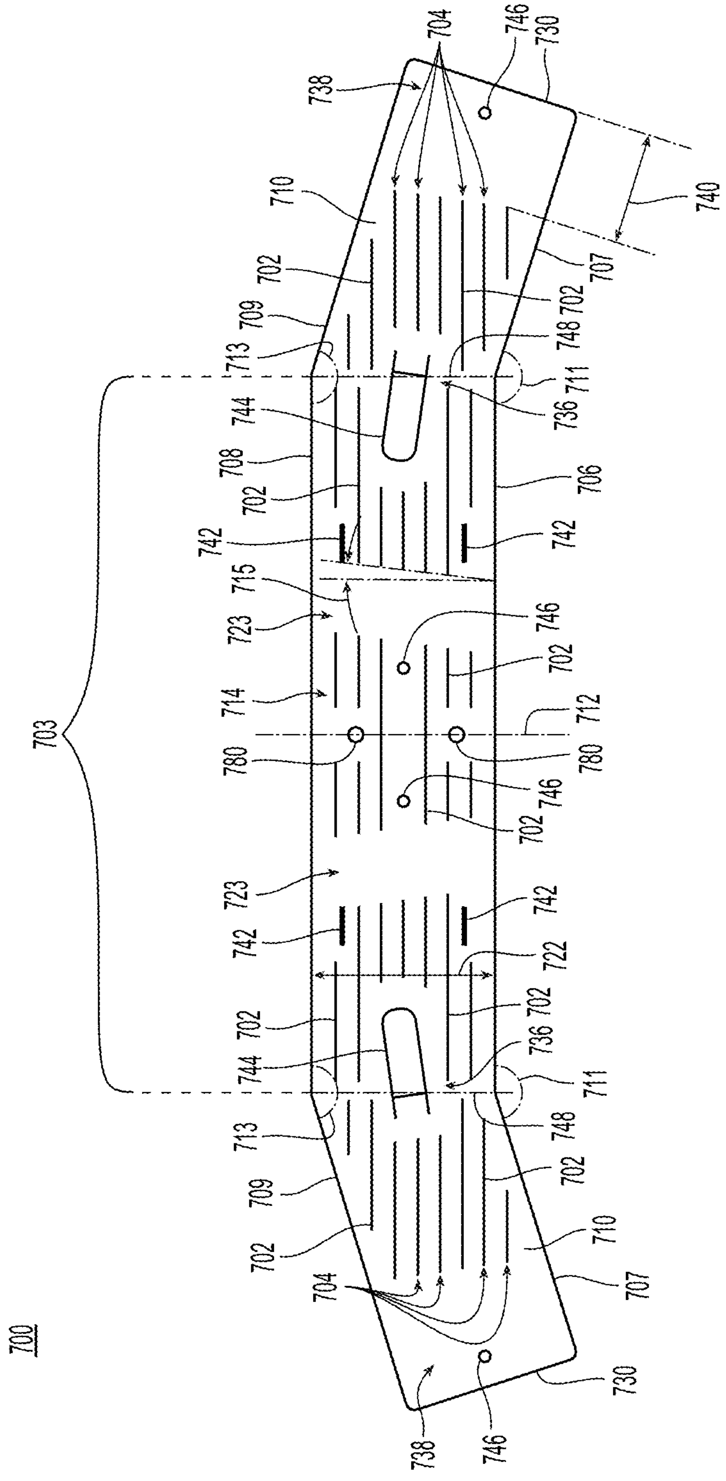
FIG. 13 is a plan view of another embodiment of a ligature strap.

Referring now to FIG. 13, another embodiment of a ligature strap 700 is illustrated. Suitable materials for the ligature strap are the same as those described above. The ligature strap includes two sides. The ligature strap includes a rough side and a smooth side opposite the rough side.

The ligature strap includes a plurality of kerfs 702. Each kerf extends at least partially along one of a plurality of parallel lines 704 running across the ligature strap. As illustrated, the kerfs extend along seventeen parallel lines. Preferably, the parallel lines are parallel rectilinear lines. The ligature strap includes a central portion 703 having a top edge 706 and a bottom edge 708 spaced from and parallel to the top edge. The top edge corresponds to the top of the ligature strap or ligature, and the bottom edge corresponds to the bottom of the ligature strap or ligature. When the ligature is used to secure a reed to a mouthpiece, the bottom of the ligature is closest to the heel end of the reed, and the top of the ligature is closest to the user of the mouthpiece. The plurality of parallel lines extends parallel to at least one of the top edge and the bottom edge. Preferably, the parallel lines are parallel to both the top edge and the bottom edge.

Each kerf has a length measured along one of the parallel lines, and the plurality of kerfs include at least two different lengths. The overall length of the ligature strap can be varied based upon the outer circumference of the mouthpiece to which the resulting ligature is attached, i.e., a greater circumference corresponds to a longer ligature strap. Variations in the overall length of the ligature strap, i.e., the length of the central portion or the length of the entire ligature strap, yield variations in the lengths of the individual kerfs, even when the number and arrangement of the kerfs is identical for a given style or arrangement of ligature strap. In addition, changes in the overall length of the ligature strap could result in the elimination of certain kerfs along one or more of the parallel lines given spacing limitations.

A pair of end flaps 710 extend from opposite ends of the central portion. Each end flap includes an end flap top edge 707 extending from the top edge and an end flap bottom edge 709 extending from the bottom edge. The end flap top edge extends from the top edge at a top edge angle 711 that is greater than 90° and less than 180°, and the end flap bottom edge extends from the bottom edge at a bottom edge angle 713 that is greater than 90° and less than 180°. The lengths of the end flaps and the angle at which each end flap extends from the central portion of the ligature strap can vary among the various arrangements and embodiments of the ligature strap.

The kerfs extend along the plurality of parallel lines in the central portion and the pair of end flaps. In one embodiment, the parallel lines in the plurality of parallel lines are common to the central portion and the end flaps and extend across the central portion and the pair of end flaps. Therefore, the plurality of parallel lines is not parallel to the end flap top edge and end flap bottom edge. Alternatively, the ligature strap includes a set of end flap parallel lines that are separate from the parallel lines running through the central portion. In one embodiment the end flap parallel lines are parallel to the central portion parallel lines. Alternatively, the end flap parallel lines are divergent from the parallel lines running through the central portion. In this alternative embodiment, the end flap parallel lines are parallel to the end flap top surface and the end flat bottom surface. As illustrated, the set of end flap parallel lines are separate from and offset from but parallel to the parallel lines running through the central portion. In one embodiment, this offset between the parallel lines in the central portion and the parallel lines in the end flaps accommodates larger angles 711, 713 between the top end and end flap top edge and bottom edge and end flap bottom edge.

A subset of the plurality of kerfs extends along each parallel line. The number of kerfs in each subset varies among the plurality of parallel lines. In one embodiment, each subset includes at least two kerfs. Adjacent kerfs along the common line are spaced from each other. In one embodiment, adjacent kerfs along the common line are spaced from each other by a distance of at least about 0.1 inches (2.5 to 2.54 mm). In one embodiment, the spacing is from about 2.5 mm to about 4 mm. In one embodiment, the spacing is less than 4 mm or less than 3 mm. In general, the spacing between any kerf and any other kerf, edge end or other hole or passage is at least about 0.1 inches (2.5 to 2.54 mm). In one embodiment, the spacing is from about 2.5 mm to about 4 mm. In one embodiment, the spacing is less than 4 mm or less than 3 mm. This minimum distance between features in the ligature strap provides a sufficient amount of continuous ligature strap material to maintain the desired strength and integrity in the ligature strap.

The kerfs across the subsets of kerfs and therefore across the parallel lines are aligned to define a plurality of groups or regions of kerfs extending across the ligature strap width 722, i.e., a region with a group of parallel kerfs spaced from each other across the ligature strap width. The kerfs in each group or region can all have the same length or can have different lengths. In addition, a given group or region can include multiple separate kerfs along a given parallel line. As illustrated, the ligature strap includes five groups or regions of kerfs. These five regions include a central kerf region 714 centered on a center line 712 of the ligature strap. In one embodiment, the ligature strap including all kerfs and other structures of the ligature strap is symmetric about the center line 712 passing across the width of the ligature strap. The central kerf region includes a group of kerfs across six of the seventeen total parallel lines or the nine parallel lines in the central portion. The kerfs in the central kerf region will wrap around the heel end of a reed when the ligature containing the ligature strap is used to secure the reed to a mouthpiece. Therefore, this region can is also considered a reed engagement region. As illustrated, the kerf length of all kerfs in the central kerf region increases from the top edge to the bottom edge. This yields a trapezoidal shape for the kerfs in the central kerf region. In addition, the kerfs in two parallel lines extend complete across the central kerf region, and the kerfs in four of the parallel lines are divided into two separate and spaced kerfs. This provides areas within the central kerf region for a pair of mounting or fastener holes 780 passing completely through the ligature strap. In one embodiment, each mounting hole is circular and is centered on the center line of the ligature strap. These mounting holes accommodate fasteners such as rivets that attach cradles or weights to the ligature strap. The cradles or weights engage the heel end of a reed.

The five groups or regions of kerfs are spaced from each other and from the end flap ends 730. The spacings between adjacent kerfs in each one of the plurality of lines are aligned across the plurality of parallel lines to define a plurality of continuous lines or webs of ligature strap extending completely from the top edge to the bottom edge in the central portion or from the end flap top edge to the end flap bottom edge in each of the end flaps. Each continuous line of ligature strap provides a continuous web of ligature strap material across the entire width that maintains the desired structural integrity and strength to the ligature strap. In addition, these continuous lines of ligature strap provide gluing surfaces, labeling surfaces and reed engagement surfaces. The continuous lines of ligature strap intersect the top edge and bottom edge or end flap top edge and end flap bottom edge at an angle of from about 72° to about 90°.

As illustrated, the spaces are aligned to define six continuous lines of ligature strap. The six continuous lines of ligature strap include a pair of adhesive or glue lines 723 disposed on either side of the central kerf region. Each glue line of ligature strap passes across the width of the ligature strap and extends between the top edge and the bottom edge at an angle 715 from a line running perpendicular to the top and bottom edges along the width of the ligature strap of up to about 18°.

The continuous lines of ligature strap include a pair of rod engagement lines 736. Each rod engagement line is located between the central portion and one of the end flaps. Therefore, the kerfs do not extend completely around a cylindrical rod placed between the end flap and the central portion when the end flap is folded onto the central portion. Each rod engagement line contacts the enclosed cylindrical rod along the length of the cylindrical rod.

The continuous lines of strap also include a pair of end flap lines 738. Each end flap line extends in from one of the end flap ends a given end flap line distance 740 that increases from the end flap top surface to the end flap bottom surface, accommodating the angle of one of the glue lines. Each end flap line distance is sufficient cover one of the glue lines. Therefore, each end flap line provides a corresponding glue surface for one of the glue lines. Each end flap line, on a surface opposite the surface contacting the glue line and central line of ligature strap, provides a labeling area in which identifying information for the ligature strap and ligature can be labeled or identified.

In one embodiment, the ligature strap includes at least one kerf 742 with a gap having an enlarged gap width. The enlarged gap width is greater than the gap width of 0.004 inches. In one embodiment, the enlarged gap width is about 0.01 inches. As illustrated, the ligature strap includes four kerfs with gaps having the enlarged gap widths. The kerfs with enlarged gap widths are located along separate parallel lines from the parallel lines containing other kerfs. The separate parallel lines contain only kerfs with enlarged gap widths. Each separate parallel line includes two kerfs with enlarged gaps widths, and the kerfs with enlarged gap widths are aligned in two pairs across the separate parallel lines. In one embodiment, the kerfs with enlarged gap widths are used to attach emblems to the ligature strap.

The ligature strap includes a plurality of fixturing holes 746 passing completely through the ligature strap. In one embodiment, each fixturing hole is a circular hole. The fixturing holes are arranged in pairs that align when the end flaps are folded over the central portion. The end flaps are then glued to the central portion. The ligature strap includes a pair of passages 744 extending completely through the ligature strap. In one embodiment, each passage extends from the central portion to one of the end flaps, spanning the rod engagement lines of ligature strap. The passages provide access to the cylindrical rods contained between the end flaps and the central portion when the end flaps are folded over onto the central portion. This access is used for the ligature closure mechanism.

The ligature strap includes a pair of fold lines 748. Each fold line is disposed between the central portion and one of the end flaps and corresponds to a continuous line of ligature strap extending completely from the top edge to the bottom edge. When folded, the rough side of the ligature strap is disposed on both the exterior and the interior of the folded ligature strap. The smooth side of the ligature strap is not exposed except for a small portion of the ligature strap that is exposed when the end flap ends do not meet along the center line. For example, the end flap ends do not meet to provide for attachment of a cradle or weights using the mounting holes. The area of the ligature strap under the cradle or weights is smooth. In one embodiment, each fold line runs along one of the rod engagement lines of continuous ligature strap. As described above, a cylindrical rod is placed along each rod engagement line, and each end flap is folded over one of the fold lines. The top edge is aligned with each end flap top edge, and the bottom edge is aligned with each end flap bottom edge. This forms the ligature with the divergent ends that is formed into a loop for attachment to a mouthpiece. The loop is secured to the mouthpiece and reed using the cylindrical rod and attachment mechanisms as described herein. In addition, the kerfs in the end flaps, following folding of the end flaps over the central portion are divergent from the top edge and bottom edge of the ligature strap.

Figure 14:
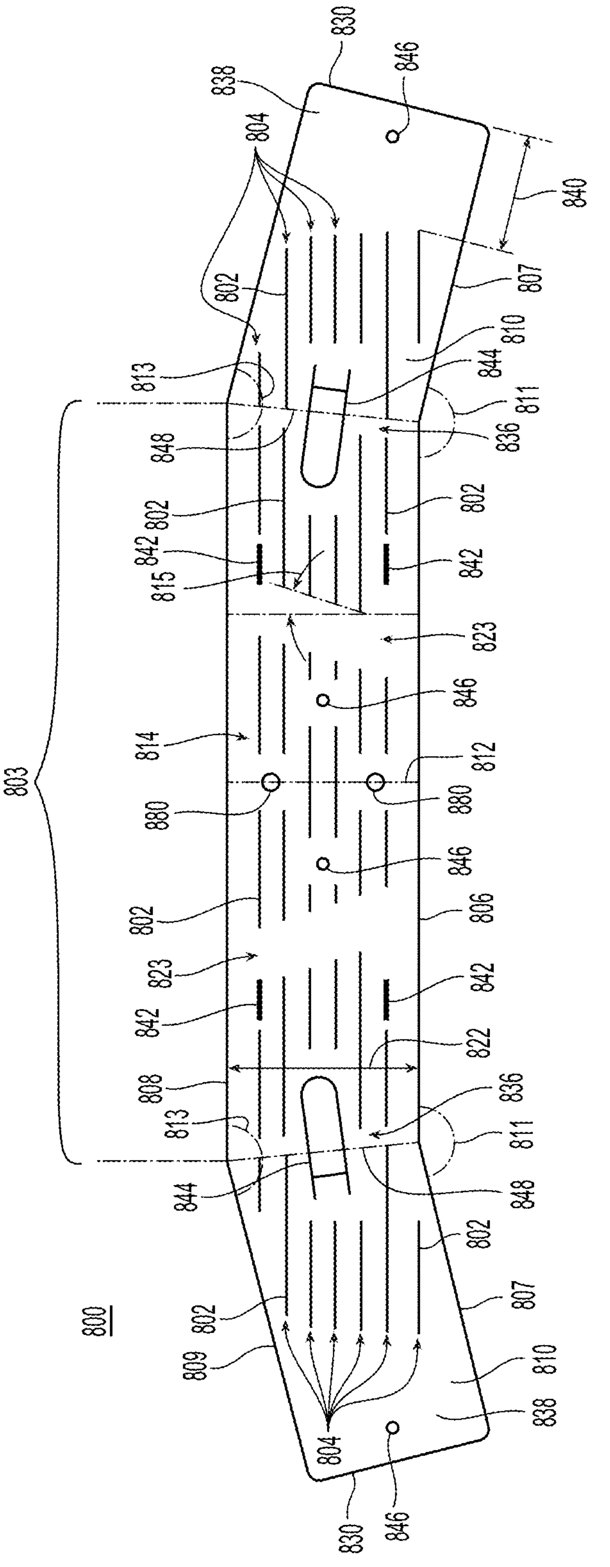
FIG. 14 is a plan view of another embodiment of a ligature strap.

Referring now to FIG. 14, another embodiment of a ligature strap 800 is illustrated. Suitable materials for the ligature strap are the same as those described above. The ligature strap includes two sides. In one embodiment, the two sides are a rough side and a smooth side opposite the rough side.

The ligature strap includes a plurality of kerfs 802. Each kerf extends at least partially along one of a plurality of parallel lines 804 running across the ligature strap. As illustrated, the kerfs extend along seven parallel lines. Preferably, the parallel lines are parallel rectilinear lines. The ligature strap includes a central portion 803 having a top edge 806 and a bottom edge 808 spaced from and parallel to the top edge. The top edge corresponds to the top of the ligature strap or ligature, and the bottom edge corresponds to the bottom of the ligature strap or ligature. When the ligature is used to secure a reed to a mouthpiece, the bottom of the ligature is closest to the heel end of the reed, and the top of the ligature is closest to the user of the mouthpiece. The plurality of parallel lines extends parallel to at least one of the top edge and the bottom edge. Preferably, the parallel lines are parallel to both the top edge and the bottom edge.

Each kerf has a length measured along one of the parallel lines, and the plurality of kerfs include at least two different lengths. The overall length of the ligature strap can be varied based upon the outer circumference of the mouthpiece to which the resulting ligature is attached, i.e., a greater circumference corresponds to a longer ligature strap. Variations in the overall length of the ligature strap, i.e., the length of the central portion or the length of the entire ligature strap, yield variations in the lengths of the individual kerfs, even when the number and arrangement of the kerfs is identical for a given style or arrangement of ligature strap. In addition, changes in the overall length of the ligature strap could result in the elimination of certain kerfs along one or more of the parallel lines given spacing limitations.

A pair of end flaps 810 extend from opposite ends of the central portion. Each end flap includes an end flap top edge 807 extending from the top edge and an end flap bottom edge 809 extending from the bottom edge. The end flap top edge extends from the top edge at a top edge angle 811 that is greater than 90° and less than 180°, and the end flap bottom edge extends from the bottom edge at a bottom edge angle 813 that is greater than 90° and less than 180°. The lengths of the end flaps and the angle at which each end flap extends from the central portion of the ligature strap can vary among the various arrangements and embodiments of the ligature strap.

The kerfs extend along the plurality of parallel lines in the central portion and the pair of end flaps. In one embodiment, the parallel lines in the plurality of parallel lines are common to the central portion and the end flaps and extend across the central portion and the pair of end flaps. Therefore, the parallel lines in the plurality of parallel lines are not parallel to the end flap top edge and end flap bottom edge. Alternatively, the ligature strap includes a set of end flap parallel lines that are separate from the parallel lines running through the central portion. In one embodiment the end flap parallel lines are parallel to the central portion parallel lines. Alternatively, the end flap parallel lines are divergent from the parallel lines running through the central portion. In this alternative embodiment, the end flap parallel lines are parallel to the end flap top surface and the end flap bottom surface. Therefore, the end flap parallel lines are divergent from the parallel lines in the central portion at angles related to the angles at which the end flaps extend from the central portion.

A subset of the plurality of kerfs extends along each parallel line. The number of kerfs in each subset varies among the plurality of parallel lines. In one embodiment, each subset includes at least two kerfs. Adjacent kerfs along the common line are spaced from each other. In one embodiment, adjacent kerfs along the common line are spaced from each other by a distance of at least about 0.1 inches (2.5 to 2.54 mm). In one embodiment, the spacing is from about 2.5 mm to about 4 mm. In one embodiment, the spacing is less than 4 mm or less than 3 mm. In general, the spacing between any kerf and any other kerf, edge end or other hole or passage is at least about 0.1 inches (2.5 to 2.54 mm). In one embodiment, the spacing is from about 2.5 mm to about 4 mm. In one embodiment, the spacing is less than 4 mm or less than 3 mm. This minimum distance between features in the ligature strap provides a sufficient amount of continuous ligature strap material to maintain the desired strength and integrity in the ligature strap.

The kerfs across the subsets of kerfs and therefore across the parallel lines are aligned to define a plurality of groups or regions of kerfs extending across the ligature strap width 822, i.e., a region with a group of parallel kerfs spaced from each other across the ligature strap width. The kerfs in each group or region can all have the same length or can have different lengths. In addition, a given group or region can include multiple separate kerfs along a given parallel line. As illustrated, the ligature strap includes five groups or regions of kerfs. These five regions include a central kerf region 814 centered on a center line 812 of the ligature strap. In one embodiment, the ligature strap including all kerfs and other structures of the ligature strap is symmetric about the center line 812 passing across the width of the ligature strap. The central kerf region includes a group of kerfs across six of the seventeen total parallel lines or the nine parallel lines in the central portion. The kerfs in the central kerf region will wrap around portions of the heel end of a reed when the ligature containing the ligature strap is used to secure the reed to a mouthpiece.

However, the kerfs are discontinuous. Along four of the parallel lines, the kerfs are divided into two separate and spaced kerfs. Along two of the parallel lines, the kerfs are divided into three separate and spaced kerfs. The discontinuous kerfs accommodate fixturing holes 846 and fastener holes 880. In one embodiment, each mounting hole is circular and is centered on the center line of the ligature strap. These fastener holes or mounting holes accommodate fasteners such as rivets that attach cradles or weights to the ligature strap. The cradles or weights engage the heel end of a reed. Therefore, this region can is also considered a reed engagement region. As illustrated, the kerf length of all kerfs in the central kerf region increases from the top edge to the bottom edge. This yields a trapezoidal shape for the kerfs in the central kerf region.

The five groups or regions of kerfs are spaced from each other and from the end flap ends 830. The spacings between adjacent kerfs in each one of the plurality of lines are aligned across the plurality of parallel lines to define a plurality of continuous lines or webs of ligature strap extending completely from the top edge to the bottom edge in the central portion or from the end flap top edge to the end flap bottom edge in each of the end flaps. Each continuous line of ligature strap provides a continuous web of ligature strap material across the entire width that maintains the desired structural integrity and strength to the ligature strap. In addition, these continuous lines of ligature strap provide gluing surfaces, labeling surfaces and reed engagement surfaces. The continuous lines of ligature strap intersect the top edge and bottom edge or end flap top edge and end flap bottom edge at an angle of from about 72° to about 90°.

As illustrated, the spaces are aligned to define six continuous lines of ligature strap. The six continuous lines of ligature strap include a pair of adhesive or glue lines 823 disposed on either side of the central kerf region. Each glue line of ligature strap passes across the width of the ligature strap and extends between the top edge and the bottom edge at an angle 815 from a line running perpendicular to the top and bottom edges along the width of the ligature strap of up to about 18°.

The continuous lines of ligature strap include a pair of rod engagement lines 836. Each rod engagement line is located between the central portion and one of the end flaps. Therefore, the kerfs do not extend completely around a cylindrical rod placed between the end flap and the central portion when the end flap is folded onto the central portion. Each rod engagement line contacts the enclosed cylindrical rod along the length of the cylindrical rod.

The continuous lines of strap also include a pair of end flap lines 838. Each end flap line extends in from one of the end flap ends a given end flap line distance 840 that increases from the end flap top surface to the end flap bottom surface, accommodating the angle of one of the glue lines. Each end flap line distance is sufficient cover one of the glue lines. Therefore, each end flap line provides a corresponding glue surface for one of the glue lines. Each end flap line, on a surface opposite the surface contacting the glue line and central line of ligature strap, provides a labeling area in which identifying information for the ligature strap and ligature can be labeled or identified.

In one embodiment, the ligature strap includes at least one kerf 842 with a gap having an enlarged gap width. The enlarged gap width is greater than the gap width of 0.004 inches. In one embodiment, the enlarged gap width is about 0.01 inches. As illustrated, the ligature strap includes four kerfs with gaps having the enlarged gap widths. The kerfs with enlarged gap widths are located along two of the parallel lines. Each parallel line includes two kerfs with enlarged gaps widths, and the kerfs with enlarged gap widths are aligned in two pairs across the parallel lines. In one embodiment, the kerfs with enlarged gap widths are used to attach emblems to the ligature strap.

The ligature strap includes a plurality of fixturing holes 846 passing completely through the ligature strap. In one embodiment, each fixturing hole is a circular hole. The fixturing holes are arranged in pairs that align when the end flaps are folded over the central portion. The end flaps are then glued to the central portion. The ligature strap includes a pair of passages 844 extending completely through the ligature strap. In one embodiment, each passage extends from the central portion to one of the end flaps, spanning the rod engagement lines of ligature strap. The passages provide access to the cylindrical rods contained between the end flaps and the central portion when the end flaps are folded over onto the central portion. This access is used for the ligature closure mechanism.

The ligature strap includes a pair of fold lines 848. Each fold line is disposed between the central portion and one of the end flaps and corresponds to a continuous line of ligature strap extending completely from the top edge to the bottom edge. When folded, the rough side of the ligature strap is disposed on both the exterior and the interior of the folded ligature strap. The smooth side of the ligature strap is not exposed. The end flap ends do not meet to provide for attachment of the cradle using the mounting holes. In addition, the ligature strap is not attached to itself between the glue lines and the end flap ends, providing flaps that can be selectively placed over or under the cradle. However, the smooth side of the ligature strap is not exposed to the reed or mouthpiece. In one embodiment, each fold line runs along one of the rod engagement lines of continuous ligature strap. As described above, a cylindrical rod is placed along each rod engagement line, and each end flap is folded over one of the fold lines. The top edge is aligned with each end flap top edge, and the bottom edge is aligned with each end flap bottom edge. This forms the ligature with the divergent ends that is formed into a loop for attachment to a mouthpiece. The loop is secured to the mouthpiece and reed using the cylindrical rod and attachment mechanisms as described herein. In addition, the kerfs in the end flaps, following folding of the end flaps over the central portion are divergent from the top edge and bottom edge of the ligature strap.

Figure 15:
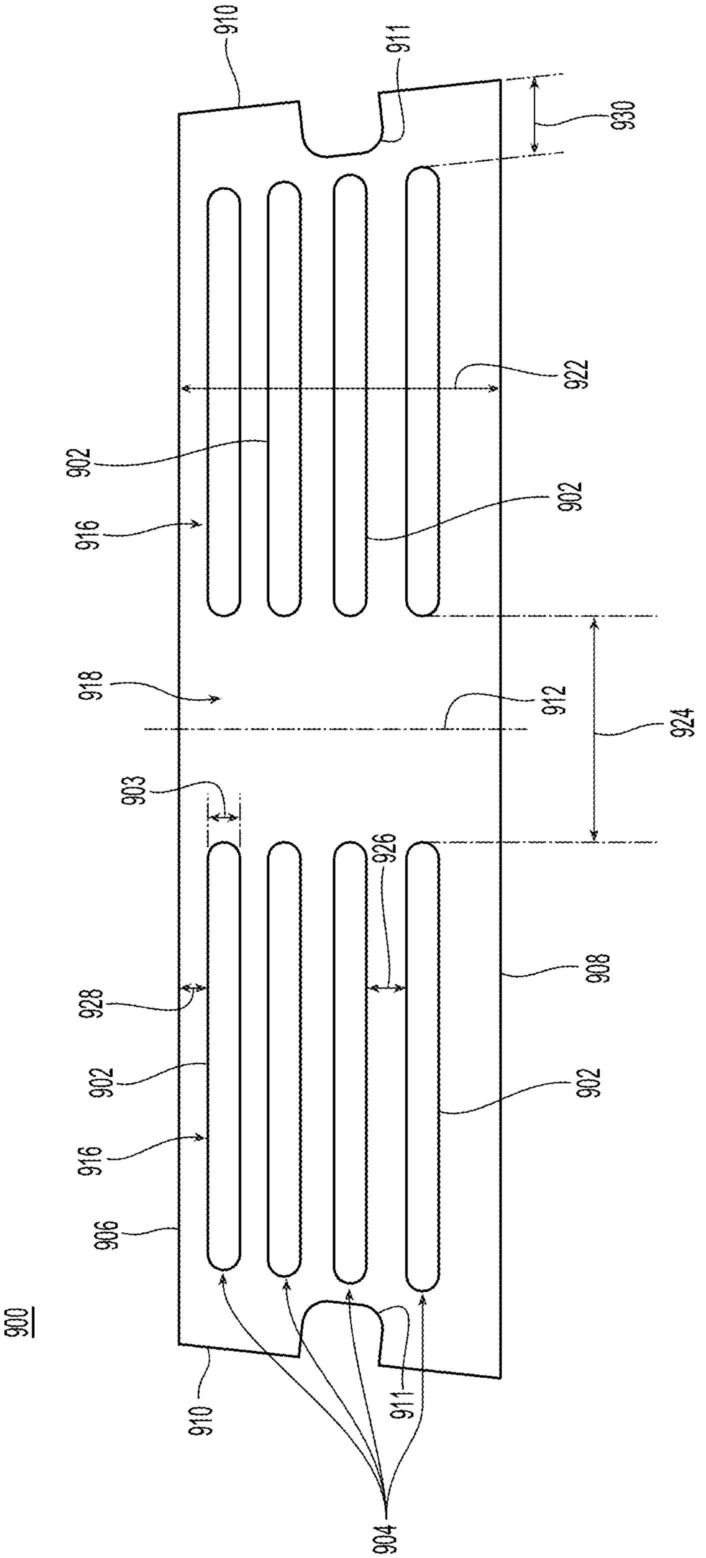
FIG. 15 is a plan view of another embodiment of a ligature strap.

Referring now to FIG. 15, an embodiment of a ligature strap 900 is illustrated. The ligature strap is formed from a carbon fiber material. Suitable carbon fiber materials include carbon fiber fabrics including woven fabrics, carbon fiber sheets and molded carbon fiber. The molded carbon fiber includes molding using carbon fiber sheets and resin, injection molding carbon fiber into reinforced plastics, polymers and elastomers and forged composites from using a paste of carbon fibers and resin. In one embodiment, the carbon fiber material is a fabric or sheet having a thickness of less than about ⅛ of an inch, for example about 1/16 of an inch and preferably about 1/32 of an inch. In one embodiment, the carbon fiber sheet or fabric has a thickness of from about 0.25 mm to about 3.4 mm (0.01 inches to 0.13 inches). Therefore, the thickness of the flexible strap is consistent with the thickness of conventional metal ligatures and the flexible rubberized fabric that are provided with the single-reed woodwind mouthpieces. This provides a flexible carbon fiber ligature that forms around the mouthpiece and reed in a manner consistent with the rubberized fabric ligature material.

In one embodiment, the ligature strap is a molded carbon fiber ligature strap that is formed into a fixed loop that is sized to fit around a mouthpiece and reed. Any suitable method for molding carbon fiber can be used including using sheets and resins, injection molding and forged composites. In one embodiment, the fixed loop has a frustoconical shape. The ligature strap, being constructed from a carbon fiber sheet, maintains the loop shape. In one embodiment the molded carbon fiber ligature strap maintains a sufficient amount of flexibility while formed in the fixed loop to facilitate placement over the mouthpiece and reed and tightening of the ligature strap around the mouthpiece and reed using any clamping or closer mechanism as described herein.

The ligature strap includes a plurality of slots 902. Each slot extends at least partially along one of a plurality of parallel lines 904 running across the ligature strap. In one embodiment, the slots are cut into the carbon fiber sheet or carbon fiber fabric using a knife or other edge instrument and a punch or press. Use of a punch or press to cut the slots or, if desired kerfs, is facilitated by the small thickness of the carbon fiber sheet or fabric. In one embodiment, the slots are cut in the ligature strap using a laser. In one embodiment, a plurality of ligature straps, each containing a desired arrangement of slots is cut from a single carbon fiber sheet or fabric.

As illustrated, the slots extend along four parallel lines; however, the ligature strap can include a greater or lesser number of parallel lines, for example, five parallel lines. The parallel lines are parallel rectilinear lines, and the parallel lines are parallel to at least one of the top edge 906 and the bottom edge 908 of the ligature strap. Preferably, the parallel lines are parallel to both the top edge and the bottom edge. As used herein, the top edge corresponds to the top of the ligature strap or ligature, and the bottom edge corresponds to the bottom of the ligature strap or ligature. When the ligature is used to secure a reed to a mouthpiece, the bottom of the ligature is closest to the heel end of the reed, and the top of the ligature is closest to the user of the mouthpiece.

The ligature strap also includes a pair of opposing ends 910. The opposing ends are not parallel to each other and are not perpendicular to either the top edge of the bottom edge. In one embodiment, the ligature strap has a trapezoidal shape. Therefore, when formed into a loop, the resulting ligature strap has a frustoconical shape. The ligature strap includes a notch 911 extending into the ligature strap from each opposing end. The notch accommodates fasteners used to secure the ligature strap to a mouthpiece and reed. Each slot includes a slot width 903. In general, the slot width is larger and preferably significantly larger than the width of a kerf. While illustrated as slots, embodiments of the ligature strap can also include kerfs or slits as described herein. In addition, the embodiments of flexible ligature straps disclose herein can utilize the carbon fiber sheets and fabrics.

A subset of the plurality of slots extends along each parallel line. In one embodiment, each subset includes two slots. The two slots in each subset extend along a common parallel line in the plurality of parallel lines, and adjacent slots along the common parallel line are spaced from each other along that parallel line be a given adjacent slot spacing 924. In one embodiment, adjacent slots along the common parallel line are spaced from each other by the adjacent slot spacing having a distance of at least about 0.1 inches (2.5 mm) measured along the parallel line between the ends of adjacent slots. In one embodiment, the spacing is from about 2.5 mm to about 4 mm. In one embodiment, the spacing is less than 4 mm or less than 3 mm. In addition, the spacing 926 between slots across parallel lines, the spacing 928 between the slots in any parallel line and one of the edges and the spacing 930 between any slot in any parallel line and one of the ends 910 is at least about 0.1 inches (2.5 mm). In one embodiment, the spacing is from about 2.5 mm to about 4 mm. In one embodiment, the spacing is less than 4 mm or less than 3 mm. This spacing maintains the desired structurally integrity in the web of ligature strap material while facilitating increased coverage of the ligature strap by slots. The spacing between slots across the parallel lines can be constant or can increase or decrease from the top edge to the bottom edge. In addition, while illustrated with two slots along each parallel line, the parallel lines can include only a single slot or more than two slots.

The slots across the subsets of slots are aligned to define two groups or regions of slots extending across the ligature strap width 922. The two regions include a pair of regions 916 located on either side of a central region of continuous ligature strap 218. When the ligature strap is formed into a fixed loop and wrapped around the mouthpiece and reed, the central region of continuous ligature strap extends over the reed. In one embodiment, the slots in each group have the same slot length. In another embodiment, the slots in each group have a different length. As illustrated, the lengths of the slots in each region increase from the top edge 906 to the bottom edge 908. Therefore, the spacing between each slot and one of the opposing ends is constant, accommodating the angle of the opposing ends or trapezoidal shape of the ligature strap. In addition, the slots are spaced from the opposing ends to accommodate attachment of rods to each end of the ligature strap.

In addition, the slots in each region can be aligned across the width of the ligature strap or can be offset or staggered. As illustrated, the slot length of the slots in the reed engagement region increases from the top edge to the bottom edge. The slots in each side region are offset from each other in a stair-step arrangement moving from the bottom edge to the top edge. In one embodiment, the slots in each one of the side regions have equal slot lengths; however, the slots are offset across the width of the ligature strap, following the angle of one of the opposing edges.

Given the arrangement and size of the slots in each region, the spaces between adjacent slots in the central or reed engagement region 918 extending completely from the top edge to the bottom edge. This continuous line of ligature strap intersects the top edge and bottom edge at an angle of about 90°. Each continuous line of ligature strap provides a continuous web of ligature strap material that maintains the desired structural integrity and strength to the ligature strap. In one embodiment, the ligature strap is symmetric about a center line 912 passing across the width of the ligature strap.

Figure 16:
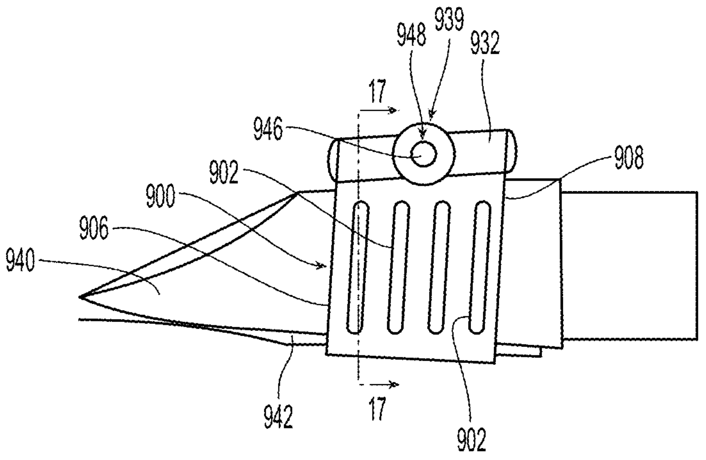
FIG. 16 is a side view of an embodiment of a ligature containing the ligature strap of FIG. 15 formed into a fixed loop, attached to a mouthpiece and holding a reed.
Figure 17:
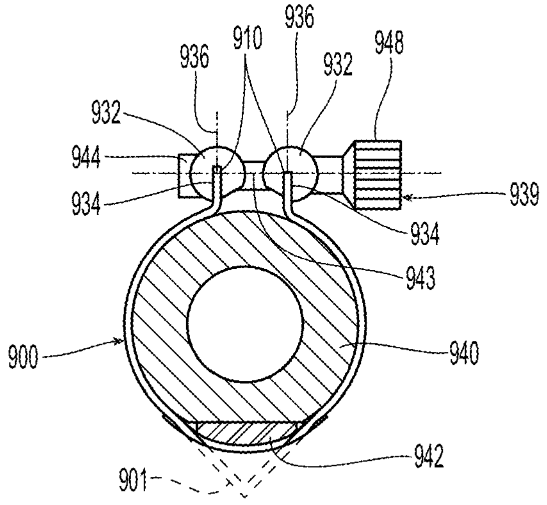
FIG. 17 is a view through line 17-17 of FIG. 16.

Referring now to FIGS. 16-17, the ligature strap is formed into a fixed loop that is sized to fit around the mouthpiece and reed. The carbon fiber sheet material provides sufficient flexibility for positioning over the mouthpiece and reed and tightening of the ligature strap. A pair of rigid bars 932 are attached to the ligature strap 900, one on each end. Suitable materials for the rigid bars include metals, plastics, elastomers, ceramics and combinations thereof. Suitable metals include brass, for example nickel or gold-plated brass, and stainless steel. Each rigid bar 932 is attached to one of the opposing ends of the ligature strap and extends between the top edge 906 and the bottom edge 908. In one embodiment, each rigid bar is aligned along each end to intersect each one of the edges at an angle other than 90° to create a frustoconical shaped loop that accommodates a tapered mouthpiece. In one embodiment, each rigid bar is a cylindrical rod having a diameter of about ¼ of an inch.

In one embodiment, to attach each rigid bar 932 to an end 910 of the flexible ligature strap, each cylindrical rod includes a slot 934 extending partially into the cylindrical rod and running along a length of the cylindrical rod. A corresponding end 910 of the single layer ligature strap is disposed and anchored in each slot. In one embodiment, each slot 934 extends diametrically into the cylindrical rod along a first diameter 936.

In one embodiment, each cylindrical rod 932 includes at least one hole that passes completely through the cylindrical rod and is aligned with one of the notches on the ends of the ligature strap. The holes 938 accommodate the closure mechanism 939 of the ligature that draws the rigid bars and, therefore, the ends of the ligature strap together to tighten the ligature around the mouthpiece 940 and the reed 942. In an alternative embodiment, the ligature strap is formed from carbon fiber that is molded into a loop having the slots and desired frusto-conical shape. The carbon fiber molded ligature strap can include a crease 901 running along the center line 912 of the ligature strap. The crease forms a shape in the ligature strap adjacent the reed such that the ligature strap only contacts the heel end of the reed along the edges of the heel end. The carbon fiber material provides sufficient rigidity to hold the crease shape even when the ligature strap is tightened around the reed and mouthpiece. Therefore, inserts or cradles are not required.

In one embodiment, the closure mechanism is considered part of the ligature. Although various closure mechanisms, e.g., clamps and threaded fasteners, can be used, preferably, the closure mechanism is a threaded rod 943 that is passed through the holes 938 in each rigid cylindrical bar. The threaded rod 943 includes a head 944 that is larger than the diameter of the hole and threads along the distal end 946 to which a threaded thumbscrew or thumbnut 948 is attached. By turning the thumbnut in the proper direction, the rigid bars are drawn together, applying a force that is decomposed into the constrictive force and perpendicular force and that tightens the ligature. In one embodiment, each cylindrical rod 932 includes notches located adjacent each hole. These notches accommodate the heads 944 of the threaded rod 943 and prevent the threaded rod from spinning when the thumbnuts are tightened. The resulting ligature holds the reed to the mouthpiece with the slots 902 in the reed engagement region passing completely over the reed.

Exemplary embodiments are also directed to ligatures straps that utilize a combination of carbon fiber materials and flexible strap materials and to the ligatures and mouthpieces that incorporate the carbon fiber and flexible strap ligature straps. The ligature strap and therefore, the ligature in which the ligature strap is incorporated takes advantage of the different properties of the carbon fiber material and the flexible strap material. The carbon fiber material is more rigid and resilient, maintaining a preformed shape. Therefore, in on embodiment, the carbon fiber material is positioned to contact the reed when placed around a mouthpiece. In this position, the carbon fiber material functions as a cradle. The flexible strap material is used to provide for adjusting the constrictive force around the mouthpiece and to apply an adjustable force on the carbon fiber material.

Figure 18:
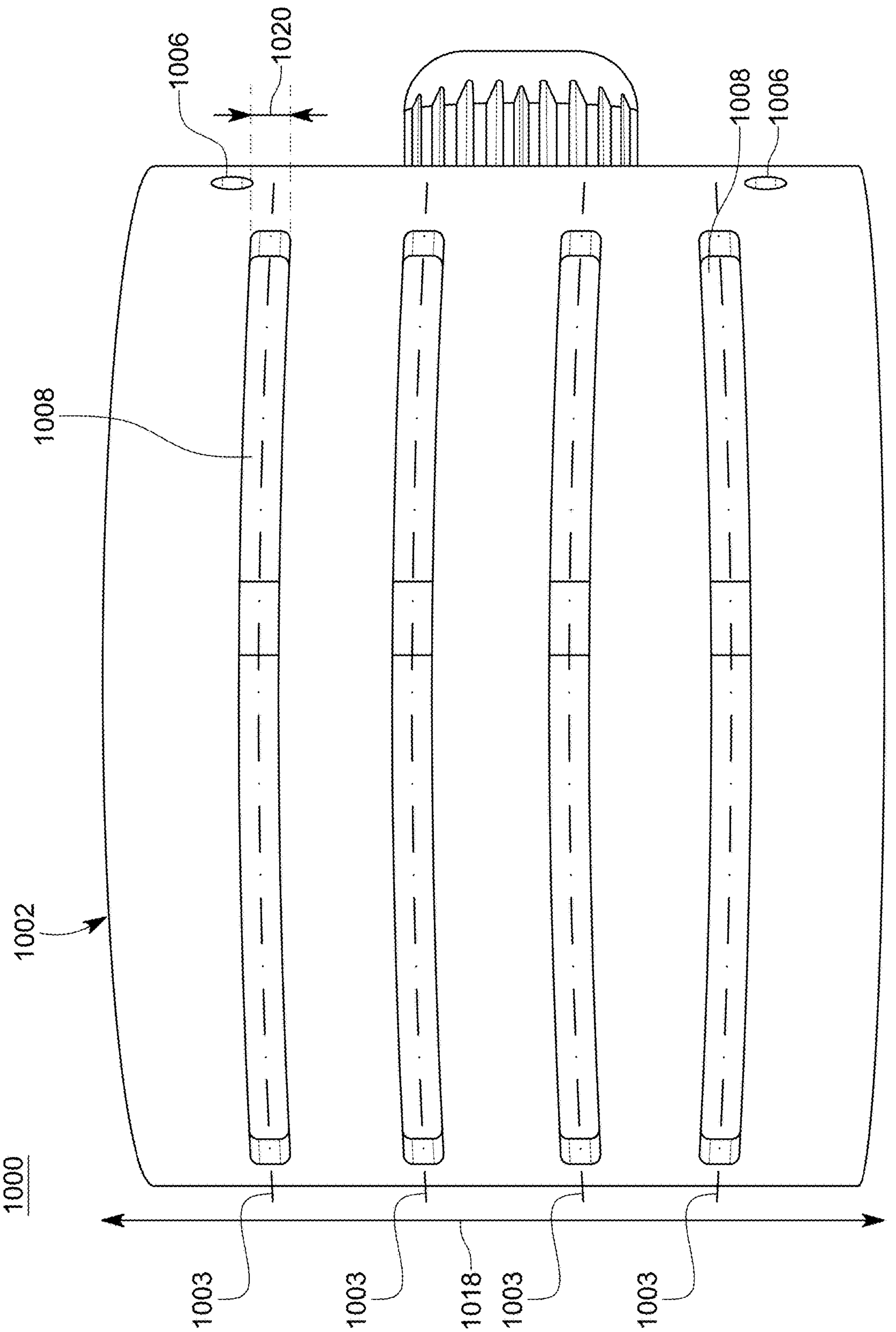
FIG. 18 is a view from the carbon fiber portion of an embodiment of a ligature containing a composite ligature strap.
Figure 19:
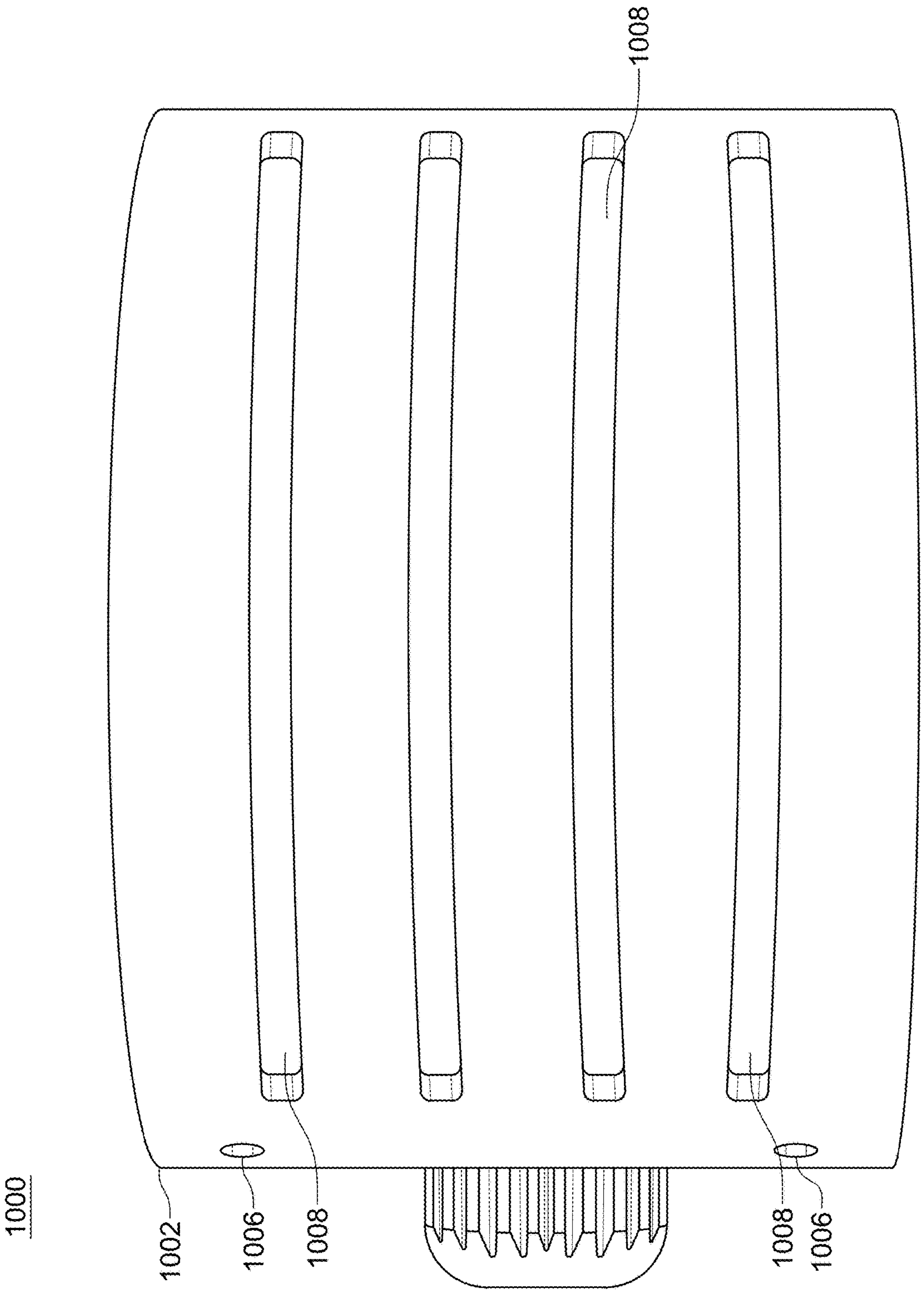
FIG. 19 is another view from the carbon fiber portion of an embodiment of a ligature containing a composite ligature strap.
Figure 20:
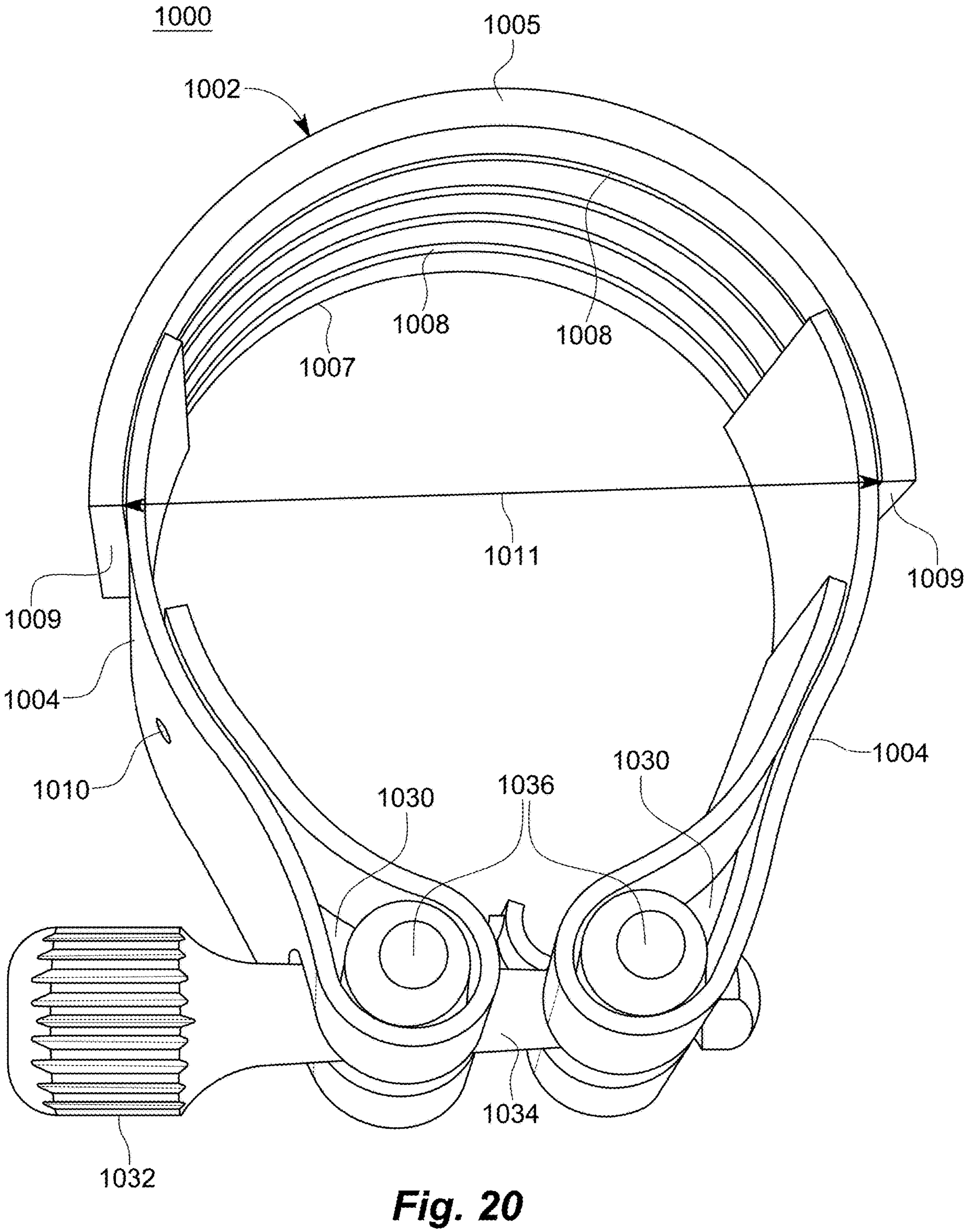
FIG. 20 is an end view of an embodiment of a ligature containing a composite ligature strap.
Figure 21:
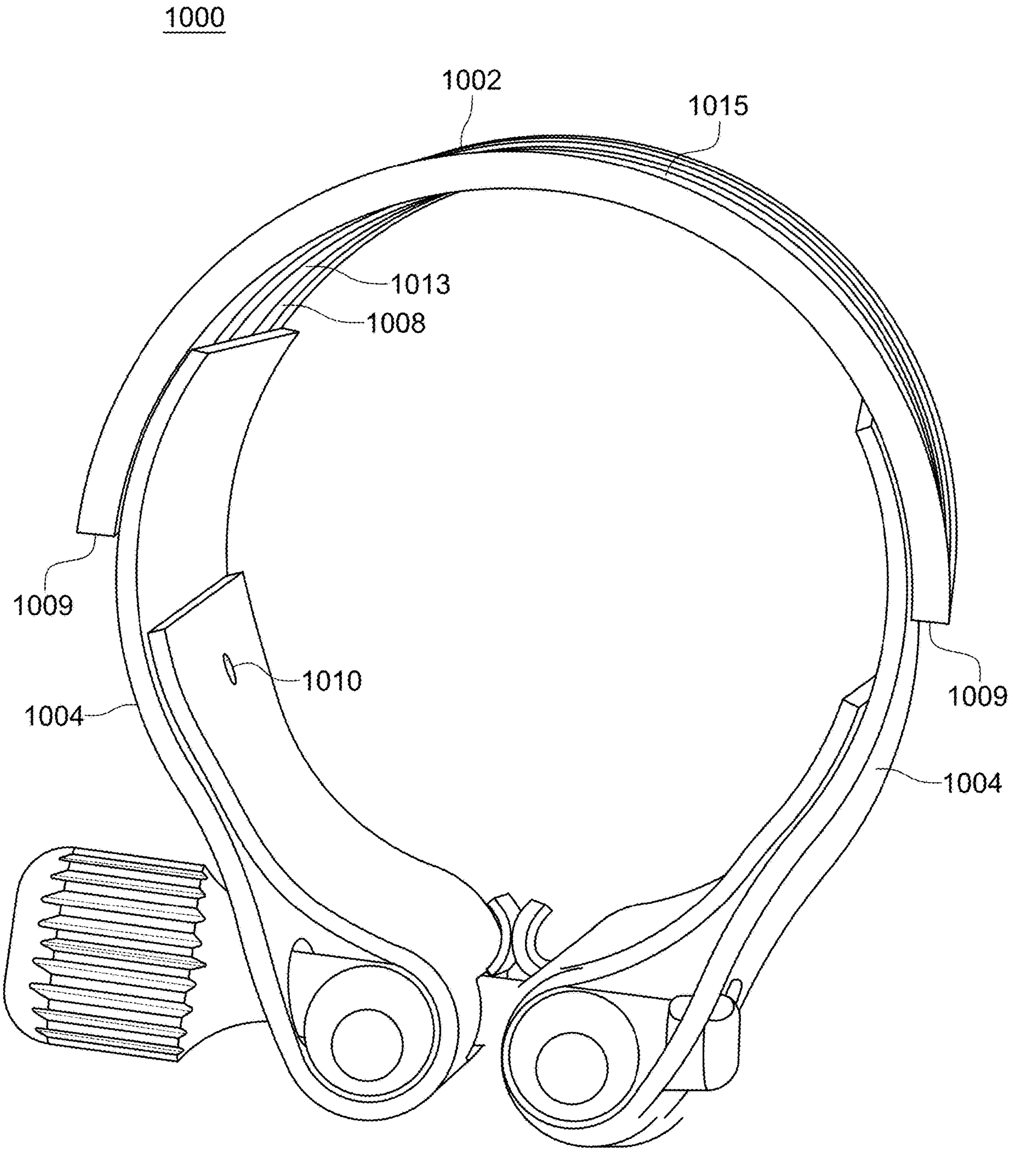
FIG. 21 is another end view of an embodiment of a ligature containing a composite ligature strap.

Referring now to FIGS. 18 and 19, an embodiment of a ligature 1000 utilizing a ligature strap or composite ligature strap containing at least one carbon fiber portion 1002 is illustrated. While illustrated with a single carbon fiber portion, embodiments of the ligature strap can include two or more separate carbon fiber portions. In one embodiment, the carbon fiber portion has a desired preformed size and shape. In one embodiment, the carbon fiber portion is formed or cast into the desired shape. Alternatively, the carbon fiber portion is obtained from existing or available carbon fiber products having the desired shape. In one embodiment, the carbon fiber portion is a length 1018 of a portion of a cylinder or carbon fiber tube, for example, a standard carbon fiber tube. In one embodiment, the carbon fiber portion has a generally cylindrical shape. Alternatively, the carbon fiber portion has a generally frustoconical shape. The cylinder can have a circular cross section or other suitable cross-sectional geometries include oblong, rectangular and triangular. Suitable diameters for the cylinder or carbon fiber tube include, but are not limited to, 1.125 inches, 1.25 inches and 1.5 inches. In one embodiment, the cylinder or carbon fiber tube has a diameter of up to about 1.5 inches. In one embodiment, the carbon fiber portion is a length of a frustum of a cone, e.g., is a portion of a conical section. Therefore, the resulting ligature can have a frustoconical shape.

The length 1018 of carbon fiber portion, e.g., the length of the carbon fiber tube used for the ligature strap, is sufficient to extend along the length of the mouthpiece and secure the reed to the mouthpiece. Suitable lengths include from ¾ inch up to about 1.5 inches. In one embodiment, the length is about 1 inch. When attached to the mouthpiece or reed, the carbon fiber portion engages the reed. Therefore, the carbon fiber portion functions as a cradle to secure the reed against the mouthpiece. In one embodiment, the carbon fiber portion is configured to contact the reed along the two edges of the reed.

As used herein, the portion of the cylinder refers to a portion around the circumference of the cylinder. In one embodiment, the carbon fiber portion includes a portion around the circumference of the carbon fiber tube. In one embodiment, this portion of the circumference includes half of the circumference, e.g., a carbon fiber tube cut in half along its length. In another embodiment, this portion of the circumference includes up to ¾ of the circumference. Therefore, in one embodiment, the carbon fiber portion does not completely encircle the mouthpiece when the ligature is attached to the mouthpiece.

The portion of the cylinder includes a diameter, e.g., the inside diameter of the cylinder. Suitable sizes for the diameter of the carbon fiber tube include larger than an outer circumference of the mouthpiece and reed, the same as the outer circumference of the mouthpiece and reed and smaller than the outer circumference of the mouthpiece and reed. Selecting the relative size between the diameter of the portion of the cylinder and outer circumference of the mouthpiece and reed changes how the ligature strap is placed on the mouthpiece and secured to the mouthpiece and reed. In addition, the relative size between the diameter of the portion of the cylinder and the outer circumference of the mouthpiece determines the forces imparted between the ligature strap and the mouthpiece and reed.

In one embodiment, the diameter of the portion of the cylinder is selected to be smaller than the outer circumference of the mouthpiece and reed to which the ligature strap is attached. Therefore, the carbon fiber portion of the ligature, which has a small amount of flex, is flexed open or expanded when placing the ligature strap around the mouthpiece and reed. The portion of the cylinder and the carbon fiber portion made from the portion of the cylinder, while providing for a small amount of flex, is an elastic material that will return to its original shape and diameter upon removal of the flexing force. As the carbon fiber portion is placed over the mouthpiece to engage the reed, and in particular the heel end of the reed, upon removal of the flexing forced used to expand the carbon fiber portion, the carbon fiber portion will return to its original diameter, which is less than the diameter of the mouthpiece and reed. This creates a force between the carbon fiber portion and the reed, even before using the closing mechanism of the ligature, e.g., the threaded rod, threaded thumbscrew and rigid bars, to draw the ends of the ligature strap around the mouthpiece.

In one embodiment, the diameter of the portion of the cylinder is selected to be larger than the outer circumference of the mouthpiece and reed to which the ligature strap is attached. Therefore, the carbon fiber portion of the ligature strap is easily placed over the smaller reed and mouthpiece. The carbon fiber tube and the carbon fiber portion made from the carbon fiber tube is an elastic material that will maintain and return to its original shape and diameter upon the removal of any flexing or constricting force. To secure the ligature strap to the mouthpiece and reed, the closing mechanism of the ligature, e.g., the threaded rod, threaded thumbscrew and rigid bars, is used to draw the ends of the ligature around the mouthpiece. In one embodiment, the ligature strap holds the mouthpiece and reed against the carbon fiber portion without flexing the carbon fiber portion. Alternatively, the closing mechanism flexes or closes the carbon fiber portion. For a carbon fiber portion having an inside diameter the same as the mouthpiece and reed, the carbon fiber portion is in contact with the reed, and the closing mechanism holds the carbon fiber portion against the reed without flexing the carbon fiber portion.

In one embodiment, the carbon fiber portion includes a plurality of slots 1008 passing completely through the carbon fiber material. The slots in the plurality of slots are spaced from one another along the length 1018 of the carbon fiber portion. While illustrated as slots, the carbon fiber portion can also include a plurality of slits or kerfs or a combination of slots, kerfs and slits. Any arrangement of kerfs, slots or slits discussed herein can be used. As illustrated, the carbon fiber portion includes four slots. The slots are spaced from each other and extends along separate parallel lines 1003 extending across the portion of the cylinder or around the circumference of the cylinder. In one embodiment, the parallel lines are parallel to the top edge 1005 of the carbon fiber portion and the bottom edge 1007. Each slot has a slot width 1020 extending along the length of the carbon fiber portion. In one embodiment, the slot width is from about 1 mm to about 2 mm. In one embodiment, the slots do not extend completely around the circumference of the carbon fiber portion.

In one embodiment, the carbon fiber portion includes at least one pair of mounting holes 1006, for example, circular mounting holes, passing completely through the carbon fiber portion. These mounting holes are used for fixturing the ligature during production and to mount labels or other identifying information on the ligature. When placed around the mouthpiece and the reed, the slots extend around the mouthpiece and reed, perpendicular to the length of the carbon fiber portion. In one embodiment, the carbon fiber portion engages the heel portion of the reed along at least two lines extending along the heel portion and crossing the slots. However, the slots extending around the carbon fiber portion break the lines of contact with the reed into a plurality of line segments. These shorter, discrete line segments in combination with the slight flex and elastic quality of the carbon fiber portion contribute to improved tonality in the mouthpiece and ligature.

Referring now to FIGS. 20-23, in one embodiment, the carbon fiber portion 1002 includes two side edges 1009 extending between the top edge 1005 and the bottom edge 1007 along the length of the carbon fiber portion. This defines a gap 1011 along the length of the carbon fiber portion. Therefore, the side edges extend along the length of the carbon fiber portion on either side of the gap. For a carbon fiber portion that is a portion of a cylinder that extends ½ the way around the circumference of the cylinder, this gap corresponds to the diameter, and in particular the inner diameter of the portion of the cylinder. The carbon fiber portion includes an interior surface 1013 and an exterior surface 1015 opposite the interior surface.

The ligature strap includes at least one flexible strap portion 1004. Suitable materials and arrangements for the flexible strap material and methods for forming the flexible strap material are described herein. The flexible strap portion is attached to the carbon fiber portion and extends from the carbon fiber portion a sufficient distance to extend over the gap 1011 and around the mouthpiece to which the ligature containing the ligature strap is attached. In one embodiment, the closure mechanism for the ligature is located between the at least one strap portion and the carbon fiber portion. In one embodiment, the ligature or ligature strap includes the carbon fiber portion and a pair of flexible strap portions. Each one of the pair of flexible strap portions is attached to one of the side edges 1009 of the carbon fiber portion. In the embodiment as illustrated, the flexible strap portion 1004 overlaps the interior surface of the carbon fiber portion and extends from one of the side edges across the interior surface of the carbon fiber portion.

As illustrated, each flexible strap portion is doubled over or folded over to form two layers of flexible strap and a loop or cradle 1030 between the two layers of flexible strap to hold the ligature closing mechanism as described herein. Alternatively, a single layer of flexible strap material is used and is attached to the carbon fiber portion along one of the side edges. In general, the ligature closing mechanism includes a threaded thumbscrew 1032 engaging a threaded rod 1034 passing through each flexible strap portion and a pairs of rigid bars or rods 1036. In one embodiment, each rigid bar or rod is attached to one end, i.e., side edge, of the carbon fiber portion and an end of the flexible strap portion. In one embodiment, each rod is disposed between the two layers of one of the flexible strap portions within the cradle or loop of each flexible strap portion. In one embodiment, the pairs of rigid bars or rods are part of the closure mechanism. In one embodiment, the size and weight of the rigid bars are adjusted to incorporate a desired amount of mass into the ligature as described in U.S. Pat. No. 7,863,509, the entire contents of which are incorporated herein by reference. The components of the ligature closure mechanism pull the pair of rods and flexible strap portion and carbon fiber portion or flexible strap portions towards each other to secure the ligature around the mouthpiece and reed.

In one embodiment, each flexible strap portion includes a plurality of slits, kerfs or slots 1014 extending around the looped end of the flexible strap and the rod disposed between the two layers of that flexible strap. Suitable arrangements of slits, kerfs or slots in the flexible strap portion are described herein. In one embodiment, each loop portion of the flexible strap portion includes a fixing hole 1010 to provide for proper alignment and formation of the flexible strap portion.

Each flexible strap portion partially overlaps an end of the carbon fiber portion and is attached thereto. In one embodiment, the flexible strap portion overlaps and extends along the carbon fiber portion by up to about 1 cm, for example, from about 0.5 cm to about 1 cm. In one embodiment, each flexible strap overlaps the carbon fiber portion by about 8 cm. While each flexible strap portion has been folded over to form to layers, as illustrated, a single layer of the flexible strap is attached to and overlaps the interior surface of the carbon fiber portion. Alternatively, both layers of each flexible strap can overlap the interior surface of the carbon fiber portion. In one embodiment, the carbon fiber portion is positioned between the two layers of each flexible flap portion such that one layer contacts the interior surface and one layer contacts the exterior surface. The flexible strap can be secured to the carbon fiber portion one the interior surface, the exterior surface or both the interior surface and the exterior surface.

In one embodiment, the flexible strap portion is secured to the carbon fiber portion using an adhesive. In one embodiment, heat, pressure or heat and pressure are used either alone or in combination with the adhesive to attach each flexible strap portion to the carbon fiber portion. In one embodiment, each flexible strap portion is attached using heat, pressure or heat and pressure without adhesive. Other suitable mechanisms for attaching the flexible strap portion to the carbon fiber portion include, but are not limited to, stitching and rivets.

In one embodiment as illustrated in FIGS. 20-23, a single layer of each flexible strap portion overlaps and is attached to the interior surface of the carbon fiber portion. This creates an outer exposed area 1012 of the carbon fiber portion into which the slots do not extend. The mounting holes are located in this portion. In one embodiment, the diameter of the carbon fiber portion across the gap 1011 is selected to accommodate the thickness of the flexible strap portions attached to the interior surface. In one embodiment, each flexible strap extends along the inside surface one end of the slots, for example, a length equal to the outer exposed area. Therefore, the slots extend completely from flexible strap to flexible strap. In one embodiment, the flexible strap does not overlap, i.e., does not have two layers, in the area of attachment to the carbon fiber portion, exposing the rough service of the flexible strap to the interior of the ligature to engage the mouthpiece. Each ligature strap is attached to itself in an area that does not overlap the carbon fiber portion to form the loop or cradle in the flexible strap portion. Suitable methods for attaching the flexible strap to itself are the same as for attaching the flexible strap portion to the carbon fiber portion.

Figure 22:
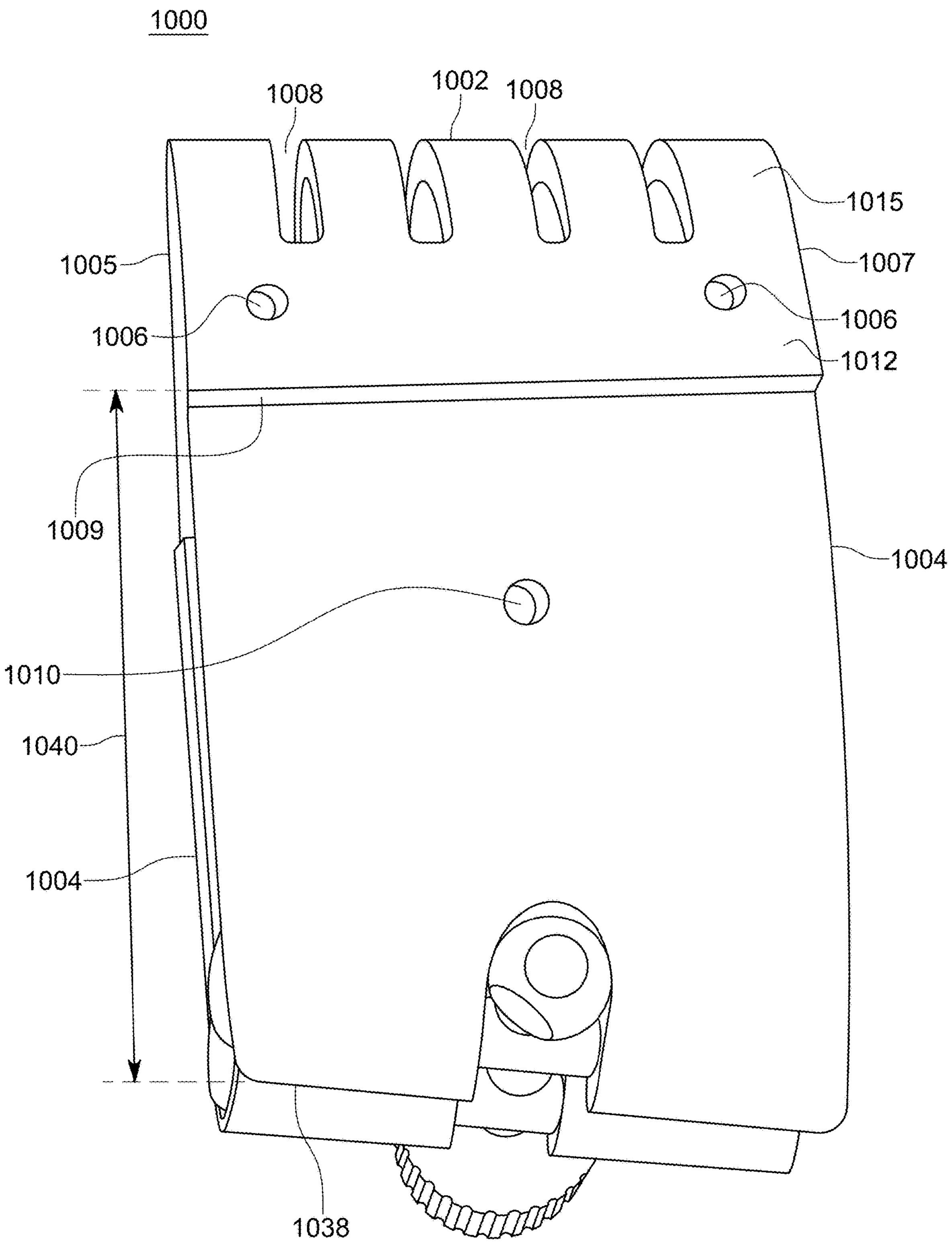
FIG. 22 is a side view of an embodiment of a ligature containing a composite ligature strap.
Figure 23:
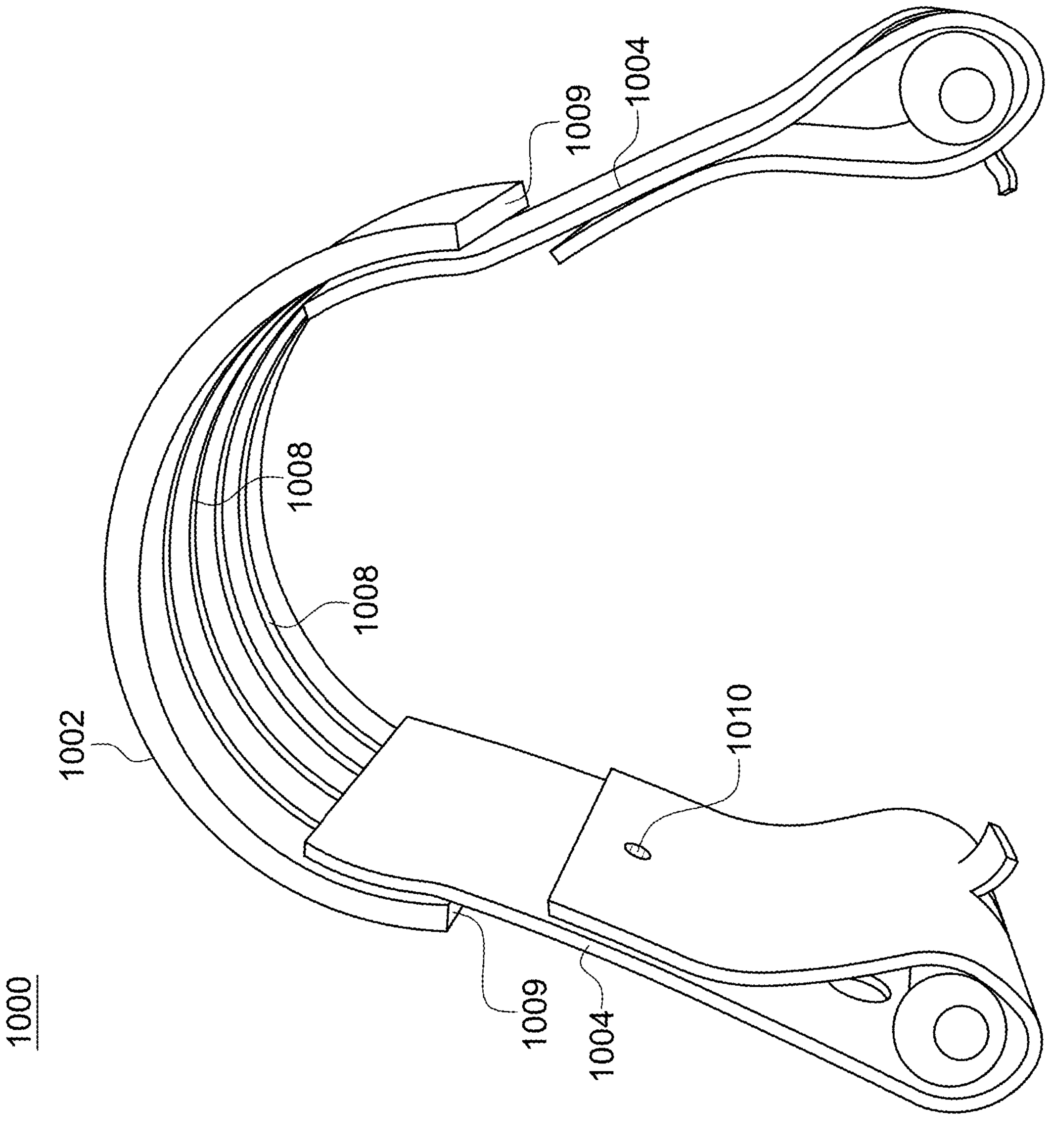
FIG. 23 is an end view of an embodiment of a composite ligature strap with the flexible strap portion flexed open.

Referring to FIG. 22, in one embodiment, the distance 1040 between the side edge of the carbon fiber portion and an end 1038 of the flexible strap portion varies from the top edge 1005 to the bottom edge 1007 of the carbon fiber portion. This accommodates a tapered mouthpiece shape by providing a larger interior diameter at the bottom edge compared to the tope edge. This variation in distance and therefore in the diameter is achieved using the folding of the flexible strap material, a variation of the circumference of the carbon fiber portion used in the portion of the cylinder, the use of a frustoconical shape in the carbon fiber portion or combinations of these factors.

Figure 24:
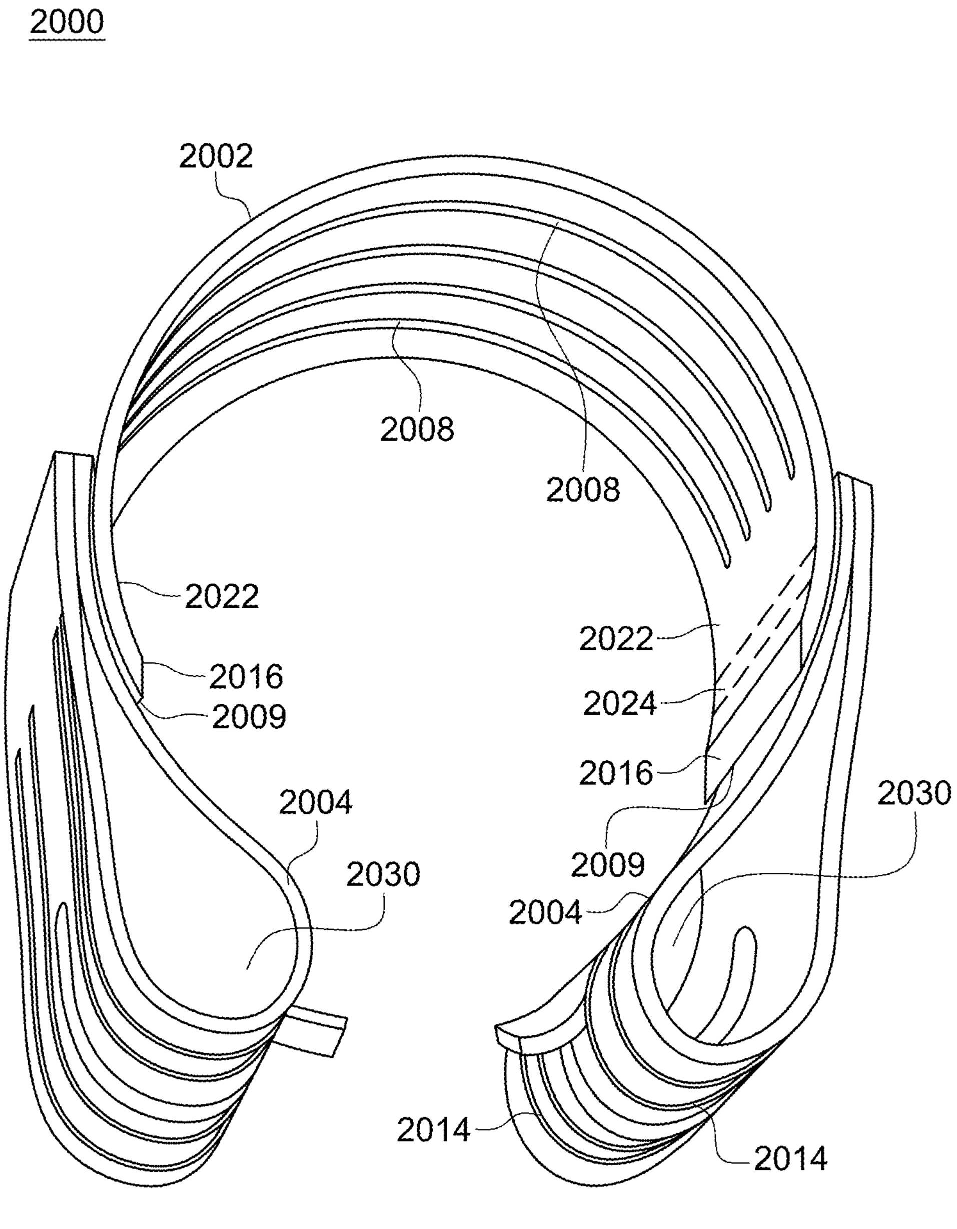
FIG. 24 is an end view of another embodiment of a composite ligature strap.
Figure 25:
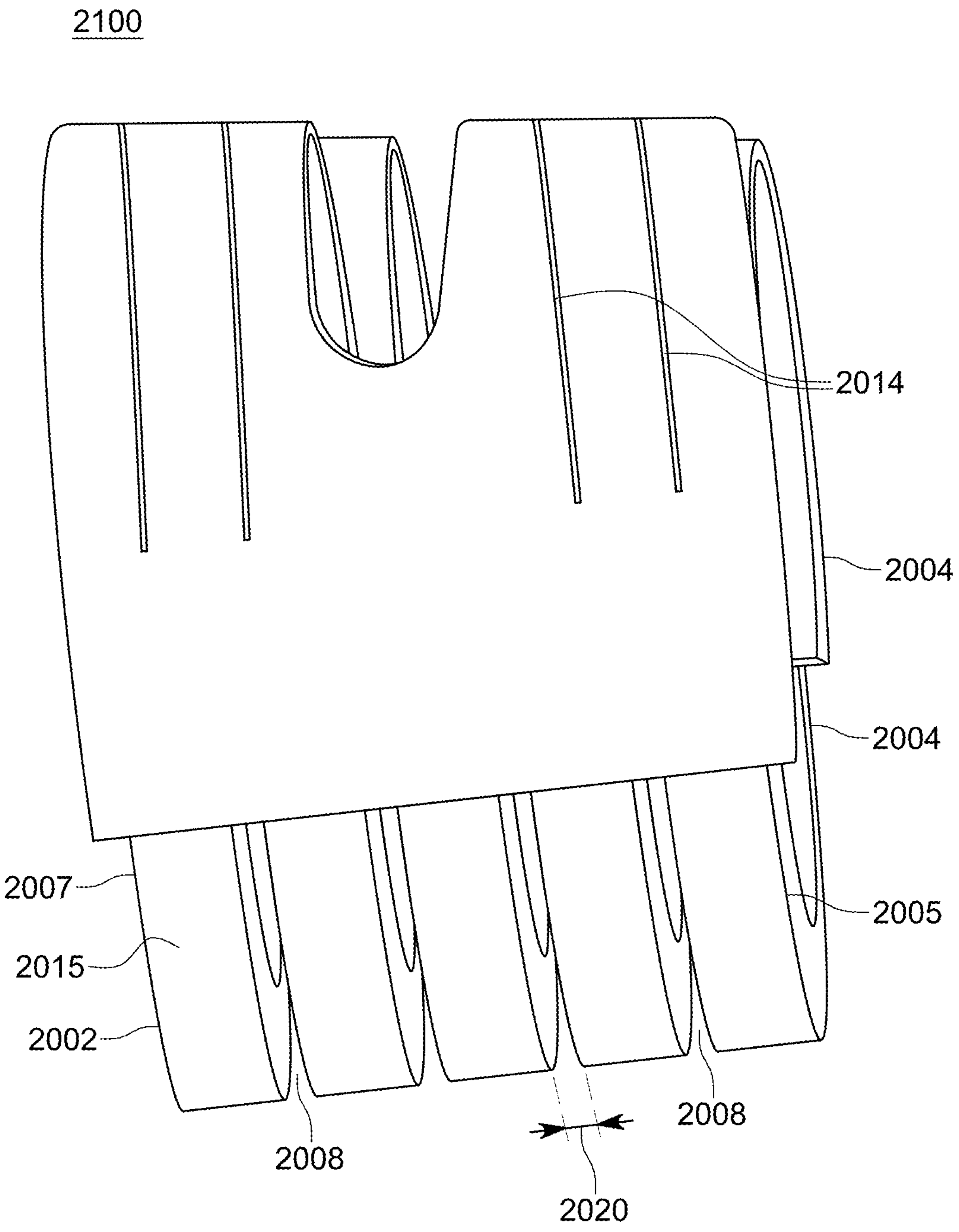
FIG. 25 is a side view of another embodiment of a composite ligature strap.
Figure 26:
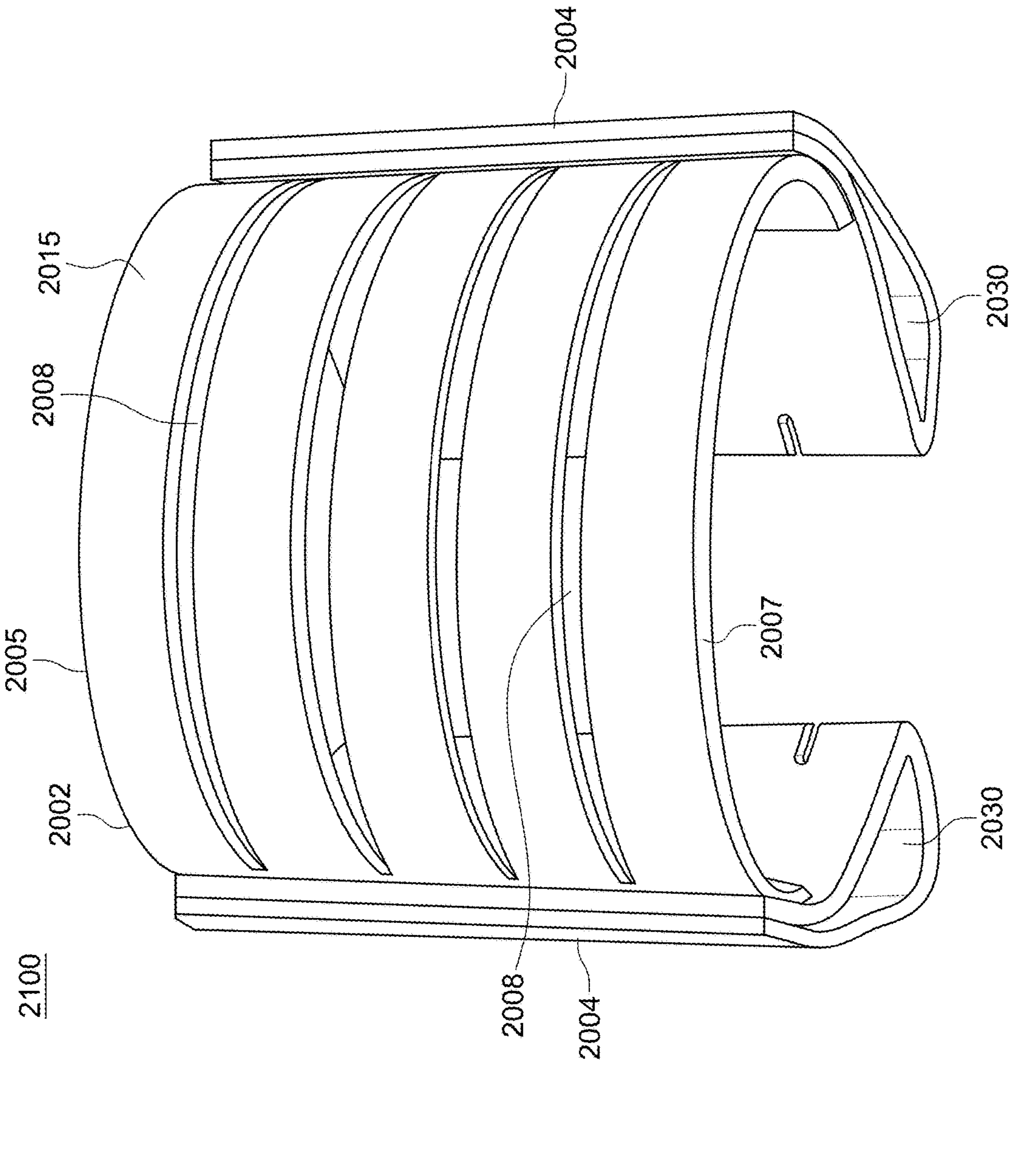
FIG. 26 is a view from the carbon fiber portion of another embodiment of a composite ligature strap.

Referring now to FIGS. 24-26, another embodiment of a composite ligature strap 2100 for use in a ligature and containing at least one carbon fiber portion 2002 is illustrated. Arrangements of the carbon fiber portion are the same as for the embodiment discussed above. Therefore, the carbon fiber portion includes a plurality of slots 2008 passing completely through the carbon fiber material and spaced from one another along the length 2018 of the carbon fiber portion. While illustrated as slots, the carbon fiber portion can also include a plurality of slits or kerfs or a combination of slots, kerfs and slits. Any arrangement of kerfs, slots or slits discussed herein can be used. As illustrated, the carbon fiber portion includes four slots. The slots are spaced from each other and extend along separate parallel lines extending across the portion of the cylinder or around the circumference of the cylinder. In one embodiment, the parallel lines are parallel to the top edge 2005 of the carbon fiber portion and the bottom edge 2007. Each slot has a slot width 2020 extending along the length of the carbon fiber portion. In one embodiment, the slot width is from about 1 mm to about 2 mm. In one embodiment, the slots do not extend completely around the circumference of the carbon fiber portion. The carbon fiber portion includes an interior surface 2013 and an exterior surface 2015 opposite the interior surface.

The ligature strap includes at least one flexible strap portion 2004. Suitable materials and arrangements for the flexible strap material are described herein. The flexible strap portion is attached to the carbon fiber portion and extends from the carbon fiber portion a sufficient distance to extend over the gap and around the mouthpiece to which the ligature containing the ligature strap is attached.

As illustrated, each flexible strap portion is doubled over or folded over to form two layers of flexible strap and a loop or cradle 2030 between the two layers of flexible strap to hold the ligature closing mechanism as described herein. Alternatively, a single layer of flexible strap material is used and is attached to the carbon fiber portion along one of the side edges.

In one embodiment, each flexible strap portion includes a plurality of slits, kerfs or slots 2014 extending around the looped end of the flexible strap and the rod disposed between the two layers of that flexible strap. In one embodiment, each loop portion of the flexible strap portion includes a fixing hole as described herein to provide for proper alignment and formation of the flexible strap portion.

Each flexible strap portion partially overlaps an end of the carbon fiber portion and is attached thereto. In one embodiment, the flexible strap portion overlaps and extends along the carbon fiber portion by up to about 1 cm, for example, from about 0.5 cm to about 1 cm. In one embodiment, each flexible strap overlaps the carbon fiber portion by about 8 cm. While each flexible strap portions has been folded over to form two layers, as illustrated, a single layer of the flexible strap is attached to and overlaps the exterior surface of the carbon fiber portion. Alternatively, both layers of each flexible strap can overlap the interior surface of the carbon fiber portion. In one embodiment, the carbon fiber portion is positioned between the two layers of each flexible flap portion such that one layer contact the interior surface and one layer contacts the exterior surface.

In one embodiment, the flexible strap portion is secured to the carbon fiber portion using an adhesive. In one embodiment, heat, pressure or heat and pressure are used either alone or in combination with the adhesive to attach each flexible strap portion to the carbon fiber portion. In one embodiment, each flexible strap portion is attached using heat, pressure or heat and pressure without adhesive. Other suitable mechanisms for attaching the flexible strap portion to the carbon fiber portion include, but are not limited to, stitching and rivets.

As illustrated, a double layer of each flexible strap extends over and is attached to the exterior surface of the carbon fiber portion. This creates an inner exposed area 2022 of the carbon fiber portion. In one embodiment, each end of the carbon fiber portion includes a beveled or chamfered portion 2016 at each side edge 2009 to provide a smooth transition from the flexible strap portion to the carbon fiber portion. In one embodiment, an extra piece of the flexible strap material, or other soft, cushioning or resilient material (not shown), is attached along an area 2024 extending across each inner exposed area of the interior surface to providing cushioning and grip between the carbon fiber portion and the mouthpiece.

In this embodiment, attachment of both layers of the strap material to the carbon fiber portion also forms and secures the loop or cradle in each flexible strap portion. Each slot extends completely from one flexible strap portion to the other flexible strap portion. While illustrated as having the same length, the lengths of the slots can be varied, and each parallel line can include two or more slots. In one embodiment, the slots, or slits or kerfs, extend from the carbon fiber portion at least partially along each flexible strap portion.

While embodiments illustrate the flexible strap portions as being attached to either the inside or outside surface of the carbon fiber portion, in one embodiment, each flexible strap is attached to the interior and exterior surface of the carbon fiber portion, sandwiching the carbon fiber portion between two layers of flexible strap material. In one embodiment, each flexible strap is not attached to the carbon fiber portion along the entire overlap, allowing the flexible strap material to flex away from the carbon fiber portion in the area of the overlap.

Figure 27:
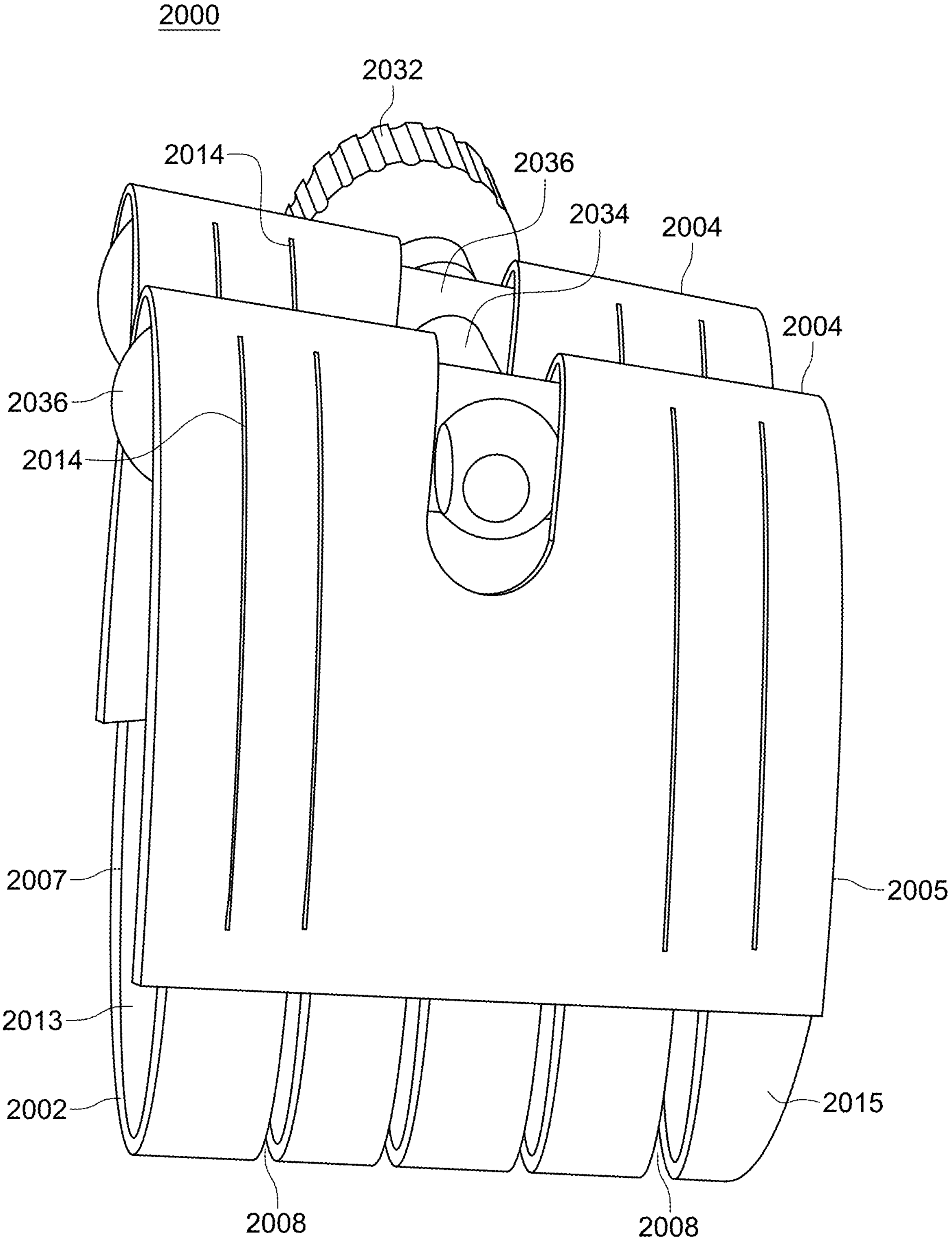
FIG. 27 is a side view of an embodiment of a ligature containing another embodiment of a composite ligature strap.
Figure 28:
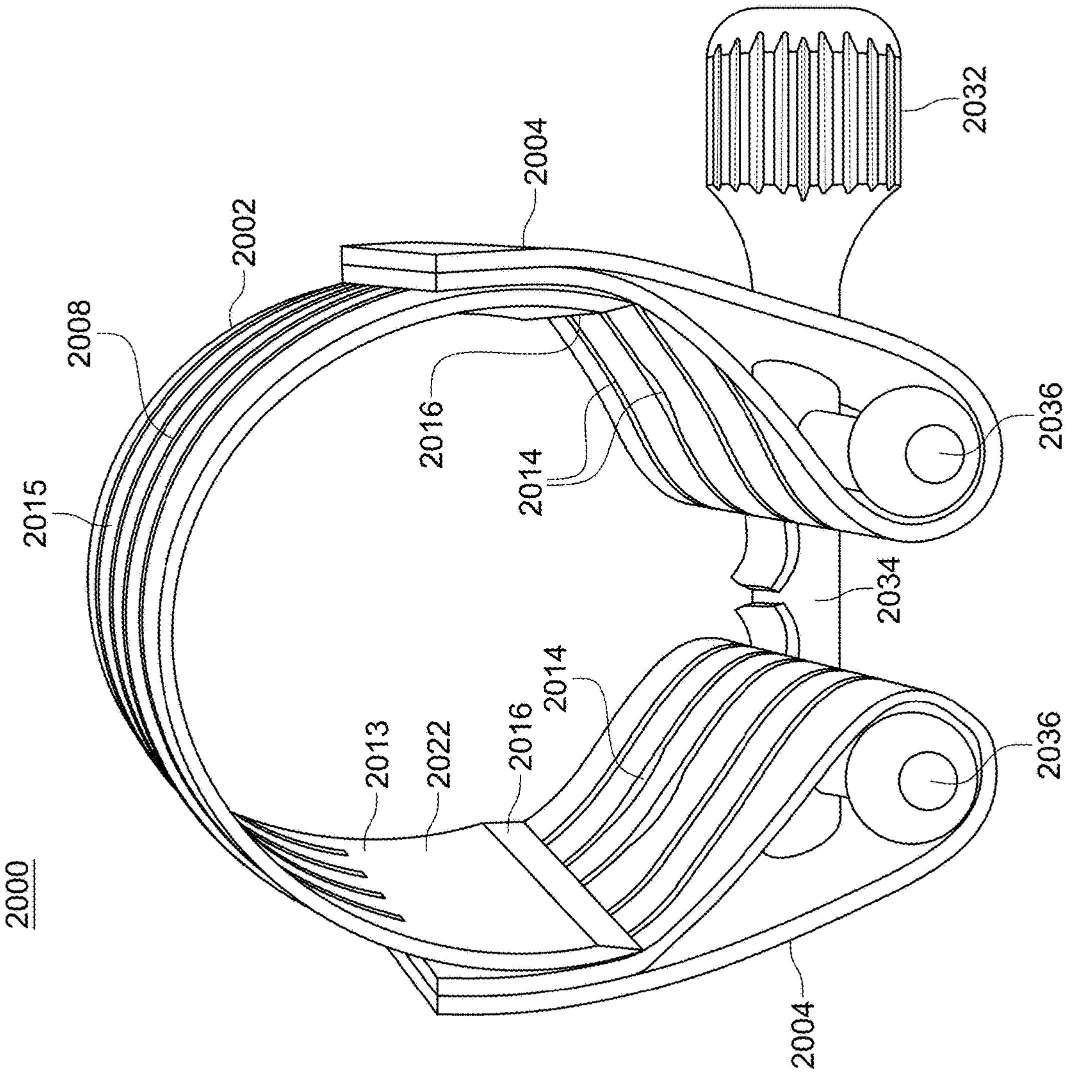
FIG. 28 is an end view of an embodiment of a ligature containing another embodiment of a composite ligature strap.
Figure 29:
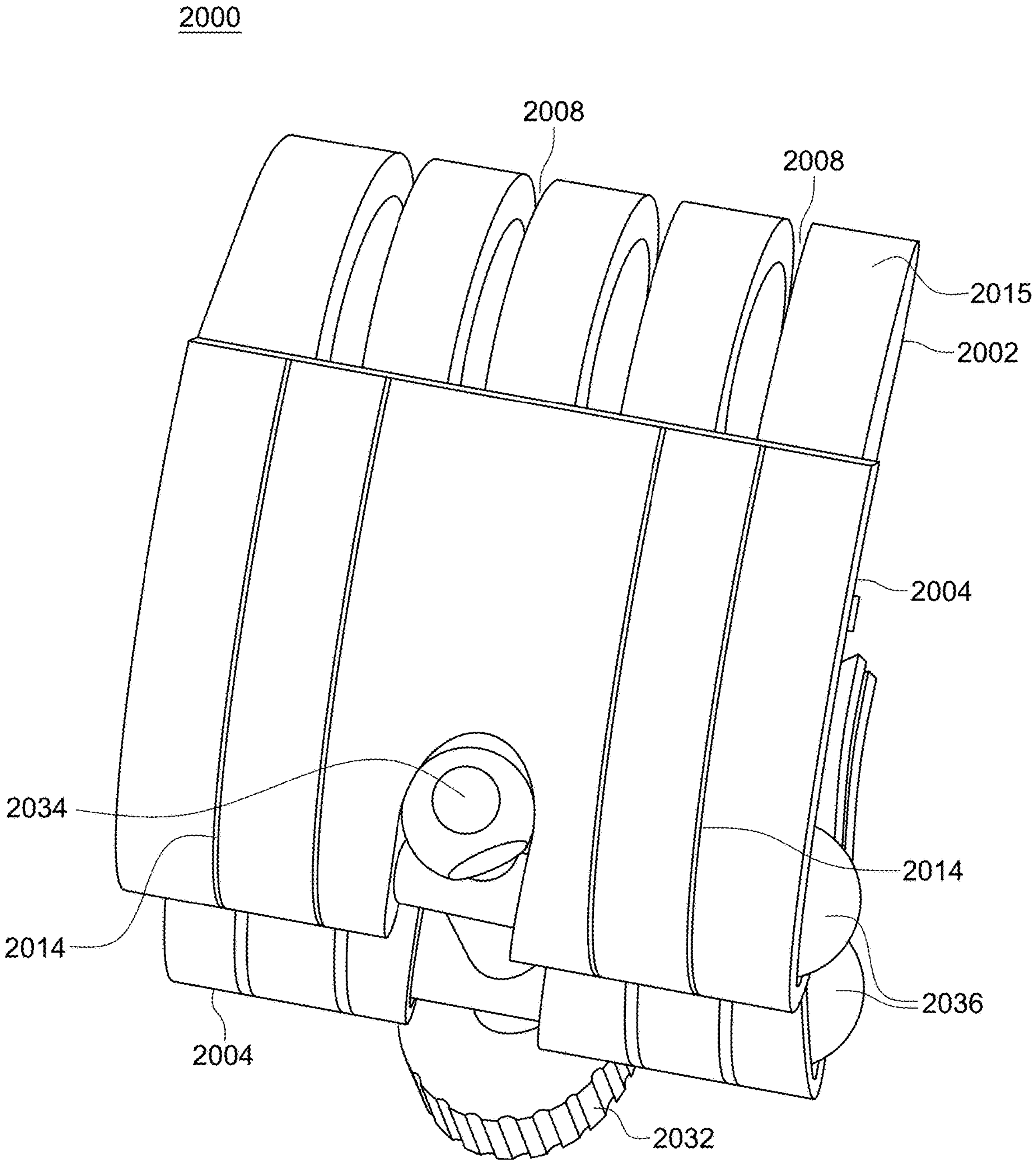
FIG. 29 is another side view of an embodiment of a ligature containing another embodiment of a composite ligature strap.

Referring to FIGS. 27-29, the ligature 2000 incorporating this embodiment of the ligature strap includes the ligature closing mechanism having a threaded thumbscrew 2032 engaging a threaded rod 2034 passing through each flexible strap portion and a pairs of rigid bars or rods 2036. Each rod is disposed between the two layers of one of the flexible strap portions within the cradle or loop of each flexible strap portion. In one embodiment, the size and weight of the rigid bars are adjusted to incorporate a desired amount of mass into the ligature and are described herein. The components of the ligature closure mechanism pull the pair of rods and flexible strap portions towards each other to secure the ligature around the mouthpiece and reed.

In one embodiment, both the carbon fiber portion and the folded or doubled-over flexible strap portion are cut to have a frusto-conical shape. Alternatively, the carbon fiber portion is cylindrical, and each flexible strap portion is cut and folded over, for example, as described above, to form a frusto-conical shape in the ligature when attached to each end of the carbon fiber portion.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A ligature strap for a mouthpiece, the ligature strap comprising:

a carbon fiber portion shaped to surround at least a portion of a circumference of the mouthpiece along a length of the mouthpiece; and at least one separate flexible strap portion attached to the carbon fiber portion.

2. The ligature strap of claim 1, wherein the carbon fiber portion comprises a length of a portion of a frustum of a cone.

3. The ligature strap of claim 1, wherein the carbon fiber portion comprises a length of a portion of a cylinder.

4. The ligature strap of claim 3, wherein the portion of the cylinder comprises up to ¾ of a circumference of the cylinder.

5. The ligature strap of claim 3, wherein:

the portion of the cylinder comprises:

a gap extending along the length; and a pair of side edges extending along the length on either side of the gap.

6. The ligature strap of claim 5, wherein the at least one flexible strap portion is attached to the carbon fiber portion along one of the side edges.

7. The ligature strap of claim 5, wherein the ligature strap comprises two separate flexible strap portions, each separate flexible strap portion attached to the carbon fiber portion along one of the side edges.

8. The ligature strap of claim 5, wherein:

the portion of the cylinder of the carbon fiber portion comprises an interior surface; and the at least one flexible strap is attached to the interior surface.

9. The ligature strap of claim 3, wherein the portion of the cylinder of the carbon fiber portion comprises a circular cross-sectional diameter that is less than a mouthpiece diameter of the mouthpiece to which the ligature strap is to be attached.

10. The ligature strap of claim 1, wherein:

the at least one flexible strap comprises two layers of flexible strap; and the at least one flexible strap is attached to the carbon fiber portion such that the carbon fiber portion is disposed between the two layers of flexible strap.

11. The ligature strap of claim 1, wherein the carbon fiber portion comprises:

a top edge;

a bottom edge spaced from and parallel to the top edge;

two side edges extending between the top edge and the bottom edge along a length of the carbon fiber portion; and a plurality of slots, each slot extending at least partially along one of a plurality of parallel lines running across the ligature strap parallel to the top edge and the bottom edge.

12. The ligature strap of claim 11, wherein each slot in the plurality of slots comprises a slot width extending along the length of from about 1 mm to about 2 mm.

13. A ligature strap for a mouthpiece, the ligature strap comprising:

a carbon fiber portion comprising:

a length of a portion of a cylinder comprising a gap extending along the length and a pair of side edges extending along the length on either side of the gap; and a plurality of slots spaced from each other along the length, each slot extending at least partially along one of a plurality of parallel lines running across the carbon fiber portion between the pair of side edges; and a pair of flexible strap portions, each flexible strap portion attached to and extending from the carbon fiber portion along one of the side edges.

14. The ligature strap of claim 13, wherein:

the carbon fiber portion further comprises a length of a portion of a cylinder having an interior surface; and each flexible strap portion is attached to the interior surf ace of carbon fiber portion along one of the side edges.

15. The ligature strap of claim 13, wherein each flexible strap portion comprises a folded strap forming two layers of flexible strap and is attached to the carbon fiber portion such that the carbon fiber portion is disposed between the two layers of flexible strap.

16. The ligature strap of claim 13, wherein each flexible strap portion comprises a plurality of slits or kerfs extending along the flexible strap.

17. The ligature strap of claim 13, wherein each flexible strap portion extends over the carbon fiber portion from one of the side edges, partially overlapping the carbon fiber portion.

18. A ligature for a woodwind mouthpiece, the ligature comprising:

ligature strap comprising:

a carbon fiber portion comprising:

a length of a portion of a cylinder comprising a gap extending along the length and a pair of side edges extending along the length on either side of the gap; and a plurality of slots spaced from each other along the length, each slot extending at least partially along one of a plurality of parallel lines running across the carbon fiber portion between the pair of side edges; and a pair of flexible strap portions, each flexible strap portion attached to and extending from the carbon fiber portion along one of the side edges, each flexible strap portion folded over to form two layers of flexible strap;

a pair of rods, each rod disposed between the two layers of one of the flexible strap portions; and a closure mechanism passing through each flexible strap portion and each rod to pull the pair of rods and flexible strap portions toward each other.

19. The ligature of claim 18, wherein:

the portion of the cylinder comprises up to ¾ of a circumference of the cylinder; and the portion of the cylinder of the carbon fiber portion comprises a circular cross-sectional diameter that is less than a mouthpiece diameter of the mouthpiece to which the ligature is attached.

20. The ligature of claim 18, wherein each flexible strap portion comprises a plurality of slits or kerfs extending along the flexible strap around the rod disposed between the two layers of that flexible strap.

* * * * *